(12) United States Patent　(10) Patent No.: US 8,537,112 B2
Underkoffler et al.　(45) Date of Patent: *Sep. 17, 2013

(54) CONTROL SYSTEM FOR NAVIGATING A PRINCIPAL DIMENSION OF A DATA SPACE

(75) Inventors: John S. Underkoffler, Los Angeles, CA (US); Kwindla H. Kramer, Los Angeles, CA (US)

(73) Assignee: Oblong Industries, Inc., Los Angeles, CA (US)

( * ) Notice: Subject to any disclaimer, the term of this patent is extended or adjusted under 35 U.S.C. 154(b) by 919 days.

This patent is subject to a terminal disclaimer.

(21) Appl. No.: 12/553,929

(22) Filed: Sep. 3, 2009

(65) Prior Publication Data

US 2010/0060576 A1　Mar. 11, 2010

Related U.S. Application Data

(63) Continuation-in-part of application No. 11/350,697, filed on Feb. 8, 2006, now Pat. No. 7,598,942, and a continuation-in-part of application No. 12/109,263, filed on Apr. 24, 2008, and a continuation-in-part of application No. 12/417,252, filed on Apr. 2, 2009, and a continuation-in-part of application No. 12/487,623, filed on Jun. 18, 2009.

(60) Provisional application No. 61/093,852, filed on Sep. 3, 2008.

(51) Int. Cl.
*G09G 5/08*　(2006.01)

(52) U.S. Cl.
USPC ........................................... 345/158; 345/166

(58) Field of Classification Search
USPC .................. 345/156–178; 178/18.01–18.09, 178/20.01–20.04
See application file for complete search history.

(56) References Cited

U.S. PATENT DOCUMENTS

| | | |
|---|---|---|
| 4,843,568 A | 6/1989 | Krueger et al. |
| 5,454,043 A | 9/1995 | Freeman |
| 5,581,276 A | 12/1996 | Cipolla et al. |
| 5,594,469 A | 1/1997 | Freeman et al. |
| 5,982,352 A | 11/1999 | Pryor |
| 6,002,808 A | 12/1999 | Freeman |

(Continued)

FOREIGN PATENT DOCUMENTS

WO　WO 99/35633 A3　7/1999

OTHER PUBLICATIONS

Form PCT/ISA/220, PCT/US06/04497, "PCT Notification of Transmittal of the International Search Report and the Written Opinion of the International Searching Authority, or the Declaration," 1 pg.

(Continued)

*Primary Examiner* — Vijay Shankar
(74) *Attorney, Agent, or Firm* — Gregory & Sawrie LLP

(57) ABSTRACT

Systems and methods are described for navigating through a data space. The navigating comprises detecting a gesture of a body from gesture data received via a detector. The gesture data is absolute three-space location data of an instantaneous state of the body at a point in time and physical space. The detecting comprises identifying the gesture using the gesture data. The navigating comprises translating the gesture to a gesture signal, and navigating through the data space in response to the gesture signal. The data space is a data-representational space comprising a dataset represented in the physical space.

86 Claims, 39 Drawing Sheets

(56) References Cited

U.S. PATENT DOCUMENTS

| | | | |
|---|---|---|---|
| 6,072,494 | A | 6/2000 | Nguyen |
| 6,075,895 | A | 6/2000 | Qiao et al. |
| 6,191,773 | B1 | 2/2001 | Maruno et al. |
| 6,215,890 | B1 | 4/2001 | Matsuo et al. |
| 6,222,465 | B1 | 4/2001 | Kumar et al. |
| 6,256,033 | B1 | 7/2001 | Nguyen |
| 6,385,331 | B2 | 5/2002 | Harakawa et al. |
| 6,501,515 | B1 | 12/2002 | Iwamura |
| 7,034,807 | B2 | 4/2006 | Maggioni |
| 7,042,440 | B2 | 5/2006 | Pryor et al. |
| 7,058,204 | B2 | 6/2006 | Hildreth et al. |
| 7,109,970 | B1 | 9/2006 | Miller |
| 7,129,927 | B2 | 10/2006 | Mattsson |
| 7,170,492 | B2 | 1/2007 | Bell |
| 7,227,526 | B2 | 6/2007 | Hildreth et al. |
| 7,259,747 | B2 | 8/2007 | Bell |
| 7,340,077 | B2 | 3/2008 | Gokturk et al. |
| 7,348,963 | B2 | 3/2008 | Bell |
| 7,379,563 | B2 | 5/2008 | Shamaie |
| 7,379,566 | B2 | 5/2008 | Hildreth |
| 7,389,591 | B2 | 6/2008 | Jaiswal et al. |
| 7,421,093 | B2 | 9/2008 | Hildreth et al. |
| 7,428,542 | B1 | 9/2008 | Fink et al. |
| 7,430,312 | B2 | 9/2008 | Gu |
| 7,598,942 | B2 * | 10/2009 | Underkoffler et al. ........ 345/158 |
| 2002/0065950 | A1 | 5/2002 | Katz et al. |
| 2002/0186200 | A1 | 12/2002 | Green |
| 2002/0186221 | A1 | 12/2002 | Bell |
| 2002/0194393 | A1 | 12/2002 | Hrischuk et al. |
| 2004/0125076 | A1 | 7/2004 | Green |
| 2004/0183775 | A1 | 9/2004 | Bell |
| 2004/0193413 | A1 | 9/2004 | Wilson et al. |
| 2005/0006154 | A1 | 1/2005 | Back et al. |
| 2005/0257013 | A1 | 11/2005 | Ma |
| 2006/0098873 | A1 | 5/2006 | Hildreth et al. |
| 2006/0173929 | A1 | 8/2006 | Wilson |
| 2006/0187196 | A1 | 8/2006 | Underkoffler et al. |
| 2006/0208169 | A1 | 9/2006 | Breed et al. |
| 2006/0281453 | A1 | 12/2006 | Jaiswal et al. |
| 2007/0139541 | A1 | 6/2007 | Fein et al. |
| 2008/0018595 | A1 | 1/2008 | Hildreth et al. |
| 2008/0030460 | A1 | 2/2008 | Hildreth et al. |
| 2008/0056536 | A1 | 3/2008 | Hildreth et al. |
| 2008/0062123 | A1 | 3/2008 | Bell |
| 2008/0137913 | A1 | 6/2008 | Hildreth |
| 2008/0166022 | A1 | 7/2008 | Hildreth |
| 2008/0187178 | A1 | 8/2008 | Shamaie |
| 2008/0199071 | A1 | 8/2008 | Gu |
| 2008/0205701 | A1 | 8/2008 | Shamaie et al. |
| 2008/0208517 | A1 | 8/2008 | Shamaie |
| 2008/0219502 | A1 | 9/2008 | Shamaie |
| 2008/0235965 | A1 | 10/2008 | Jaiswal et al. |
| 2008/0267447 | A1 | 10/2008 | Kelusky et al. |
| 2008/0273755 | A1 | 11/2008 | Hildreth |
| 2009/0003686 | A1 | 1/2009 | Gu |
| 2009/0027337 | A1 | 1/2009 | Hildreth |
| 2009/0031240 | A1 | 1/2009 | Hildreth |
| 2009/0051648 | A1 | 2/2009 | Shamaie et al. |
| 2009/0052785 | A1 | 2/2009 | Shamaie |
| 2009/0079813 | A1 | 3/2009 | Hildreth |

OTHER PUBLICATIONS

Form PCT/ISA/210, PCT/US06/04497, "PCT International Search Report," 2 pgs.
Form PCT/ISA/237, PCT/US06/04497, "PCT Written Opinion of the International Searching Authority," 3 pgs.
Form PCT/ISA/220, PCT/US08/61457, "PCT Notification of Transmittal of the International Search Report and the Written Opinion of the International Searching Authority, or the Declaration," 1 pg.
Form PCT/ISA/210, PCT/US08/61457, "PCT International Search Report," 2 pgs.
Form PCT/ISA/237, PCT/US08/61457, "PCT Written Opinion of the International Searching Authority," 6 pgs.
Form PCT/ISA/220, PCT/US09/39285, "PCT Notification of Transmittal of the International Search Report and the Written Opinion of the International Searching Authority, or the Declaration," 1 pg.
Form PCT/ISA/210, PCT/US09/39285, "PCT International Search Report," 2 pgs.
Form PCT/ISA/237, PCT/US09/39285, "PCT Written Opinion of the International Searching Authority," 6 pgs.
Form/IB/373, PCT/US06/04497, " International Report on Patentability," 1 pg.

* cited by examiner

1. Depict pose with left hand as viewed from back p = pinkie finger
r = ring finger
m = middle finger
i = index finger
t = thumb ^ = curled non-thumb
\> = curled thumb
| = straight finger or thumb pointed straight up
\ or / = straight finger or thumb pointed at angle
- = thumb pointing straight sideways
x = finger or thumb pointing into plane

| Pose name | p | r | m | i | t |
|---|---|---|---|---|---|
| | | | Hand Pose | | |
| flat | \| | \| | \| | \| | \| |
| fist | ^ | ^ | ^ | ^ | > |
| mime gun | ^ | ^ | ^ | \| | - |
| 2 or peace | ^ | ^ | \ | / | > |
| one-finger point | ^ | ^ | ^ | \| | > |
| two-finger point | ^ | ^ | \| | \| | > |
| x·y·z | ^ | ^ | x | \| | - |
| ok | \| | \| | \| | ^ | > |
| pinkie point | \| | ^ | ^ | ^ | > |
| bracket | x | x | x | x | x |
| 4 | \ | \ | \| | / | > |
| 3 | ^ | \ | \| | / | > |
| 5 | \ | \ | \| | / | / |

FIGURE 14

2. Add hand orientation to complete pose

> must specify two variables:
> 1. palm direction (if hand were flat)
> 2. finger direction (if hand were flat)

| | |
|---|---|
| - | medial |
| + | lateral |
| x | anterior |
| * | posterior |
| ^ | cranial |
| v | caudal | orientation variables come after colon, e.g.:

| | | |
|---|---|---|
| ^ ^ x \| - : - x | = | x-y-z start position |
| ^ ^ \ / > : * v | = | upside-down v |

FIGURE 15

3. Two-hand combos

| Hand 1 | Hand 2 | Pose |
|---|---|---|
| ^ ^ ^ ^ > : x ^ | ^ ^ ^ ^ > : x ^ | full stop |
| ^ ^ ^ \| - : x - | ^ ^ ^ \| - : x ^ | snapshot |
| \| \| \| \| \| : v x | \| \| \| \| \| : - x | rudder and throttle start position |

FIGURE 16

4. Orientation blends
   Achieve variable blending by enclosing pairs
   e.g.:

| | | | | : (vx) (x^)         flat at 45 degrees pitch toward screen

^^||> : ( - ( - v ) ) x       two-finger point rolled medially to 22.5
                                 degrees (halfway between palm medial
                                 and palm rolled to 45 degrees)

| Gest I.D. | Description | Hand 1 Pose | Hand 1 Motion | Hand 2 Pose | Hand 2 Motion |
|---|---|---|---|---|---|
| 1 | point at object (invoke and move cursor) | ^^^\|-:-x | point mime gun | | |
| 2 | select object | ^^^\|:-x | drop thumb to select | | |
| 3 | move spatially / zoom in/out | ^^x\|:-:-x | rotate/translate | | |
| 4 | snapshot | ^^^\|-:x- | make square with 2 hands | ^^^\|-:x^ | make square with 2 hands |
| 5 | demarcate rectangular region | ^^^\|-:x- | make square then adjust size | ^^^\|-:x^ | make square then adjust size |
| 6 | clear the decks | \|\|\|\|:+x | sweep hand laterally | \|\|\|\|:-x | sweep hand medially |
| 7 | organize objects into a circle | ^^^\|-:-^ | look through circle of O.K. sign | | |
| 8 | two-finger point at objects | ^^\|-:-x | point | | |
| 9 | two-finger select object | ^^^\|:-x | drop thumb to select | | |
| 10 | mark start time | xxxxx:-^ | strike pose | | |
| 11 | mode change 1 | \|\|\|\|:-^ | strike pose - make "T" with two hands | \|\|\|\|:v- | strike pose - make "T" with two hands |
| 12 | mode change 11 | \|\|\|\|:-^ | strike pose - parallel hands | \|\|\|\|:-^ | strike pose - parallel hands |
| 13 | push back and slide workspace | \|\|\|\|-:x^ | push palm toward screen -- move sideways to find new regions | | |

FIGURE 19

| 14 | enter sub-application | ¦¦¦¦¦ : x ^ | strike pose | ¦¦¦¦¦ : x ^ | strike pose |
| 15 | return from sub-application | ¦¦¦¦¦ : . ^ | strike pose | ¦¦¦¦¦ : . ^ | strike pose |
| 16 | select option | ^^^ \| - : - x | medial roll | | |
| 17 | roll time forward/back | ¦¦¦¦¦ : v x | Yaw hand at elbow while keeping hand parallel to floor | | |
| 18 | stop time | ¦¦¦¦¦ : x ^ | strike pose | | |
| 19 | loop time | ^^^ \| - : x ^ | circular motion with "L" | | |
| 20 | demarcate irregular region | ^^^ \| - : v x | start with 2 finger tips together. 1 hand holds start position. | ^^^ \| - : - x | other hand traces out shape - select "click" for vertices |
| 21 | tag object | \| ^^^^ > : - x | pinky-point at object then roll hand medially | | |
| 22 | group data streams | ^^^ \| - : v x | bring finger tips of two hands together | ^^^ \| - : v x | bring finger tips of two hands together |
| 23 | restore encapsulated workspace | ¦¦¦¦¦ : + x | sweep hand medially | ¦¦¦¦¦ : - x | sweep hand laterally |

FIGURE 19 (CONTINUED)

first quadword of every slaw

|  | 76543210 | 76543210 | 76543210 | 76543210 |
|---|---|---|---|---|
| length-follows: | 1xxxxxxx | xxxxxxxx | xxxxxxxx | xxxxxxxx |
| eight-byte length: | 11xxxxxx | xxxxxxxx | xxxxxxxx | xxxxxxxx |
| wee cons: | 01xxxxxx | xxxxxxxx | xxxxxxxx | xxxxxxxx |
| wee cons quadlen: | rrqqqqqq | qqqqqqqq | qqqqqqqq | qqqqqqqq |
| wee string: | 001xxxxx | xxxxxxxx | xxxxxxxx | xxxxxxxx |
| wee string quadlen: | rrrqqqqq | qqqqqqqq | qqqqqqqq | qqqqqqqq |
| wee list: | 0001xxxx | xxxxxxxx | xxxxxxxx | xxxxxxxx |
| wee list quadlen: | rrrrqqqq | qqqqqqqq | qqqqqqqq | qqqqqqqq |
| full string: | 1*100000 | 00000000 | 00000000 | 00000001 |
| full cons: | 1*100000 | 00000000 | 00000000 | 00000010 |
| full list: | 1*100000 | 00000000 | 00000000 | 00000011 |

(the penulti-MSB above is zero or one as the length is contained in the next one or two quadwords, i.e. if it's a four or eight byte length, per the 'eight-byte length' bit description second from top)

|  |  |  |  |  |
|---|---|---|---|---|
| numeric: | 00001xxx | xxxxxxxx | xxxxxxxx | xxxxxxxx |
| numeric float: | xxxxx1xx | xxxxxxxx | xxxxxxxx | xxxxxxxx |
| numeric complex: | xxxxxx1x | xxxxxxxx | xxxxxxxx | xxxxxxxx |
| numeric unsigned: | xxxxxxx1 | xxxxxxxx | xxxxxxxx | xxxxxxxx |
| numeric wide: | xxxxxxxx | 1xxxxxxx | xxxxxxxx | xxxxxxxx |
| numeric stumpy: | xxxxxxxx | x1xxxxxx | xxxxxxxx | xxxxxxxx |
| numeric reserved: | xxxxxxxx | xx1xxxxx | xxxxxxxx | xxxxxxxx |

FIGURE 30

(wide and stumpy conspire to express whether the number in question is 8, 16, 32, or 64 bits long; neither-wide-nor-stumpy, i.e. both zero, is sort of canonical and thus means 32 bits; stumpy alone is 8; stumpy and wide is 16; and just wide is 64)

```
numeric 2-vector:      xxxxxxxx xxx01xxx xxxxxxxx xxxxxxxx
numeric 3-vector:      xxxxxxxx xxx10xxx xxxxxxxx xxxxxxxx
numeric 4-vector:      xxxxxxxx xxx11xxx xxxxxxxx xxxxxxxx
``` for any numeric entity, array or not, a size-in-bytes-minus-one is stored in the last eight bits -- if a singleton, this describes the size of the data part; if an array, it's the size of a single element -- so:

```
num'c unit bsize mask: 00001xxx xxxxxxxx xxxxxxxx mmmmmmmm
``` and for arrays, there're these:

```
num'c breadth follows: xxxxxxxx xxxxx1xx xxxxxxxx xxxxxxxx
num'c 8-byte breadth:  xxxxxxxx xxxxx11x xxxxxxxx xxxxxxxx
num'c wee breadth mask: xxxxxxxx xxxxx0mm mmmmmmmm xxxxxxxx
```

FIGURE 30 (CONTINUED)

first quadword of every slaw

```
                        76543210  76543210  76543210  76543210
length-follows:         1xxxxxxx  xxxxxxxx  xxxxxxxx  xxxxxxxx
eight-byte length:      11xxxxxx  xxxxxxxx  xxxxxxxx  xxxxxxxx wee cons:               01xxxxxx  xxxxxxxx  xxxxxxxx  xxxxxxxx
wee cons quadlen:       rrqqqqqq  qqqqqqqq  qqqqqqqq  qqqqqqqq
wee string:             001xxxxx  xxxxxxxx  xxxxxxxx  xxxxxxxx
wee string quadlen:     rrrqqqqq  qqqqqqqq  qqqqqqqq  qqqqqqqq
wee list:               0001xxxx  xxxxxxxx  xxxxxxxx  xxxxxxxx
wee list quadlen:       rrrrqqqq  qqqqqqqq  qqqqqqqq  qqqqqqqq full string:            1*100000  00000000  00000000  00000001
full cons:              1*100000  00000000  00000000  00000010 full list:              1*100000  00000000  00000000  00000011
```
(the penulti-MSB above is zero or one as the length is contained in the next one or two quadwords, i.e. if it's a four or eight byte length, per the 'eight-byte length' bit description second from top)

```
numeric:                00001xxx  xxxxxxxx  xxxxxxxx  xxxxxxxx numeric float:          xxxxx1xx  xxxxxxxx  xxxxxxxx  xxxxxxxx
numeric complex:        xxxxxx1x  xxxxxxxx  xxxxxxxx  xxxxxxxx
numeric unsigned:       xxxxxxx1  xxxxxxxx  xxxxxxxx  xxxxxxxx
numeric wide:           xxxxxxxx  1xxxxxxx  xxxxxxxx  xxxxxxxx
numeric stumpy:         xxxxxxxx  x1xxxxxx  xxxxxxxx  xxxxxxxx
numeric reserved:       xxxxxxxx  xx1xxxxx  xxxxxxxx  xxxxxxxx
```

FIGURE 30B/1

(wide and stumpy conspire to express whether the number in question is 8, 16, 32, or 64 bits long; neither-wide-nor-stumpy, i.e. both zero, is sort of canonical and thus means 32 bits; stumpy alone is 8; stumpy and wide is 16; and just wide is 64)

```
numeric 2-vector:      xxxxxxxx   xxx01xxx   xxxxxxxx   xxxxxxxx
numeric 3-vector:      xxxxxxxx   xxx10xxx   xxxxxxxx   xxxxxxxx
numeric 4-vector:      xxxxxxxx   xxx11xxx   xxxxxxxx   xxxxxxxx
``` for any numeric entity, array or not, a size-in-bytes-minus-one is stored in the last eight bits -- if a singleton, this describes the size of the data part; if an array, it's the size of a single element -- so:

```
num'c unit bsize mask:   00001xxx   xxxxxxxx   xxxxxxxx   mmmmmmmm
``` and for arrays, there're these:

```
num'c breadth follows:   xxxxxxxx   xxxxx1xx   xxxxxxxx   xxxxxxxx
num'c 8-byte breadth:    xxxxxxxx   xxxxx11x   xxxxxxxx   xxxxxxxx
num'c wee breadth mask:  xxxxxxxx   xxxxx0mm   mmmmmmmm   xxxxxxxx
```

FIGURE 30B/2

CONTROL SYSTEM FOR NAVIGATING A PRINCIPAL DIMENSION OF A DATA SPACE

RELATED APPLICATION

This patent application is a continuation in part of U.S. patent application Ser. No. 11/350,697, filed Feb. 8, 2006.

This application is a continuation in part of U.S. patent application Ser. No. 12/109,263, filed Apr. 24, 2008.

This application is a continuation in part of U.S. patent application Ser. No. 12/417,252, filed Apr. 2, 2009.

This application is a continuation in part of U.S. patent application Ser. No. 12/487,623, filed Jun. 18, 2009.

This application claims the benefit of U.S. patent application Ser. No. 61/093,852, filed Sep. 3, 2008.

FIELD OF THE INVENTION

This invention relates to the field of computer systems in general and in particular to systems and methods that enable linear spatial motion of a human operator's hand, or performance of analogously dimensional activity, to control linear verging or trucking motion through a graphical or other data-representational space.

BACKGROUND

A user may enter commands and interact with a computer system by manipulating data or images in a window on a display, or by selecting operations from a menu associated with the window or an associated program, using input devices such as a mouse, keyboard, joystick, cross-key, or the like. Such input devices may also operate as position translating devices, which can be used to position a graphical, on-screen pointer, such as a cursor. A cursor functions, for example, to indicate a character to be revised or to indicate a position where data is to be entered or an operation is to be performed. A cursor, in some form or appearance, is typically present on the computer display.

Manipulation of an input device by a user will result in a corresponding movement of the cursor. Thus, for example, movement of a mouse or other input device results in movement of the cursor in the same direction.

These conventional input devices are, however, often just that, devices. The user is required to have a wired or wireless mouse or other input device and to use that device to manage selection, position translation, activation, and other input functions. Often the use of these physical devices is not natural or intuitive. Another disadvantage is the need to go through certain steps to change the context of the input device so that different functions may be performed.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 14 is a diagram of poses in a gesture vocabulary, under an embodiment.

FIG. 15 is a diagram of orientation in a gesture vocabulary, under an embodiment.

FIG. 16 is a diagram of two hand combinations in a gesture vocabulary, under an embodiment.

FIG. 19 is an example of commands, under an embodiment.

FIG. 30B shows a slaw header format, under an embodiment.

DETAILED DESCRIPTION

A system and method for a Spatial Operating Environment (SOE) is described. The SOE, which includes a gesture-based control system, can also be referred to as a Spatial User Interface (SUI) or a Spatial Interface (SI). Systems and methods are described for navigating through a data space of the SOE. The navigating comprises detecting a gesture of a body from gesture data received via a detector. The gesture data is absolute three-space location data of an instantaneous state of the body at a point in time and physical space. The detecting comprises identifying the gesture using the gesture data. The navigating comprises translating the gesture to a gesture signal, and navigating through the data space in response to the gesture signal. The data space is a data-representational space comprising a dataset represented in the physical space.

In the following description, a number of features are described in detail in order to provide a more thorough understanding of the SOE. It is apparent that the SOE may be practiced without these specific details. In other cases, well known features have not been described in detail.

Spatial Operating Environment (SOE)

Figure 1:
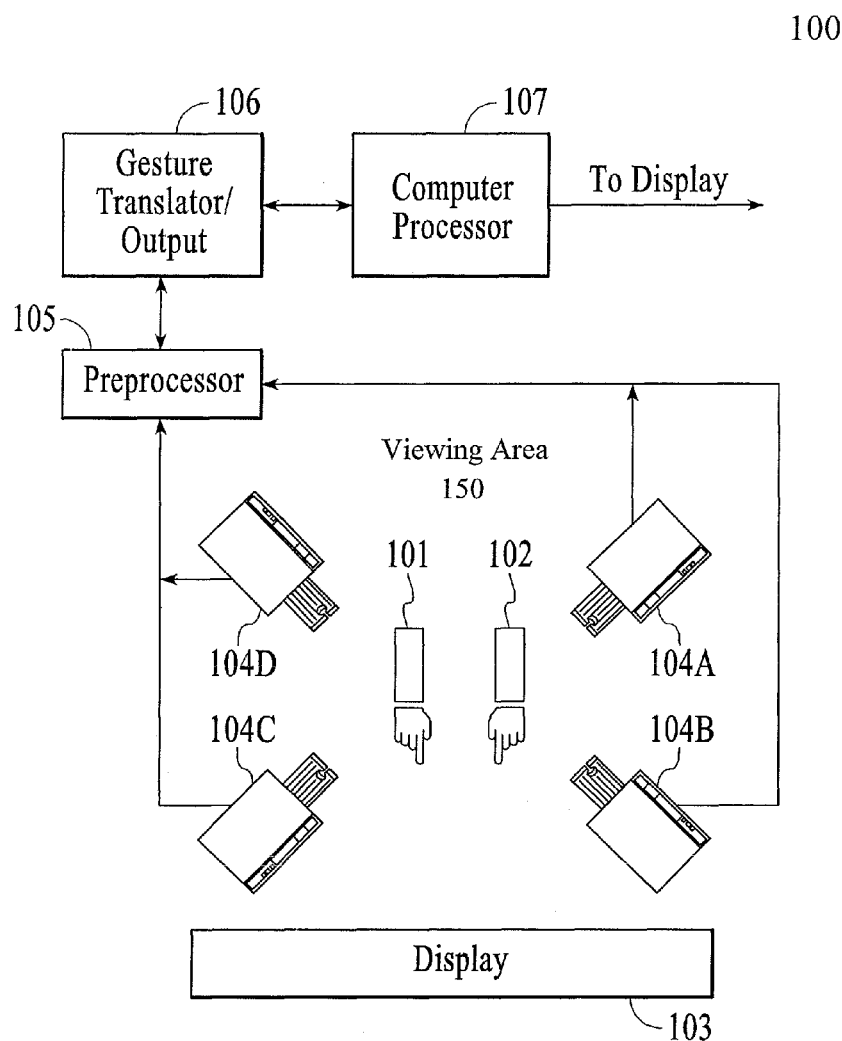
FIG. 1 is a block diagram of a gestural control system, under an embodiment.

FIG. 1 is a block diagram of the SOE, under an embodiment. A user locates his hands 101 and 102 in the viewing area of an array of cameras 104A-104D. The cameras detect location, orientation, and movement of the fingers and hands 101 and 102 and generate output signals to pre-processor 105. Pre-processor 105 translates the camera output into a gesture signal that is provided to the computer processing unit 107 of the system. The computer 107 uses the input information to generate a command to control one or more on screen cursors and provides video output to display 103.

Although the system is shown with a single user's hands as input, the SOE 100 may be implemented using multiple users. In addition, instead of or in addition to hands, the system may track any part or parts of a user's body, including head, feet, legs, arms, elbows, knees, and the like.

In the embodiment shown, four cameras or sensors are used to detect the location, orientation, and movement of the user's hands 101 and 102. It should be understood that the SOE 100 may include more (e.g., six cameras, eight cameras, etc.) or fewer (e.g., two cameras) cameras or sensors without departing from the scope or spirit of the SOE. In addition, although the cameras or sensors are disposed symmetrically in the example embodiment, there is no requirement of such symmetry in the SOE 100. Any number or positioning of cameras or sensors that permits the location, orientation, and movement of the user's hands may be used in the SOE 100.

In one embodiment, the cameras used are motion capture cameras capable of capturing grey-scale images. In one embodiment, the cameras used are those manufactured by Vicon, such as the Vicon MX40 camera. This camera includes on-camera processing and is capable of image capture at 1000 frames per second. A motion capture camera is capable of detecting and locating markers.

The cameras or sensors of the SOE of an embodiment may take various forms. An embodiment uses two or more small cameras coupled together to form a stereo vision system. This stereo system generates, at minimum, a three-dimensional data point cloud for objects within its field of view. The resolved depth accuracy of the points in the data set varies according to a number of factors, including distance from the camera baseline, but is approximately 1 mm.

Given a point cloud generated by the stereo sensor set, components of the SOE extract hand and/or finger positions, from which in turn quantized hand poses and continuous hand and finger orientation vectors may be recovered. The approach used for this recovery is substantially similar to the methods described below except the initial input is unstructured point clouds, rather than aggregate-tagged data. The hand and finger representations are made available to the mechanisms that implement the system's interactive modes.

Embodiments use multiple sets of stereo-coupled cameras, or use modified correlation algorithms that process pixel data to handle more than one camera. Increasing the number of cameras can, for example, expand the field of view, decrease difficulties posed by occlusion of parts of the hands, and/or increase the accuracy of point cloud data.

In the embodiment described, the cameras are sensors used for optical detection. In other embodiments, the cameras or other detectors may be used for electromagnetic, magnetostatic, RFID, or any other suitable type of detection.

Pre-processor 105 generates three dimensional space point reconstruction and skeletal point labeling. The gesture translator 106 converts the 3D spatial information and marker motion information into a command language that can be interpreted by a computer processor to update the location, shape, and action of a cursor on a display. In an alternate embodiment of the SOE 100, the pre-processor 105 and gesture translator 106 are integrated or combined into a single device.

Computer 107 may be any general purpose computer such as manufactured by Apple, Dell, or any other suitable manufacturer. The computer 107 runs applications and provides display output. Cursor information that would otherwise come from a mouse or other prior art input device now comes from the gesture system.

Navigating Data Space

The SOE of an embodiment enables 'pushback', a linear spatial motion of a human operator's hand, or performance of analogously dimensional activity, to control linear verging or trucking motion through a graphical or other data-representational space. The SOE, and the computational and cognitive association established by it, provides a fundamental, structured way to navigate levels of scale, to traverse a principally linear 'depth dimension', or—most generally—to access quantized or 'detented' parameter spaces. The SOE also provides an effective means by which an operator may volitionally acquire additional context: a rapid technique for understanding vicinities and neighborhoods, whether spatial, conceptual, or computational.

In certain embodiments, the pushback technique may employ traditional input devices (e.g. mouse, trackball, integrated sliders or knobs) or may depend on tagged or tracked objects external to the operator's own person (e.g. instrumented kinematic linkages, magnetostatically tracked 'input bricks'). In other alternative embodiments, a pushback implementation may suffice as the whole of a control system.

The SOE of an embodiment is part of and integrated into a larger spatial interaction system that supplants customary mouse-based graphical user interface ('WIMP' UI) methods for control of a computer, comprising instead (a) physical sensors that can track one or more types of object (e.g., human hands, objects on human hands, inanimate objects, etc.); (b) a means for analyzing the evolving position, orientation, and pose of the sensed hands into a sequence of gestural events; (c) a descriptive scheme for representing such sptatial and gestural events; (d) a framework for distributing such events to and within control programs; (e) methods for synchronizing the human intent (the commands) encoded by the stream of gestural events with graphical, aural, and other display-modal depictions of both the event stream itself and of the application-specific consequences of event interpretation, all of which are described in detail below. In such an embodiment, the pushback system is integrated with additional spatial and gestural input-and-interface techniques.

Figure 2:
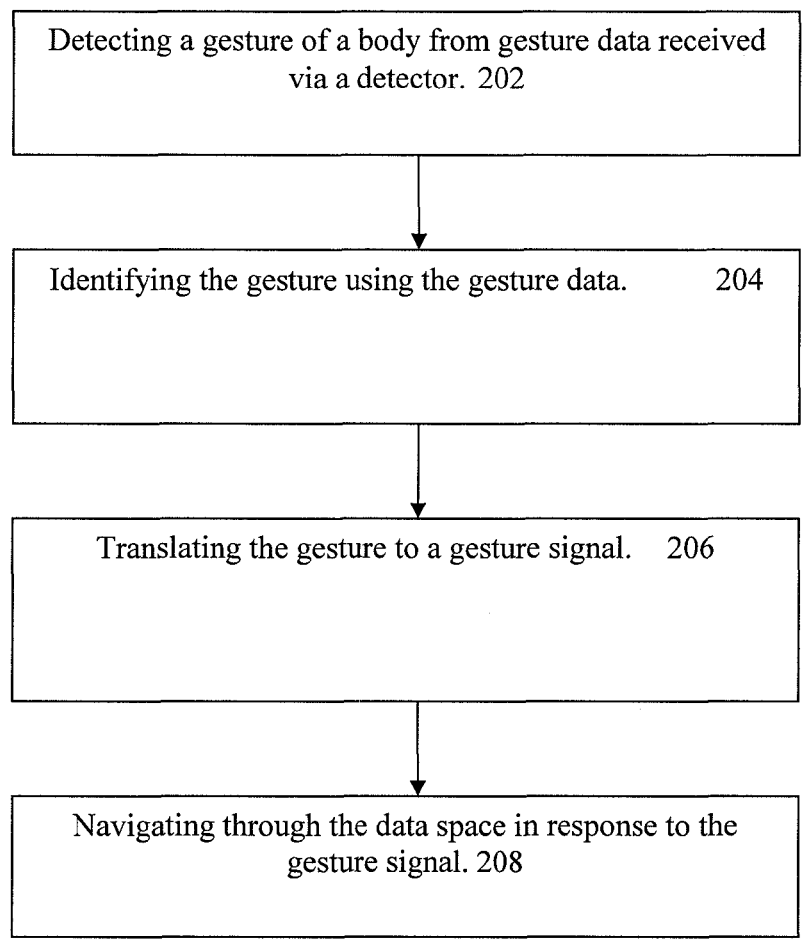
FIG. 2 is a flow diagram for navigating a data space using the gestural control system, under an embodiment.

FIG. 2 is a flow diagram for navigating a data space, under an embodiment. The navigating comprises detecting a gesture of a body from gesture data received via a detector 202. The gesture data is absolute three-space location data of an instantaneous state of the body at a point in time and physical space. The detecting comprises identifying the gesture using the gesture data 204. The navigating comprises translating the gesture to a gesture signal 206, and navigating through the data space in response to the gesture signal 208. The data space is a data-representational space comprising a dataset represented in the physical space.

When an embodiment's overall round-trip latency (hand motion to sensors to pose analysis to pushback interpretation system to computer graphics rendering to display device back to operator's visual system) is kept low (e.g., an embodiment exhibits latency of approximately fifteen milliseconds) and when other parameters of the system are properly tuned, the perceptual consequence of pushback interaction is a distinct sense of physical causality: the SOE literalizes the physically resonant metaphor of pushing against a spring-loaded structure. The perceived causality is a highly effective feedback; along with other more abstract graphical feedback modalities provided by the pushback system, and with a deliberate suppression of certain degrees of freedom in the interpretation of operator movement, such feedback in turn permits stable, reliable, and repeatable use of both gross and fine human motor activity as a control mechanism.

In evaluating the context of the SUE, many datasets are inherently spatial: they represent phenomena, events, measurements, observations, or structure within a literal physical space. For other datasets that are more abstract or that encode literal yet non-spatial information, it is often desirable to prepare a representation (visual, aural, or involving other display modalities) some fundamental aspect of which is controlled by a single, scalar-valued parameter; associating that parameter with a spatial dimension is then frequently also beneficial. It is manipulation of this single scalar parameter, as is detailed below, which benefits from manipulation by means of the pushback mechanism.

Representations may further privilege a small plurality of discrete values of their parameter—indeed, sometimes only one—at which the dataset is optimally regarded. In such cases it is useful to speak of a 'detented parameter' or, if the parameter has been explicitly mapped onto one dimension of a representational space, of 'detented space'. Use of the term 'detented' herein is intended to evoke not only the preferential quantization of the parameter but also the visuo-haptic sensation of ratchets, magnetic alignment mechanisms, jog-shuttle wheels, and the wealth of other worldly devices that are possessed of deliberate mechanical detents.

Self-evident yet crucially important examples of such parameters include but are not limited to (1) the distance of a synthetic camera, in a computer graphics environment, from a renderable representation of a dataset; (2) the density at which data is sampled from the original dataset and converted into renderable form; (3) the temporal index at which samples are retrieved from a time-varying dataset and converted to a renderable representation. These are universal approaches; countless domain-specific parameterizations also exist.

The pushback of the SOE generally aligns the dataset's parameter-control axis with a locally relevant 'depth dimension' in physical space, and allows structured real-world motion along the depth dimension to effect a data-space translation along the control axis. The result is a highly efficient means for navigating a parameter space. Following are detailed descriptions of representative embodiments of the pushback as implemented in the SOE.

Figure 3:
FIG. 3 is an example data frame rendered on a display, under an embodiment.

In a pushback example, an operator stands at a comfortable distance before a large wall display on which appears a single 'data frame' comprising text and imagery, which graphical data elements may be static or dynamic. FIG. 3 is an example data frame 310 rendered on a display 300, under an embodiment. The data frame 310 of this example includes an image, but is not so limited. The data frame 310, itself a two-dimensional construct, is nonetheless resident in a three-dimensional computer graphics rendering environment whose underlying coordinate system has been arranged to coincide with real-world coordinates convenient for describing the room and its contents, including the display 300 and the operator.

Figure 4:
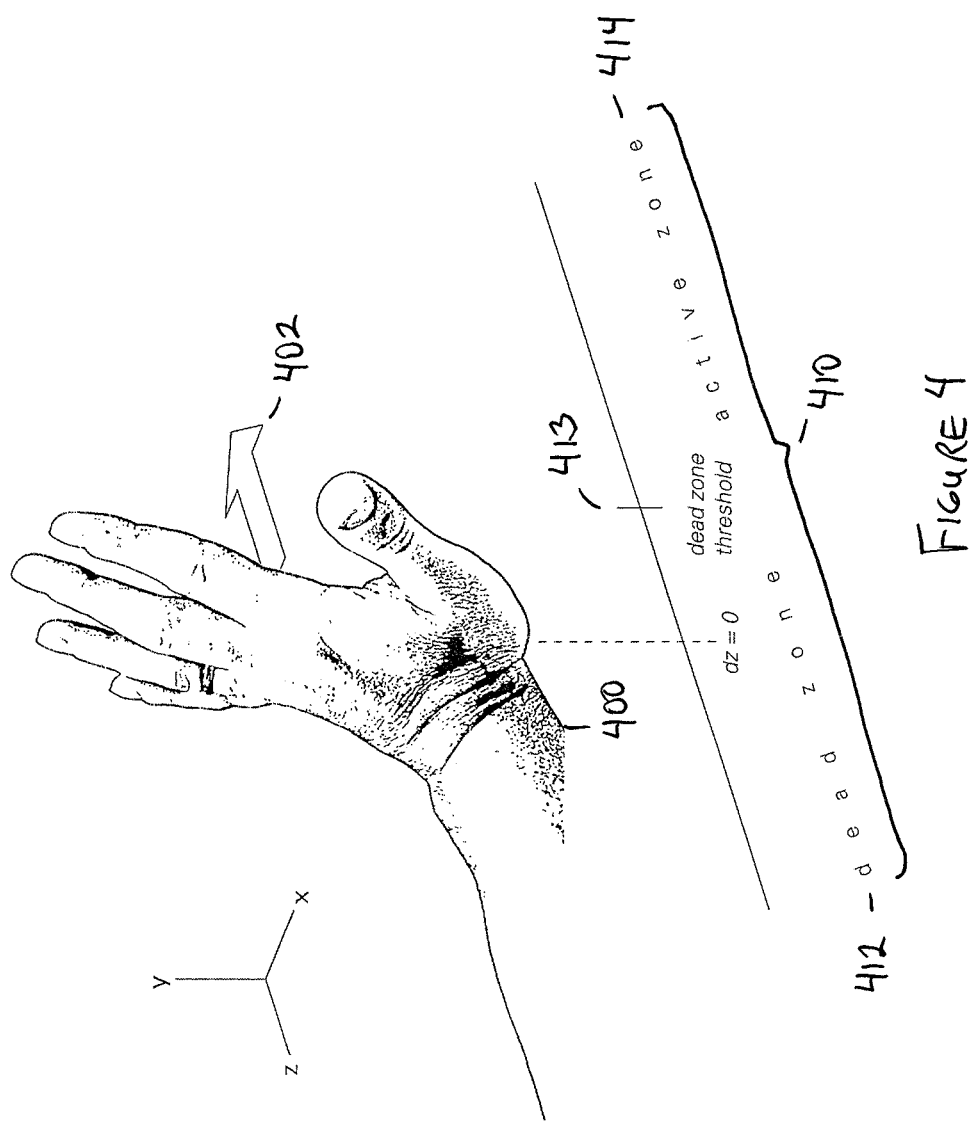
FIG. 4 shows a one-sided pushback scenario in which the body is an operator's hand in the open position, palm facing in a forward direction (along the z-axis) (e.g., toward a display screen in front of the operator), under an embodiment.

The operator's hands are tracked by sensors that resolve the position and orientation of her fingers, and possibly of the overall hand masses, to high precision and at a high temporal rate; the system analyzes the resulting spatial data in order to characterize the 'pose' of each hand—i.e. the geometric disposition of the fingers relative to each other and to the hand mass. While this example embodiment tracks an object that is a human hand(s), numerous other objects could be tracked as input devices in alternative embodiments. FIG. 4 shows a one-sided pushback scenario in which the body 400 is an operator's hand in the open position, palm facing in a forward direction (along the z-axis) (e.g., toward a display screen in front of the operator), under an embodiment. For the purposes of this description, the wall display (not shown) is taken to occupy the x and y dimensions; z describes the dimension between the operator and the display. The gestural interaction space 410 associated with this pushback embodiment comprises two spaces abutted at a plane of constant z; the detented interval space farther from the display (i.e. closer to the operator) is termed the 'dead zone' 412, while the closer half-space is the 'active zone' 414. The dead zone 412 extends indefinitely in the backward direction (toward the operator and away from the display) but only a finite distance forward, ending at the dead zone threshold 413. The active zone 414 extends from the dead zone threshold 413 forward to the display. The data frame(s) rendered on the display are interactively controlled or "pushed back" 402 by movements of the body in the active zone 414.

The data frame is constructed at a size and aspect ratio precisely matching those of the display, and is positioned and oriented so that its center and normal vector coincide with those physical attributes of the display, although the embodiment is not so limited. The virtual camera used to render the scene is located directly forward from the display and at roughly the distance of the operator. In this context, the rendered frame thus precisely fills the display.

Figure 6:
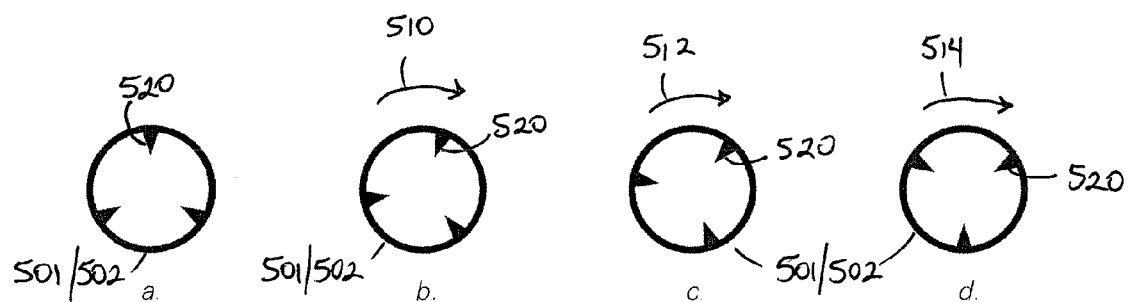
FIG. 6 (collectively FIGS. 6a, 6b, 6c, and 6d) is an example of the glyphs indicating body pushback gestures in the dead zone beyond the point of the dead zone threshold (along the z-axis toward the display and away from the operator), under an embodiment.

Arranged logically to the left and right of the visible frame are a number of additional coplanar data frames, uniformly spaced and with a modest gap separating each from its immediate neighbors (see FIGS. 6, 7, and 8 described below). Because they lie outside the physical/virtual rendering bounds of the computer graphics rendering geometry, these laterally displaced adjacent data frames are not initially visible. As will be seen, the data space—given its geometric structure—is possessed of a single natural detent in the z-direction and a plurality of x-detents.

The operator raises her left hand, held in a loose first pose, to her shoulder. She then extends the fingers so that they point upward and the thumb so that it points to the right; her palm faces the screen (in the gestural description language described in detail below, this pose transition would be expressed as [^^^>:x^ into ||||-:x^]). The system, detecting the new pose, triggers pushback interaction and immediately records the absolute three-space hand position at which the pose was first entered: this position is used as the 'origin' from which subsequent hand motions will be reported as relative offsets.

Figure 5:
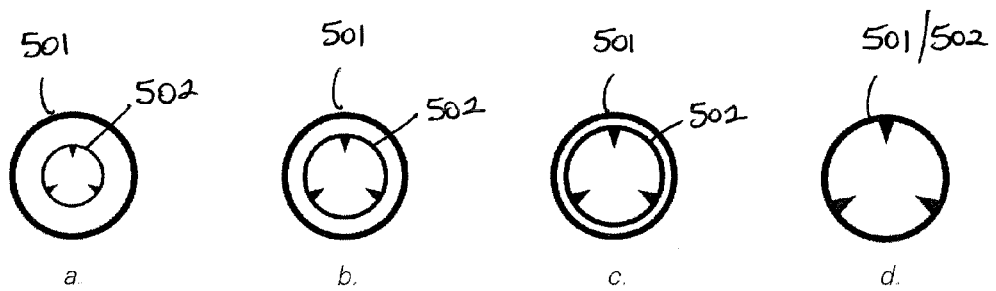
FIG. 5 (collectively FIGS. 5a, 5b, 5c, and 5d) is an example of the glyphs indicating body pushback gestures in the dead zone up to a point of the dead zone threshold, under an embodiment.

Immediately, two concentric, partially transparent glyphs are superimposed on the center of the frame (and thus at the display's center). FIG. 5 is an example of the glyphs 501/502 indicating body pushback gestures in the dead zone up to a point of the dead zone threshold, under an embodiment. That the second glyph 502 is smaller than the first glyph 501 (see FIG. 5a) is an indication that the operator's hand resides in the dead zone, through which the pushback operation is not 'yet' engaged. As the operator moves her hand forward (toward the dead zone threshold and the display), the second glyph 502 incrementally grows (see FIGS. 5b, 5c, and 5d in sequence). The second glyph 502 is equivalent in size to the first glyph 501 (see FIG. 5d) at the point at which the operator's hand is at the dead zone threshold. The glyphs 501/502 of this example show the evolution of the glyph's concentric elements as the operator's hand travels forward from its starting position toward the dead zone threshold separating the dead zone from the active zone. The inner "toothy" part of the glyph 502 grows as the hand nears the threshold, and is arranged so that the radius of the inner glyph 502 and (static) outer glyph 501 precisely match as the hand reaches the threshold position.

The second glyph 502 shrinks in size inside the first glyph 501 as the operator moves her hand away from the dead zone threshold and away from the display, remaining however always concentric with the first glyph 501 and centered on the display (see FIGS. 5d, 5c, 5b, and 5a in sequence). Crucially, only the z-component of the operator's hand motion is mapped into the glyph's scaling; incidental x- and y-components of the hand motion make no contribution.

When the operator's hand traverses the forward threshold of the dead zone, crossing into the active zone, the pushback mechanism is engaged. The relative z-position of the hand (measured from the threshold) is subjected to a scaling function and the resulting value is used to effect a z-axis displacement of the data frame and its lateral neighbors, so that the rendered image of the frame is seen to recede from the display; the neighboring data frames also then become visible, 'filling in' from the edges of the display space—the constant angular subtent of the synthetic camera geometrically 'captures' more of the plane in which the frames lie as that plane moves away from the camera. The z-displacement is continuously updated, so that the operator, pushing her hand toward the display and pulling it back toward herself, perceives the lateral collection of frames receding and verging in direct response to her movements.

Figure 7:
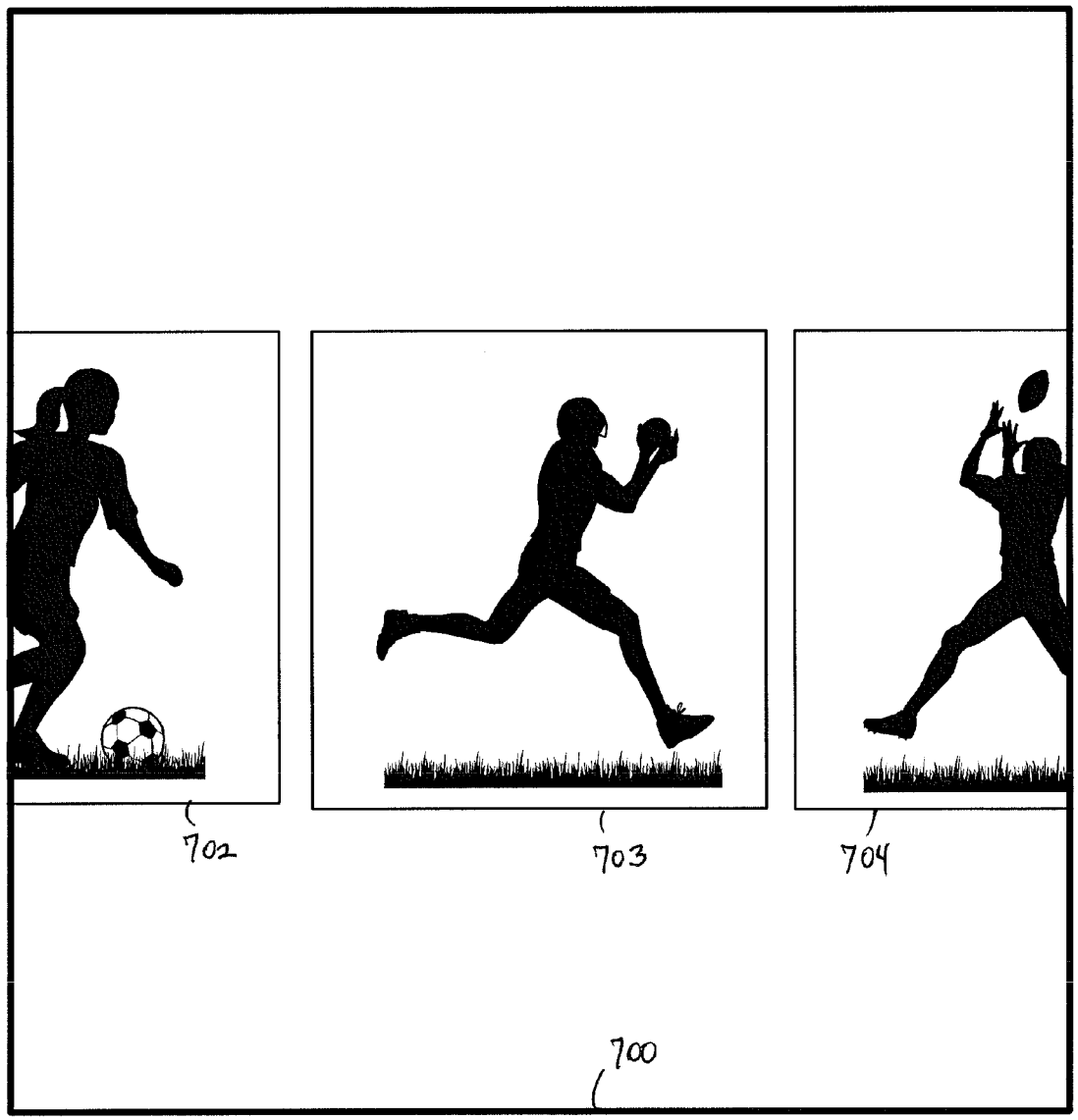
FIG. 7 is an example of a first relative z-axis displacement of the data frame resulting from corresponding pushback, under an embodiment.
Figure 8:
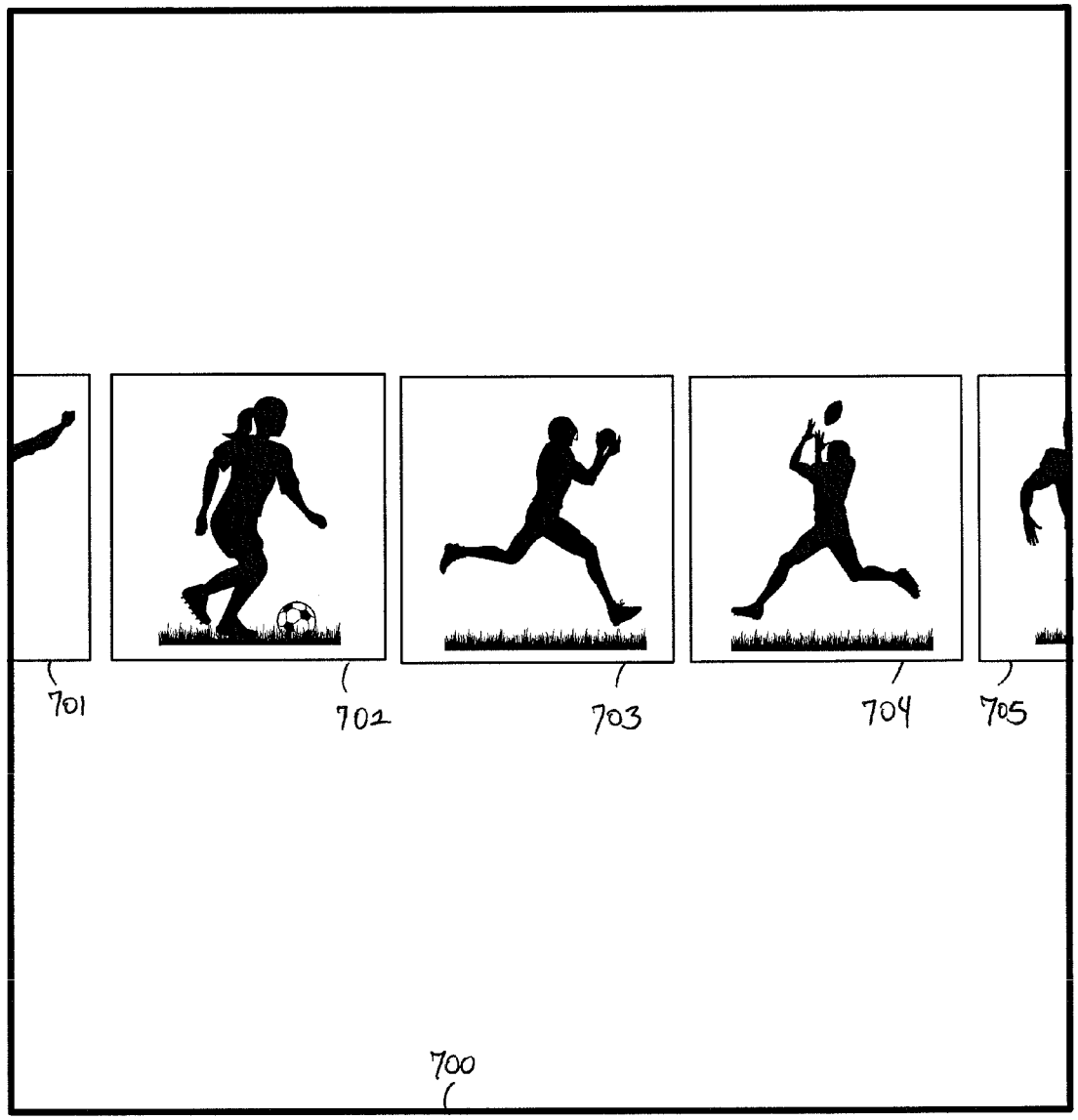
FIG. 8 is an example of a second relative z-axis displacement of the data frame resulting from corresponding pushback, under an embodiment.

FIG. 7 is an example of a first relative z-axis displacement of the data frame 703 resulting from corresponding pushback, under an embodiment. As described above, the rendered image of the data frame 703 is seen to recede from the display 700 and the neighboring data frames 702/704 become visible, 'filling in' from the edges of the display space. The neighboring data frames 702/704, which include a number of additional coplanar data frames, are arranged logically to the left and right of the visible frame, uniformly spaced and with a modest gap separating each from its immediate neighbors. FIG. 8 is an example of a second relative z-axis displacement of the data frame 703 resulting from corresponding pushback, under an embodiment. Considering the first relative z-axis displacement, and assuming further pushing of the operator's hand (pushing further along the z-axis toward the display and away from the operator) from that pushing resulting in the first relative z-axis displacement, the rendered image of the frame 703 is seen to further recede from the display 700 so that additional neighboring data frames 701/705 become visible, further 'filling in' from the edges of the display space.

The paired concentric glyphs, meanwhile, now exhibit a modified feedback: with the operator's hand in the active zone, the second glyph 502 switches from scaling-based reaction to a rotational reaction in which the hand's physical z-axis offset from the threshold is mapped into a positive (in-plane) angular offset. FIG. 6 is an example of the glyphs 501/502 indicating body pushback gestures in the dead zone beyond the point of the dead zone threshold (along the z-axis toward the display and away from the operator), under an embodiment. The glyphs 501/502 of this example depict the evolution of the glyph once the operator's hand has crossed the dead zone threshold—i.e. when the pushback mechanism has been actively engaged. The operator's hand's movements toward and away from the display are thus visually indicated by clockwise and anticlockwise rotation of the second glyph 502 (with the first glyph, as before, providing a static reference state), such that the "toothy" element 520 of the glyph rotates as a linear function of the hand's offset from the threshold, turning linear motion into a rotational representation.

Therefore, in this example, an additional first increment of hand movement along the z-axis toward the display is visually indicated by an incremental clockwise rotation 510 of the second glyph 502 (with the first glyph, as before, providing a static reference state), such that the "toothy" element 520 of the glyph rotates a first amount corresponding to a linear function of the hand's offset from the threshold. An additional second increment of hand movement along the z-axis toward the display is visually indicated by an incremental clockwise rotation 512 of the second glyph 502 (with the first glyph, as before, providing a static reference state), such that the "toothy" element 520 of the glyph rotates a second amount corresponding to a linear function of the hand's offset from the threshold. Further, a third increment of hand movement along the z-axis toward the display is visually indicated by an incremental clockwise rotation 514 of the second glyph 502 (with the first glyph, as before, providing a static reference state), such that the "toothy" element 520 of the glyph rotates a third amount corresponding to a linear function of the hand's offset from the threshold.

Figure 9:
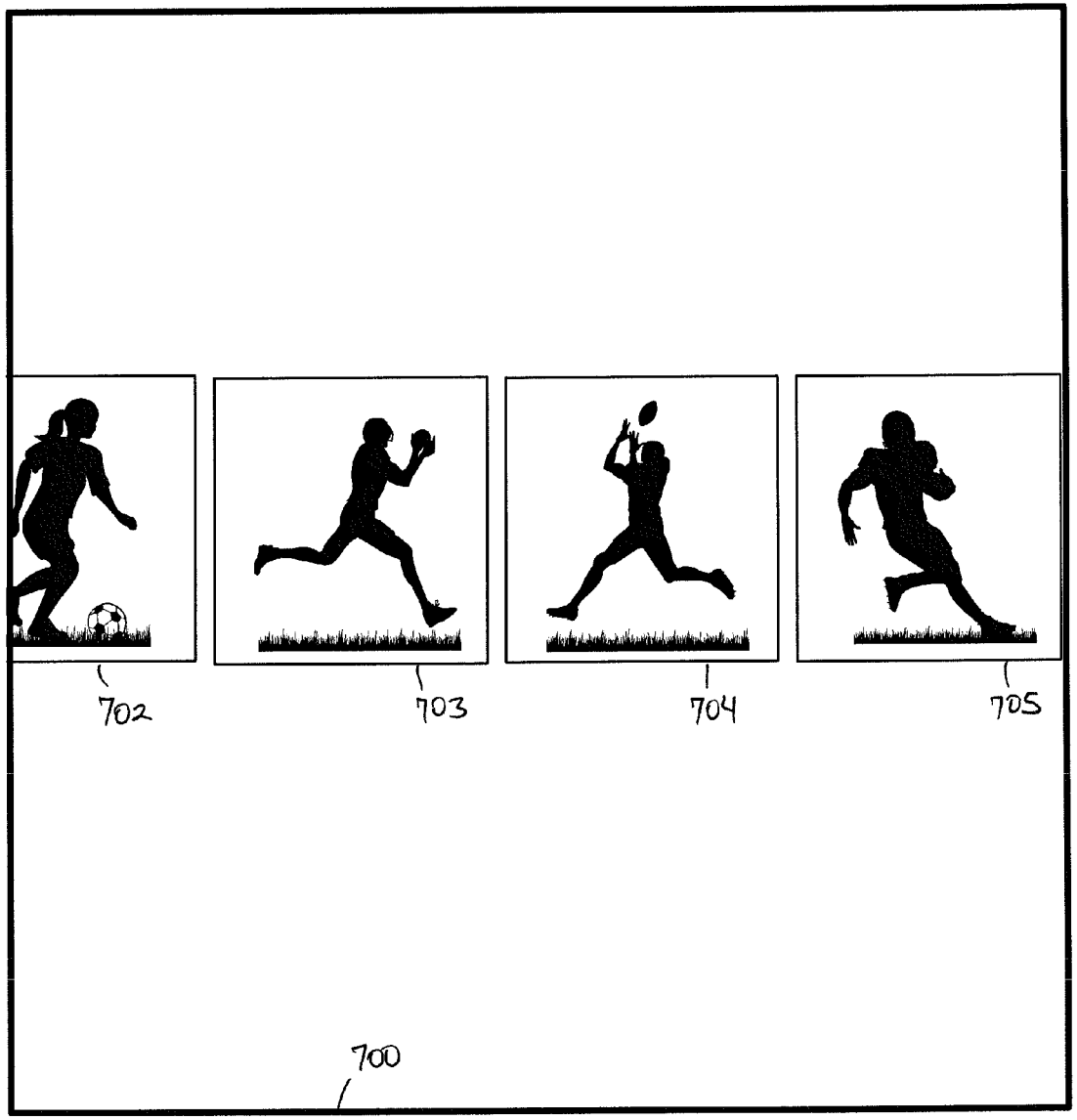
FIG. 9 is an example of a lateral x-axis displacement of the data frame resulting from lateral motion of the body, under an embodiment.

In this sample application, a secondary dimensional sensitivity is engaged when the operator's hand is in the active zone: lateral (x-axis) motion of the hand is mapped, again through a possible scaling function, to x-displacement of the horizontal frame sequence. If the scaling function is positive, the effect is one of positional 'following' of the operator's hand, and she perceives that she is sliding the frames left and right. FIG. 9 is an example of a lateral x-axis displacement of the data frame resulting from lateral motion of the body, under an embodiment. In this example of lateral data frame motion resulting from lateral body movement, the data frames slide from left to right such that particular data frames 701/702 disappear or partially disappear from view via the left edge of the display space 700 while additional data frames 705 fill in from the right edge of the display space 700.

Finally, when the operator causes her hand to exit the palm-forward pose (by, e.g., closing the hand into a fist), the pushback interaction is terminated and the collection of frames is rapidly returned to its original z-detent (i.e. coplanar with the display). Simultaneously, the frame collection is laterally adjusted to achieve x-coincidence of a single frame with the display; which frame ends thus 'display-centered' is whichever was closest to the concentric glyphs' center at the instant of pushback termination: the nearest x-detent. The glyph structure is here seen serving a second function, as a selection reticle, but the embodiment is not so limited. The z- and x-positions of the frame collection are typically allowed to progress to their final display-coincident values over a short time interval in order to provide a visual sense of 'spring-loaded return'.

The pushback system as deployed in this example provides efficient control modalities for (1) acquiring cognitively valuable 'neighborhood context' by variably displacing an aggregate dataset along the direct visual sightline—the depth dimension—thereby bringing more of the dataset into view (in exchange for diminishing the angular subtent of any given part of the dataset); (2) acquiring neighborhood context by variably displacing the laterally-arrayed dataset along its natural horizontal dimension, maintaining the angular subtent of any given section of data but trading the visibility of old data for that of new data, in the familiar sense of 'scrolling'; (3) selecting discretized elements of the dataset through rapid and dimensionally-constrained navigation.

In another example of the pushback of an embodiment, an operator stands immediately next to a waist-level display device whose active surface lies in a horizontal plane parallel to the floor. The coordinate system is here established in a way consistent with that of the previous example: the display surface lies in the x-z plane, so that the y-axis, representing the normal to the surface, is aligned in opposition to the physical gravity vector.

Figure 10:
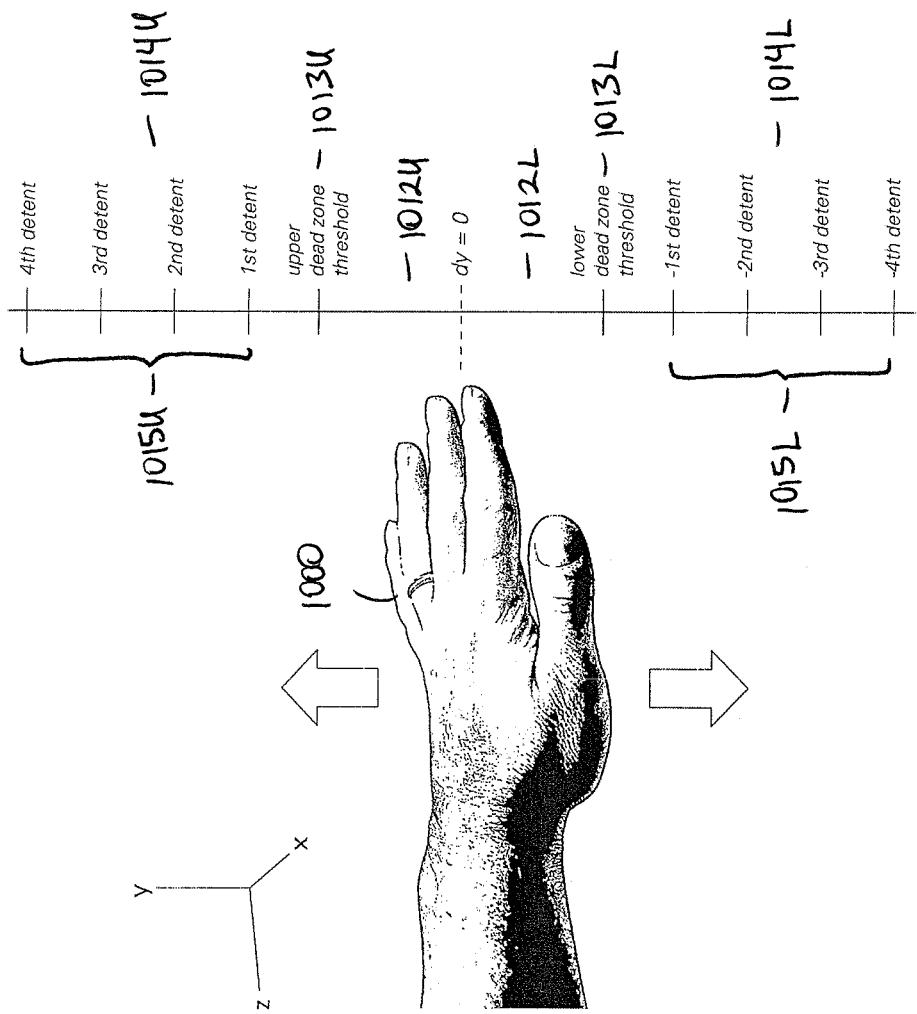
FIG. 10 shows an example physical scenario in which the body is held horizontally above a table-like display surface (not shown), under an embodiment.

FIG. 10 shows an example physical scenario in which the body 1000 is held horizontally above a table-like display surface (not shown), under an embodiment. In this example the body 1000 is an operator's hand, but the embodiment is not so limited. The pushback interaction is double-sided, so that there is an upper dead zone threshold 1013U and a lower dead zone threshold 1013L. Additionally, the linear space accessed by the pushback maneuver is provided with discrete spatial detents 1015U (e.g., "$1^{st}$ detent", "$2^{nd}$ detent", "$3^{rd}$ detent", "$4^{th}$ detent") in the upper active zone 1014U, and discrete spatial detents 1015L (e.g., "$1^{st}$ detent", "$2^{nd}$ detent", "$3^{rd}$ detent", "$4^{th}$ detent") in the lower active zone 1014L. The interaction space of an embodiment is configured so that a relatively small dead zone comprising an upper dead zone 1012U and a lower dead zone 1012L is centered at the vertical (y-axis) position at which pushback is engaged, with an active zone 1014U above the dead zone and an active zone 1014L below the dead zone.

The operator is working with an example dataset that has been analyzed into a stack of discrete parallel planes (see FIG. 10 described below) that are the data frames. The dataset may be arranged that way as a natural consequence of the physical reality it represents (e.g. discrete slices from a tomographic scan, the multiple layers of a three-dimensional integrated circuit, etc.) or because it is logical or informative to separate and discretize the data (e.g., satellite imagery acquired in a number of spectral bands, geographically organized census data with each decade's data in a separate layer, etc.). The visual representation of the data may further be static or include dynamic elements.

During intervals when pushback functionality is not engaged, a single layer is considered 'current' and is represented with visual prominence by the display, and is perceived to be physically coincident with the display. Layers above and below the current layer are in this example not visually manifest (although a compact iconography is used to indicate their presence).

The operator extends his closed right hand over the display; when he opens the hand—fingers extended forward, thumb to the left, and palm pointed downward (transition: [^^^>:vx into ‖‖-:vx])—the pushback system is engaged. During a brief interval (e.g., 200 milliseconds), some number of layers adjacent to the current layer fade up with differential visibility; each is composited below or above with a blur filter and a transparency whose 'severities' are dependent on the layer's ordinal distance from the current layer.

Figure 11:
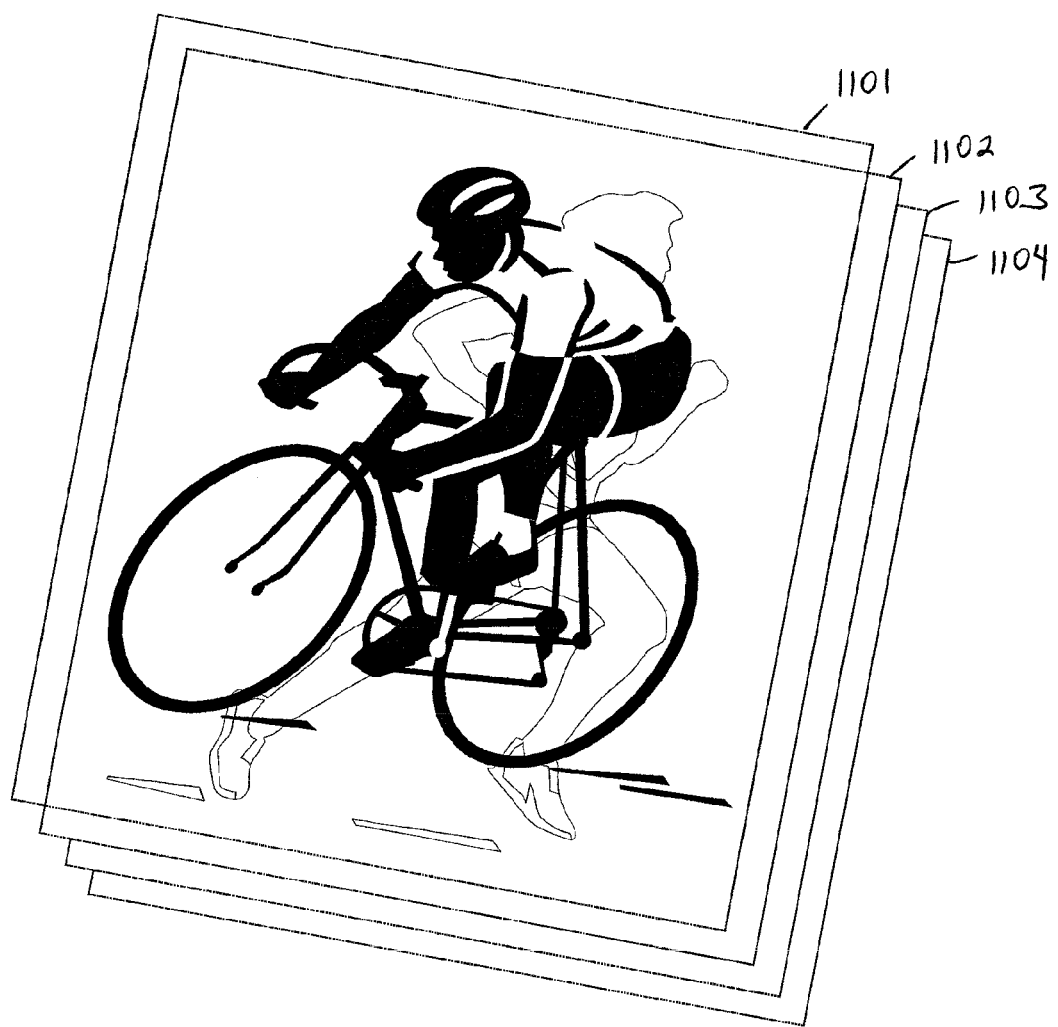
FIG. 11 is an example of a layer (e.g., data frame) adjacent to the current layer (e.g., current data frame) fading up with differential visibility as the pushback system is engaged, under an embodiment.

FIG. 11 is an example of a layer 1102 (e.g., data frame 1102) adjacent to the current layer 1101 (e.g., data frame 1101) fading up with differential visibility as the pushback system is engaged, under an embodiment. In this example, the stack comprises numerous data frames 1101-110X (where X is any number as appropriate to datasets of the data frames; in this example X is 5 such that the stack comprises data frames 1101, 1102, 1103, 1104, and 1105) that can be traversed using the pushback system.

Simultaneously, the concentric feedback glyphs familiar from the previous example appear; in this case, the interaction is configured so that a small dead zone is centered at the vertical (y-axis) position at which pushback is engaged, with an active zone both above and below the dead zone. This arrangement provides assistance in 'regaining' the original layer. The glyphs are in this case accompanied by an additional, simple graphic that indicates directed proximity to successive layers.

While the operator's hand remains in the dead zone, no displacement of the layer stack occurs. The glyphs exhibit a 'preparatory' behavior identical to that in the preceding example, with the inner glyph growing as the hand nears either boundary of the zone (of course, here the behavior is double-sided and symmetric: the inner glyph is at a minimum scale at the hand's starting y-position and grows toward coincidence with the outer glyph whether the hand moves up or down).

As the operator's hand moves upward past the dead zone's upper plane, the inner glyph engages the outer glyph and, as before, further movement of the hand in that direction causes anticlockwise rotational motion of the inner glyph. At the same time, the layer stack begins to 'translate upward': those layers above the originally-current layer take on greater transparency and blur; the originally-current layer itself becomes more transparent and more blurred; and the layers below it move toward more visibility and less blur.

Figure 12:
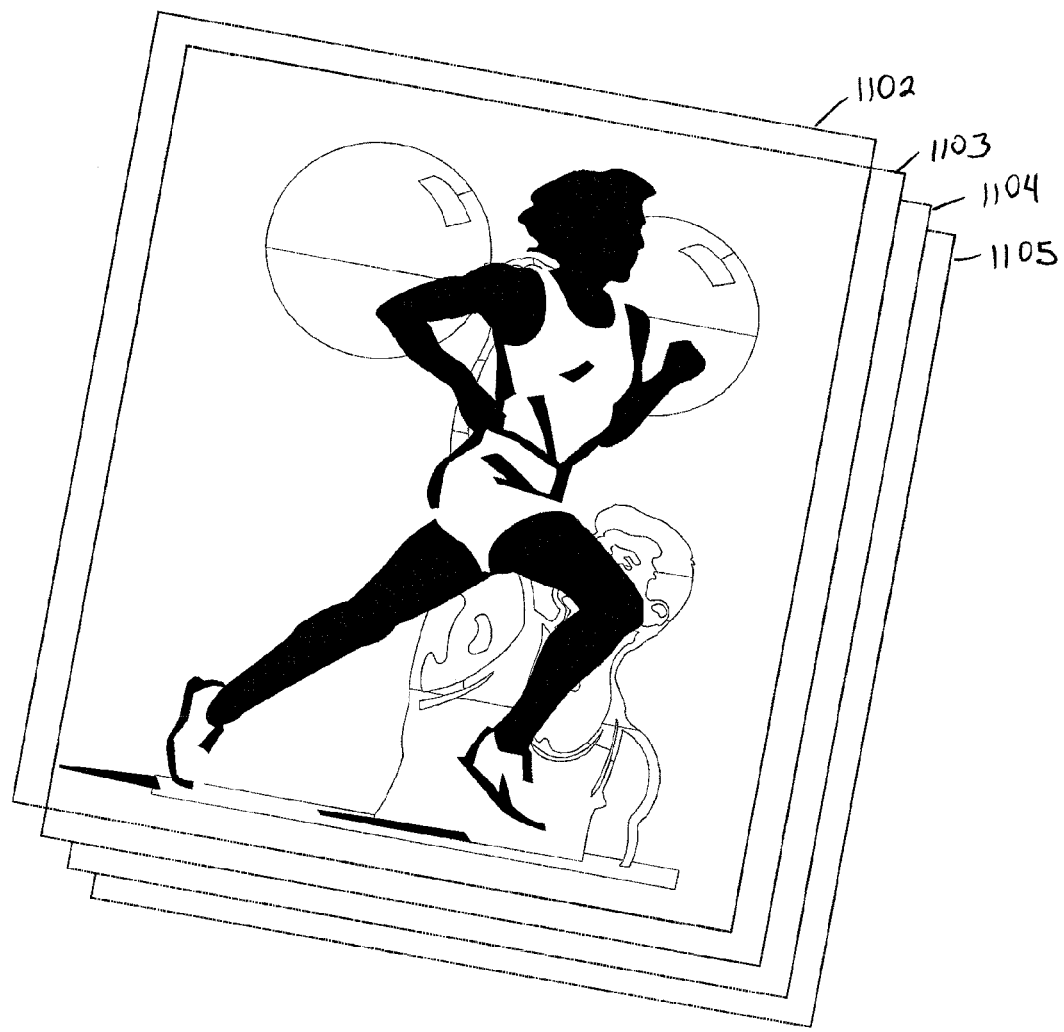
FIG. 12 is an example of upward translation of the stack in which the previously-current layer (e.g., previously-current data frame) takes on greater transparency (becomes invisible in this example), while the layer (e.g., adjacent data frame) adjacent to the previously-current layer becomes visible as the presently-current layer, under an embodiment.

FIG. 12 is an example of upward translation of the stack in which the previously-current layer 1101 (e.g., data frame 1101) (not shown, see FIG. 11) takes on greater transparency (becomes invisible in this example), while the layer 1102 (e.g., data frame 1102) adjacent to the previously-current layer 1101 becomes visible as the presently-current layer, under an embodiment. Additionally, layer 1103 (e.g., data frame 1103) adjacent to the presently-current layer 1102 fades up with differential visibility as the stack translates upward. As described above, the stack comprises numerous data frames 1101-110X (where X is any number as appropriate to datasets of the data frames; in this example X is 5 such that the stack comprises data frames 1101, 1102, 1103, 1104, and 1105) that can be traversed using the pushback system.

The layer stack is configured with a mapping between real-world distances (i.e. the displacement of the operator's hand from its initial position, as measured in room coordinates) and the 'logical' distance between successive layers. The translation of the layer stack is, of course, the result of this mapping, as is the instantaneous appearance of the proximity graphic, which meanwhile indicates (at first) a growing distance between the display plane and the current layer; it also indicates that the display plane is at present below the current layer.

The hand's motion continues and the layer stack eventually passes the position at which the current layer and the next one below exactly straddle (i.e. are equidistant from) the display plane; just past this point the proximity graphic changes to indicate that the display plane is now higher than the current layer: 'current layer status' has now been assigned to the next lower layer. In general, the current layer is always the one closest to the physical display plane, and is the one that will be 'selected' when the operator disengages the pushback system.

As the operator continues to raise his hand, each consecutive layer is brought toward the display plane, becoming progressively more resolved, gaining momentary coincidence with the display plane, and then returning toward transparency and blur in favor of the next lower layer. When the operator reverses the direction of his hand's motion, lowering it, the process is reversed, and the inner glyph rotates clockwise. As the hand eventually passes through the dead zone the stack halts with the originally-current layer in precise y-alignment with the display plane; and then y-travel of the stack resumes, bringing into successive focus those planes above the originally-current layer. The operator's overall perception is strongly and simply that he is using his hand to push down and pull up a stack of layers.

When at last the operator releases pushback by closing his hand (or otherwise changing its pose) the system 'springs' the stack into detented y-axis alignment with the display plane, leaving as the current layer whichever was closest to the display plane as pushback was exited. During the brief interval of this positional realignment, all other layers fade back to complete transparency and the feedback glyphs smoothly vanish.

The discretized elements of the dataset (here, layers) of this example are distributed along the principal pushback (depth) axis; previously, the elements (data frames) were coplanar and arrayed laterally, along a dimension orthogonal to the depth axis. This present arrangement, along with the deployment of transparency techniques, means that data is often superimposed—some layers are viewed through others. The operator in this example nevertheless also enjoys (1) a facility for rapidly gaining neighborhood context (what are the contents of the layers above and below the current layer?); and (2) a facility for efficiently selecting and switching among parallel, stacked elements in the dataset. When the operator intends (1) alone, the provision of a dead zone allows him to return confidently to the originally selected layer. Throughout the manipulation, the suppression of two translational dimensions enables speed and accuracy (it is comparatively difficult for most humans to translate a hand vertically with no lateral drift, but the modality as described simply ignores any such lateral displacement).

It is noted that for certain purposes it may be convenient to configure the pushback input space so that the dead zone is of infinitesimal extent; then, as soon as pushback is engaged, its active mechanisms are also engaged. In the second example presented herein this would mean that the originally-current layer is treated no differently—once the pushback maneuver has begun—from any other. Empirically, the linear extent of the dead zone is a matter of operator preference.

The modalities described in this second example are pertinent across a wide variety of displays, including both two-dimensional (whether projected or emissive) and three-dimensional (whether autostereoscopic or not, aerial-image-producing or not, etc.) devices. In high-quality implementations of the latter—i.e. 3D—case, certain characteristics of the medium can vastly aid the perceptual mechanisms that underlie pushback. For example, a combination of parallax, optical depth of field, and ocular accommodation phenomena can allow multiple layers to be apprehended simultaneously, thus eliminating the need to severely fade and blur (or indeed to exclude altogether) layers distant from the display plane. The modalities apply, further, irrespective of the orientation of the display: it may be principally horizontal, as in the example, or may just as usefully be mounted at eye-height on a wall.

An extension to the scenario of this second example depicts the usefulness of two-handed manipulation. In certain applications, translating either the entire layer stack or an individual layer laterally (i.e. in the x and z directions) is necessary. In an embodiment, the operator's other—that is, non-pushback—hand can effect this transformation, for example through a modality in which bringing the hand into close proximity to the display surface allows one of the dataset's layers to be 'slid around', so that its offset x-z position follows that of the hand.

Operators may generally find it convenient and easily tractable to undertake lateral translation and pushback manipulations simultaneously. It is perhaps not wholly fatuous to propose that the assignment of continuous-domain manipulations to one hand and discrete-style work to the other may act to optimize cognitive load.

It is informative to consider yet another example of pushback under the SOE in which there is no natural visual aspect to the dataset. Representative is the problem of monitoring a plurality of audio channels and of intermittently selecting one from among the collection. An application of the pushback system enables such a task in an environment outfitted for aural but not visual output; the modality is remarkably similar to that of the preceding example.

An operator, standing or seated, is listening to a single channel of audio. Conceptually, this audio exists in the vertical plane—called the 'aural plane'—that geometrically includes her ears; additional channels of audio are resident in additional planes parallel to the aural plane but displaced forward and back, along the z-axis.

Opening her hand, held nine inches in front of her, with palm facing forward, she engages the pushback system. The audio in several proximal planes fades up differentially; the volume of each depends inversely on its ordinal distance from the current channel's plane. In practice, it is perceptually unrealistic to allow more than two or four additional channels to become audible. At the same time, an 'audio glyph' fades up to provide proximity feedback. Initially, while the operator's hand is held in the dead zone, the glyph is a barely audible two-note chord (initially in unison).

As the operator moves her hand forward or backward through the dead zone, the volumes of the audio channels remain fixed while that of the glyph increases. When the hand crosses the front or rear threshold of the dead zone, the glyph reaches its 'active' volume (which is still subordinate to the current channel's volume).

Once the operator's hand begins moving through the active zone—in the forward direction, say—the expected effect on the audio channels obtains: the current channel plane is pushed farther from the aural plane, and its volume (and the volumes of those channels still farther forward) is progressively reduced. The volume of each 'dorsal' channel plane, on the other hand, increases as it nears the aural plane.

The audio glyph, meanwhile, has switched modes. The hand's forward progress is accompanied by the rise in frequency of one of the tones; at the 'midway point', when the aural plane bisects one audio channel plane and the next, the tones form an exact fifth (mathematically, it should be a tritone interval, but there is an abundance of reasons that this is to be eschewed). The variable tone's frequency continues rising as the hand continues farther forward, until eventually the operator 'reaches' the next audio plane, at which point the tones span precisely an octave.

Audition of the various channels proceeds, the operator translating her hand forward and back to access each in turn. Finally, to select one she merely closes her hand, concluding the pushback session and causing the collection of audio planes to 'spring' into alignment. The other (non-selected) channels fade to inaudibility, as does the glyph.

This example has illustrated a variant on pushback application in which the same facilities are again afforded: access to neighborhood context and rapid selection of discretized data element (here, an individual audio stream). The scenario substitutes an aural feedback mechanism, and in particular one that exploits the reliable human capacity for discerning certain frequency intervals, to provide the operator with information about whether she is 'close enough' to a target channel to make a selection. This is particularly important in the case of voice channels, in which 'audible' signals are only intermittently present; the continuous nature of the audio feedback glyph leaves it present and legible even when the channel itself has gone silent.

It is noted that if the SOE in this present example includes the capacity for spatialized audio, the perception of successive audio layers receding into the forward distance and approaching from the back (or vice versa) may be greatly enhanced. Further, the opportunity to more literally 'locate' the selected audio plane at the position of the operator, with succeeding layers in front of the operator and preceding layers behind, is usefully exploitable.

Other instantiations of the audio glyph are possible, and indeed the nature of the various channels' contents, including their spectral distributions, tends to dictate which kind of glyph will be most clearly discernible. By way of example, another audio glyph format maintains constant volume but employs periodic clicking, with the interval between clicks proportional to the proximity between the aural plane and the closest audio channel plane. Finally, under certain circumstances, and depending on the acuity of the operator, it is possible to use audio pushback with no feedback glyph at all.

With reference to the pushback mechanism, as the number and density of spatial detents in the dataset's representation increases toward the very large, the space and its parameterization becomes effectively continuous—that is to say, non-detented. Pushback remains nonetheless effective at such extremes, in part because the dataset's 'initial state' prior to each invocation of pushback may be treated as a temporary detent, realized simply as a dead zone.

An application of such non-detented pushback may be found in connection with the idea of an infinitely (or at least substantially) zoomable diagram. Pushback control of zoom functionality associates offset hand position with affine scale value, so that as the operator pushes his hand forward or back the degree of zoom decreases or increases (respectively). The original, pre-pushback zoom state is always readily accessible, however, because the direct mapping of position to zoom parameter insures that returning the control hand to the dead zone also effects return of the zoom value to its initial state.

Each scenario described in the examples above provides a description of the salient aspects of the pushback system and its use under the SOE. It should further be understood that each of the maneuvers described herein can be accurately and comprehensibly undertaken in a second or less, because of the efficiency and precision enabled by allowing a particular kind of perceptual feedback to guide human movement. At other times, operators also find it useful to remain in a single continuous pushback 'session' for tens of seconds: exploratory and context-acquisition goals are well served by pushback over longer intervals.

The examples described above employed a linear mapping of physical input (gesture) space to representational space: translating the control hand by A units in real space always results in a translation by B units [prime] in the representational space, irrespective of the real-space position at which the A-translation is undertaken. However, other mappings are possible. In particular, the degree of fine motor control enjoyed by most human operators allows the use of nonlinear mappings, in which for example differential gestural translations far from the active threshold can translate into larger displacements along the parameterized dimension than do gestural translations near the threshold.

Marker Tags

The SOE or an embodiment contemplates the use of marker tags on one or more fingers of the user so that the system can locate the hands of the user, identify whether it is viewing a left or right hand, and which fingers are visible. This permits the system to detect the location, orientation, and movement of the user's hands. This information allows a number of gestures to be recognized by the system and used as commands by the user.

The marker tags in one embodiment are physical tags comprising a substrate (appropriate in the present embodiment for affixing to various locations on a human hand) and discrete markers arranged on the substrate's surface in unique identifying patterns.

The markers and the associated external sensing system may operate in any domain (optical, electromagnetic, magnetostatic, etc.) that allows the accurate, precise, and rapid and continuous acquisition of their three-space position. The markers themselves may operate either actively (e.g. by emitting structured electromagnetic pulses) or passively (e.g. by being optically retroreflective, as in the present embodiment).

At each frame of acquisition, the detection system receives the aggregate 'cloud' of recovered three-space locations comprising all markers from tags presently in the instrumented workspace volume (within the visible range of the cameras or other detectors). The markers on each tag are of sufficient multiplicity and are arranged in unique patterns such that the detection system can perform the following tasks: (1) segmentation, in which each recovered marker position is assigned to one and only one subcollection of points that form a single tag; (2) labeling, in which each segmented subcollection of points is identified as a particular tag; (3) location, in which the three-space position of the identified tag is recovered; and (4) orientation, in which the three-space orientation of the identified tag is recovered. Tasks (1) and (2) are made possible through the specific nature of the marker-patterns, as described below with reference to FIG. 2.

The markers on the tags in one embodiment are affixed at a subset of regular grid locations. This underlying grid may, as in the present embodiment, be of the traditional Cartesian sort; or may instead be some other regular plane tessellation (a triangular/hexagonal tiling arrangement, for example). The scale and spacing of the grid is established with respect to the known spatial resolution of the marker-sensing system, so that adjacent grid locations are not likely to be confused. Selection of marker patterns for all tags should satisfy the following constraint: no tag's pattern shall coincide with that of any other tag's pattern through any combination of rotation, translation, or mirroring. The multiplicity and arrangement of markers may further be chosen so that loss (or occlusion) of some specified number of component markers is tolerated: After any arbitrary transformation, it should still be unlikely to confuse the compromised module with any other.

Figure 13:
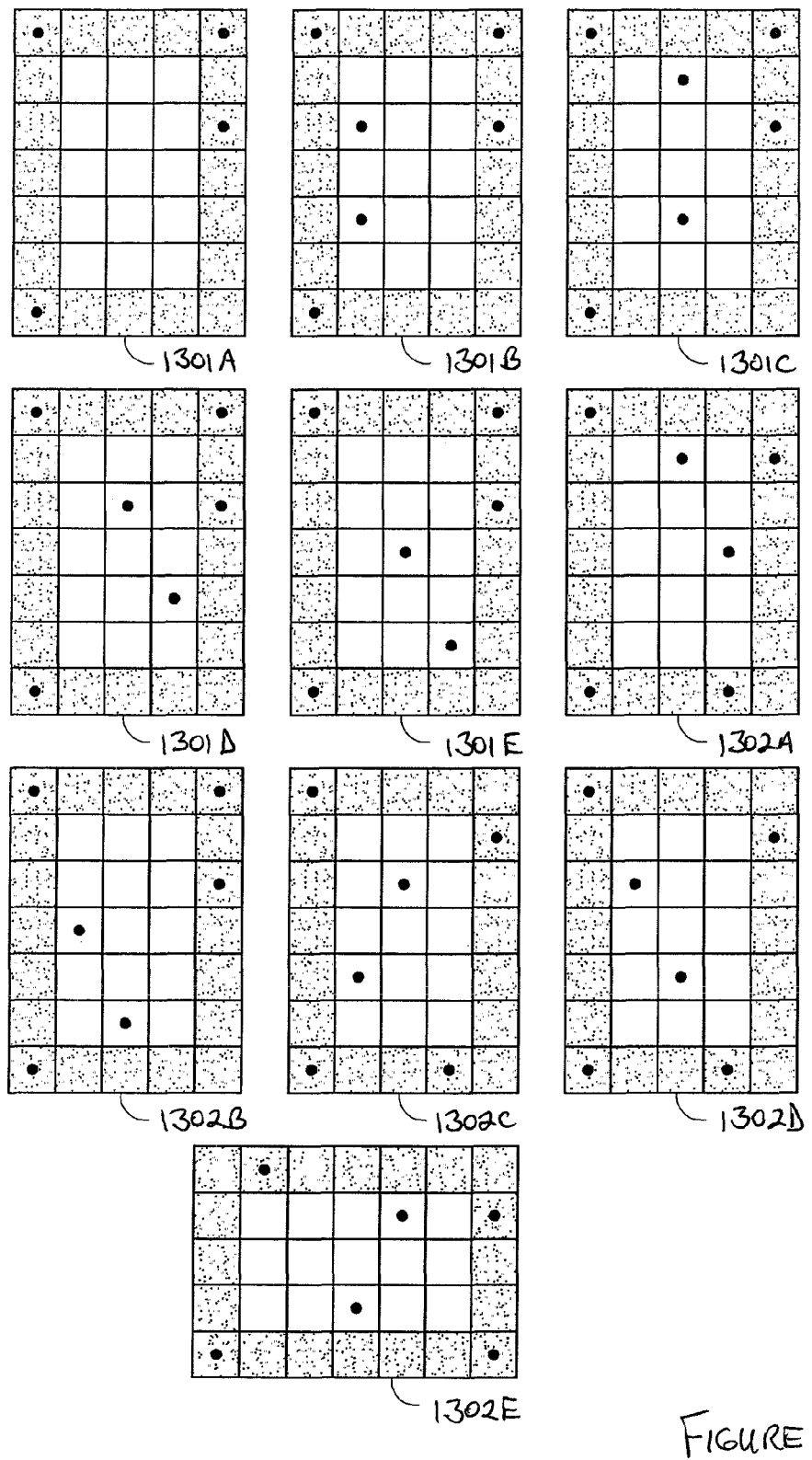
FIG. 13 is a diagram of marking tags, under an embodiment.

FIG. 13 is a diagram of marking tags, under an embodiment. Numerous tags 1301A-1301E (left hand) and 1302A-1302E (right hand) are shown, but the embodiment is not so limited. Each tag is rectangular and consists in this embodiment of a 5×7 grid array. The rectangular shape is chosen as an aid in determining orientation of the tag and to reduce the likelihood of mirror duplicates. In the embodiment shown, there are tags for each finger on each hand. In some embodiments, it may be adequate to use one, two, three, or four tags per hand. Each tag has a border of a different grey-scale or color shade. Within this border is a 3×5 grid array. Markers (represented by the black dots of FIG. 13) are disposed at certain points in the grid array to provide information.

Qualifying information may be encoded in the tags' marker patterns through segmentation of each pattern into 'common' and 'unique' subpatterns. For example, the present embodiment specifies two possible 'border patterns', distributions of markers about a rectangular boundary. A 'family' of tags is thus established—the tags intended for the left hand might thus all use the same border pattern as shown in tags 1301A-1301E while those attached to the right hand's fingers could be assigned a different pattern as shown in tags 1302A-1302E. This subpattern is chosen so that in all orientations of the tags, the left pattern can be distinguished from the right pattern. In the example illustrated, the left hand pattern includes a marker in each corner and on marker in a second from corner grid location. The right hand pattern has markers in only two corners and two markers in non corner grid locations. An inspection of the pattern reveals that as long as any three of the four markers are visible, the left hand pattern can be positively distinguished from the left hand pattern. In one embodiment, the color or shade of the border can also be used as an indicator of handedness.

Each tag must of course still employ a unique interior pattern, the markers distributed within its family's common border. In the embodiment shown, it has been found that two markers in the interior grid array are sufficient to uniquely identify each of the ten fingers with no duplication due to rotation or orientation of the fingers. Even if one of the markers is occluded, the combination of the pattern and the handedness of the tag yields a unique identifier.

In the present embodiment, the grid locations are visually present on the rigid substrate as an aid to the (manual) task of affixing each retroreflective marker at its intended location. These grids and the intended marker locations are literally printed via color inkjet printer onto the substrate, which here is a sheet of (initially) flexible 'shrink-film'. Each module is cut from the sheet and then oven-baked, during which thermal treatment each module undergoes a precise and repeatable shrinkage. For a brief interval following this procedure, the cooling tag may be shaped slightly—to follow the longitudinal curve of a finger, for example; thereafter, the substrate is suitably rigid, and markers may be affixed at the indicated grid points.

In one embodiment, the markers themselves are three dimensional, such as small reflective spheres affixed to the substrate via adhesive or some other appropriate means. The three-dimensionality of the markers can be an aid in detection and location over two dimensional markers. However either can be used without departing from the spirit and scope of the SOE described herein.

At present, tags are affixed via Velcro or other appropriate means to a glove worn by the operator or are alternately affixed directly to the operator's fingers using a mild double-stick tape. In a third embodiment, it is possible to dispense altogether with the rigid substrate and affix—or 'paint'—individual markers directly onto the operator's fingers and hands.

Gesture Vocabulary

The SOE of an embodiment contemplates a gesture vocabulary consisting of hand poses, orientation, hand combinations, and orientation blends. A notation language is also implemented for designing and communicating poses and gestures in the gesture vocabulary of the SOE. The gesture vocabulary is a system for representing instantaneous 'pose states' of kinematic linkages in compact textual form. The linkages in question may be biological (a human hand, for example; or an entire human body; or a grasshopper leg; or the articulated spine of a lemur) or may instead be nonbiological (e.g. a robotic arm). In any case, the linkage may be simple (the spine) or branching (the hand). The gesture vocabulary system of the SOE establishes for any specific linkage a constant length string; the aggregate of the specific ASCII characters occupying the string's 'character locations' is then a unique description of the instantaneous state, or 'pose', of the linkage.

Hand Poses

FIG. 14 shows hand poses in a gesture vocabulary of the SOE, under an embodiment. The SOE supposes that each of the five fingers on a hand is used. These fingers are codes as p-pinkie, r-ring finger, m-middle finger, i-index finger, and t-thumb. A number of poses for the fingers and thumbs are defined and illustrated in the gesture vocabulary of an embodiment. A gesture vocabulary string establishes a single character position for each expressible degree of freedom of the linkage (in this case, a finger). Further, each such degree of freedom is understood to be discretized (or 'quantized'), so that its full range of motion can be expressed through assignment of one of a finite number of standard ASCII characters at that string position. These degrees of freedom are expressed with respect to a body-specific origin and coordinate system (the back of the hand, the center of the grasshopper's body; the base of the robotic arm; etc.). A small number of additional gesture vocabulary character positions are therefore used to express the position and orientation of the linkage 'as a whole' in the more global coordinate system.

Numerous poses are defined and identified using ASCII characters. Some of the poses are divided between thumb and non-thumb. The SOE in this embodiment uses a coding such that the ASCII character itself is suggestive of the pose. However, any character may used to represent a pose, whether suggestive or not. In addition, there is no requirement in the invention to use ASCII characters for the notation strings. Any suitable symbol, numeral, or other representation maybe used without departing from the scope and spirit of the invention. For example, the notation may use two bits per finger if desired or some other number of bits as desired.

A curled finger is represented by the character "^" while a curled thumb by ">". A straight finger or thumb pointing up is indicated by "1" and at an angle by "\" or "/". "-" represents a thumb pointing straight sideways and "x" represents a thumb pointing into the plane.

Using these individual finger and thumb descriptions, a robust number of hand poses can be defined and written using the scheme of the invention. Each pose is represented by five characters with the order being p-r-m-i-t as described above. The hand held flat and parallel to the ground is represented by "11111". A first is represented by "^^^^>". An "OK" sign is represented by "111^>".

The character strings provide the opportunity for straightforward 'human readability' when using suggestive characters. The set of possible characters that describe each degree of freedom may generally be chosen with an eye to quick recognition and evident analogy. For example, a vertical bar ('|') would likely mean that a linkage element is 'straight', an ell ('L') might mean a ninety-degree bend, and a circumflex ('^') could indicate a sharp bend. As noted above, any characters or coding may be used as desired.

Any system employing gesture vocabulary strings such as described herein enjoys the benefit of the high computational efficiency of string comparison—identification of or search for any specified pose literally becomes a 'string compare' (e.g. UNIX's 'strcmp( )' function) between the desired pose string and the instantaneous actual string. Furthermore, the use of 'wildcard characters' provides the programmer or system designer with additional familiar efficiency and efficacy: degrees of freedom whose instantaneous state is irrelevant for a match may be specified as an interrogation point ('?'); additional wildcard meanings may be assigned.

Orientation

In addition to the pose of the fingers and thumb, the orientation of the hand can represent information. Characters describing global-space orientations can also be chosen transparently: the characters '<', '>', '^', and 'v' may be used to indicate, when encountered in an orientation character position, the ideas of left, right, up, and down. FIG. 15 is a diagram of orientation in a gesture vocabulary, under an embodiment. This orientation of the gesture vocabulary includes hand orientation descriptors and examples of coding that combines pose and orientation. In an embodiment of the invention, two character positions specify first the direction of the palm and then the direction of the fingers (if they were straight, irrespective of the fingers' actual bends). The possible characters for these two positions express a 'body-centric' notion of orientation: '-', '+', 'x', '*', '^', and 'v' describe medial, lateral, anterior (forward, away from body), posterior (backward, away from body), cranial (upward), and caudal (downward).

In the notation scheme of and embodiment of the invention, the five finger pose indicating characters are followed by a colon and then two orientation characters to define a complete command pose. In one embodiment, a start position is referred to as an "xyz" pose where the thumb is pointing straight up, the index finger is pointing forward and the middle finger is perpendicular to the index finger, pointing to the left when the pose is made with the right hand. This is represented by the string "^^x1-:-x".

'XYZ-hand' is a technique for exploiting the geometry of the human hand to allow full six-degree-of-freedom navigation of visually presented three-dimensional structure. Although the technique depends only on the bulk translation and rotation of the operator's hand—so that its fingers may in principal be held in any pose desired—the present embodiment prefers a static configuration in which the index finger points away from the body; the thumb points toward the ceiling; and the middle finger points left-right. The three fingers thus describe (roughly, but with clearly evident intent) the three mutually orthogonal axes of a three-space coordinate system: thus 'XYZ-hand'.

XYZ-hand navigation then proceeds with the hand, fingers in a pose as described above, held before the operator's body at a predetermined 'neutral location'. Access to the three translational and three rotational degrees of freedom of a three-space object (or camera) is effected in the following natural way: left-right movement of the hand (with respect to the body's natural coordinate system) results in movement along the computational context's x-axis; up-down movement of the hand results in movement along the controlled context's y-axis; and forward-back hand movement (toward/ away from the operator's body) results in z-axis motion within the context Similarly, rotation of the operator's hand about the index finger leads to a 'roll' change of the computational context's orientation; 'pitch' and 'yaw' changes are effected analogously, through rotation of the operator's hand about the middle finger and thumb, respectively.

Note that while 'computational context' is used here to refer to the entity being controlled by the XYZ-hand method—and seems to suggest either a synthetic three-space object or camera—it should be understood that the technique is equally useful for controlling the various degrees of freedom of real-world objects: the pan/tilt/roll controls of a video or motion picture camera equipped with appropriate rotational actuators, for example. Further, the physical degrees of freedom afforded by the XYZ-hand posture may be somewhat less literally mapped even in a virtual domain: In the present embodiment, the XYZ-hand is also used to provide navigational access to large panoramic display images, so that left-right and up-down motions of the operator's hand lead to the expected left-right or up-down 'panning' about the image, but forward-back motion of the operator's hand maps to 'zooming' control.

In every case, coupling between the motion of the hand and the induced computational translation/rotation may be either direct (i.e. a positional or rotational offset of the operator's hand maps one-to-one, via some linear or nonlinear function, to a positional or rotational offset of the object or camera in the computational context) or indirect (i.e. positional or rotational offset of the operator's hand maps one-to-one, via some linear or nonlinear function, to a first or higher-degree derivative of position/orientation in the computational context; ongoing integration then effects a non-static change in the computational context's actual zero-order position/orientation). This latter means of control is analogous to use of a an automobile's 'gas pedal', in which a constant offset of the pedal leads, more or less, to a constant vehicle speed.

The 'neutral location' that serves as the real-world XYZ-hand's local six-degree-of-freedom coordinate origin may be established (1) as an absolute position and orientation in space (relative, say, to the enclosing room); (2) as a fixed position and orientation relative to the operator herself (e.g. eight inches in front of the body, ten inches below the chin, and laterally in line with the shoulder plane), irrespective of the overall position and 'heading' of the operator; or (3) interactively, through deliberate secondary action of the operator (using, for example, a gestural command enacted by the operator's 'other' hand, said command indicating that the XYZ-hand's present position and orientation should henceforth be used as the translational and rotational origin).

It is further convenient to provide a 'detent' region (or 'dead zone') about the XYZ-hand's neutral location, such that movements within this volume do not map to movements in the controlled context.

Other poses may included: [|||||:vx] is a flat hand (thumb parallel to fingers) with palm facing down and fingers forward.

[|||||:x^] is a flat hand with palm facing forward and fingers toward ceiling.

[|||||:-x] is a flat hand with palm facing toward the center of the body (right if left hand, left if right hand) and fingers forward.

[^^^-:-x] is a single-hand thumbs-up (with thumb pointing toward ceiling).

[^^^|-:-x] is a mime gun pointing forward.

Two Hand Combination

The SOE of an embodiment contemplates single hand commands and poses, as well as two-handed commands and poses. FIG. 16 is a diagram of two hand combinations and corresponding notation in a gesture vocabulary of the SOE, under an embodiment. Reviewing the notation of the first example, "full stop" reveals that it comprises two closed fists. The "snapshot" example has the thumb and index finger of each hand extended, thumbs pointing toward each other, defining a goal post shaped frame. The "rudder and throttle start position" is fingers and thumbs pointing up palms facing the screen.

Orientation Blends

Figures 17, 18:
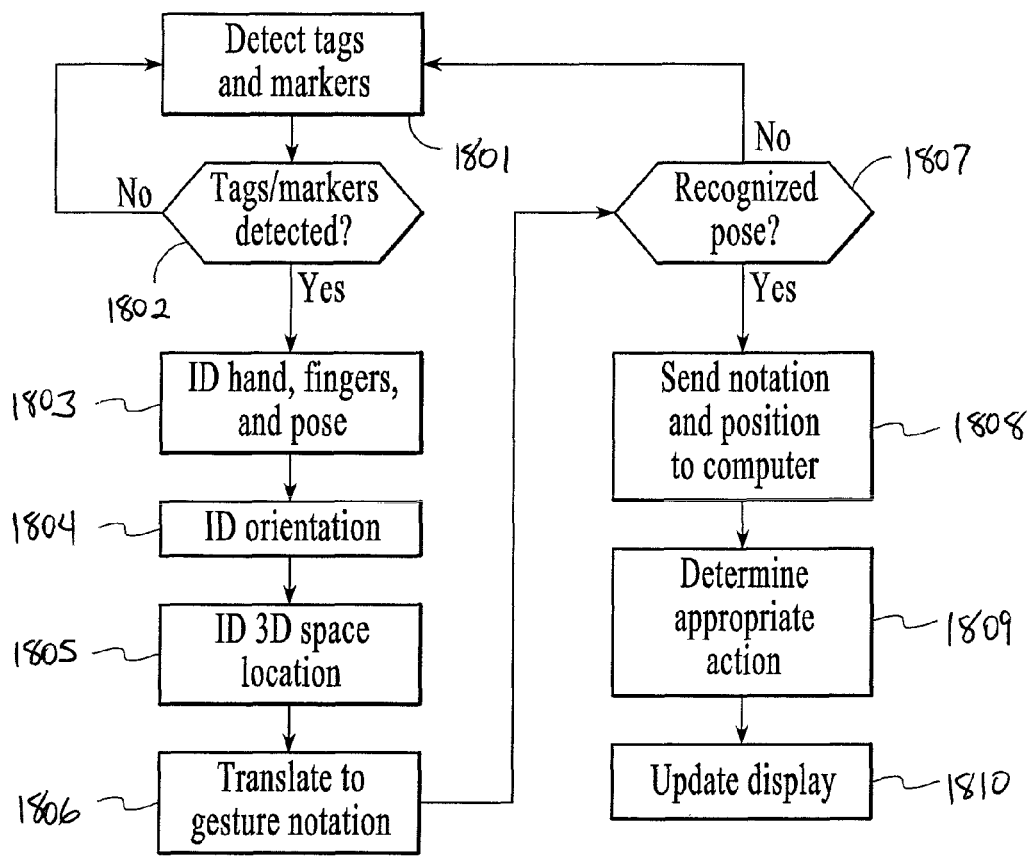
FIG. 17 is a diagram of orientation blends in a gesture vocabulary, under an embodiment.
FIG. 18 is a flow diagram of system operation, under an embodiment.

FIG. 17 is a diagram of orientation blends in a gesture vocabulary, under an embodiment. In the example shown the blend is represented by enclosing pairs of orientation notations in parentheses after the finger pose string. For example, the first command shows finger positions of all pointing straight. The first pair of orientation commands would result in the palms being flat toward the display and the second pair has the hands rotating to a 45 degree pitch toward the screen. Although pairs of blends are shown in this example, any number of blends is contemplated in the SOE.

Example Commands

FIG. 19 is an example of commands for use with the SOE, under an embodiment. Although some of the discussion here has been about controlling a cursor on a display, the SOE is not limited to that activity. In fact, the SOE has great application in manipulating any and all data and portions of data on a screen, as well as the state of the display. For example, the commands may be used to take the place of video controls during play back of video media. The commands may be used to pause, fast forward, rewind, and the like. In addition, commands may be implemented to zoom in or zoom out of an image, to change the orientation of an image, to pan in any direction, and the like. The SOE may also be used in lieu of menu commands such as open, close, save, and the like. In other words, any commands or activity that can be imagined can be implemented with hand gestures.

Operation

FIG. 18 is a flow diagram of system operation of the SOE, under an embodiment. At 1801 the detection system detects the markers and tags. At 1802 it is determined if the tags and markers are detected. If not, the operation returns to 1801. If the tags and markers are detected at 1802, the operation proceeds to 1803. At 1803 the system identifies the hand, fingers and the pose from the detected tags and markers. At 1804 the system identifies the orientation of the pose. At 1805 the system identifies the three dimensional spatial location of the hand or hands that are detected. (Please note that any or all of 1803, 1804, and 1805 may be combined as a single operation).

At 1806 the information is translated to the gesture notation described above. At 1807 it is determined if the pose is valid. This may be accomplished via a simple string comparison using the generated notation string. If the pose is not valid, operation returns to 1801. If the pose is valid, the system sends the notation and position information to the computer at 1808. At 1809 the computer determines the appropriate action to take in response to the gesture and updates the display accordingly at 1810.

In one embodiment of the SOE, operations 1801-1805 are accomplished by the on-camera processor. In other embodiments, the processing can be accomplished by the system computer if desired.

Parsing and Translation

The system is able to "parse" and "translate" a stream of low-level gestures recovered by an underlying system, and turn those parsed and translated gestures into a stream of command or event data that can be used to control a broad range of computer applications and systems. These techniques and algorithms may be embodied in a system consisting of computer code that provides both an engine implementing these techniques and a platform for building computer applications that make use of the engine's capabilities.

One embodiment is focused on enabling rich gestural use of human hands in computer interfaces, but is also able to recognize gestures made by other body parts (including, but not limited to arms, torso, legs and the head), as well as non-hand physical tools of various kinds, both static and articulating, including but not limited to calipers, compasses, flexible curve approximators, and pointing devices of various shapes. The markers and tags may be applied to items and tools that may be carried and used by the operator as desired.

The system described here incorporates a number of innovations that make it possible to build gestural systems that are rich in the range of gestures that can be recognized and acted upon, while at the same time providing for easy integration into applications.

The gestural parsing and translation system in one embodiment consists of:

1) a compact and efficient way to specify (encode for use in computer programs) gestures at several different levels of aggregation:
   a. a single hand's "pose" (the configuration and orientation of the parts of the hand relative to one another) a single hand's orientation and position in three-dimensional space.
   b. two-handed combinations, for either hand taking into account pose, position or both.
   c. multi-person combinations; the system can track more than two hands, and so more than one person can cooperatively (or competitively, in the case of game applications) control the target system.
   d. sequential gestures in which poses are combined in a series; we call these "animating" gestures.
   e. "grapheme" gestures, in which the operator traces shapes in space.

2) a programmatic technique for registering specific gestures from each category above that are relevant to a given application context.

3) algorithms for parsing the gesture stream so that registered gestures can be identified and events encapsulating those gestures can be delivered to relevant application contexts.

The specification system (1), with constituent elements (1a) to (1f), provides the basis for making use of the gestural parsing and translating capabilities of the system described here.

A single-hand "pose" is represented as a string of
   i) relative orientations between the fingers and the back of the hand,
   ii) quantized into a small number of discrete states.

Using relative joint orientations allows the system described here to avoid problems associated with differing hand sizes and geometries. No "operator calibration" is required with this system. In addition, specifying poses as a string or collection of relative orientations allows more complex gesture specifications to be easily created by combining pose representations with further filters and specifications.

Using a small number of discrete states for pose specification makes it possible to specify poses compactly as well as to ensure accurate pose recognition using a variety of underlying tracking technologies (for example, passive optical tracking using cameras, active optical tracking using lighted dots and cameras, electromagnetic field tracking, etc).

Gestures in every category (1a) to (1f) may be partially (or minimally) specified, so that non-critical data is ignored. For example, a gesture in which the position of two fingers is definitive, and other finger positions are unimportant, may be represented by a single specification in which the operative positions of the two relevant fingers is given and, within the same string, "wild cards" or generic "ignore these" indicators are listed for the other fingers.

All of the innovations described here for gesture recognition, including but not limited to the multi-layered specification technique, use of relative orientations, quantization of data, and allowance for partial or minimal specification at every level, generalize beyond specification of hand gestures to specification of gestures using other body parts and "manufactured" tools and objects.

The programmatic techniques for "registering gestures" (2) comprise a defined set of Application Programming Interface calls that allow a programmer to define which gestures the engine should make available to other parts of the running system.

These API routines may be used at application set-up time, creating a static interface definition that is used throughout the lifetime of the running application. They may also be used during the course of the run, allowing the interface characteristics to change on the fly. This real-time alteration of the interface makes it possible to,
   i) build complex contextual and conditional control states,
   ii) to dynamically add hysterisis to the control environment, and
   iii) to create applications in which the user is able to alter or extend the interface vocabulary of the running system itself.

Algorithms for parsing the gesture stream (3) compare gestures specified as in (1) and registered as in (2) against incoming low-level gesture data. When a match for a registered gesture is recognized, event data representing the matched gesture is delivered up the stack to running applications. Efficient real-time matching is desired in the design of this system, and specified gestures are treated as a tree of possibilities that are processed as quickly as possible.

In addition, the primitive comparison operators used internally to recognize specified gestures are also exposed for the applications programmer to use, so that further comparison (flexible state inspection in complex or compound gestures, for example) can happen even from within application contexts.

Recognition "locking" semantics are an innovation of the system described here. These semantics are implied by the registration API (2) (and, to a lesser extent, embedded within the specification vocabulary (1)). Registration API calls include,
   i) "entry" state notifiers and "continuation" state notifiers, and
   ii) gesture priority specifiers.

If a gesture has been recognized, its "continuation" conditions take precedence over all "entry" conditions for gestures of the same or lower priorities. This distinction between entry and continuation states adds significantly to perceived system usability.

The system described here includes algorithms for robust operation in the face of real-world data error and uncertainty. Data from low-level tracking systems may be incomplete (for a variety of reasons, including occlusion of markers in optical tracking, network drop-out or processing lag, etc).

Missing data is marked by the parsing system, and interpolated into either "last known" or "most likely" states, depending on the amount and context of the missing data.

If data about a particular gesture component (for example, the orientation of a particular joint) is missing, but the "last known" state of that particular component can be analyzed as physically possible, the system uses this last known state in its real-time matching.

Conversely, if the last known state is analyzed as physically impossible, the system falls back to a "best guess range" for the component, and uses this synthetic data in its real-time matching.

The specification and parsing systems described here have been carefully designed to support "handedness agnosticism," so that for multi-hand gestures either hand is permitted to satisfy pose requirements.

Figure 20:
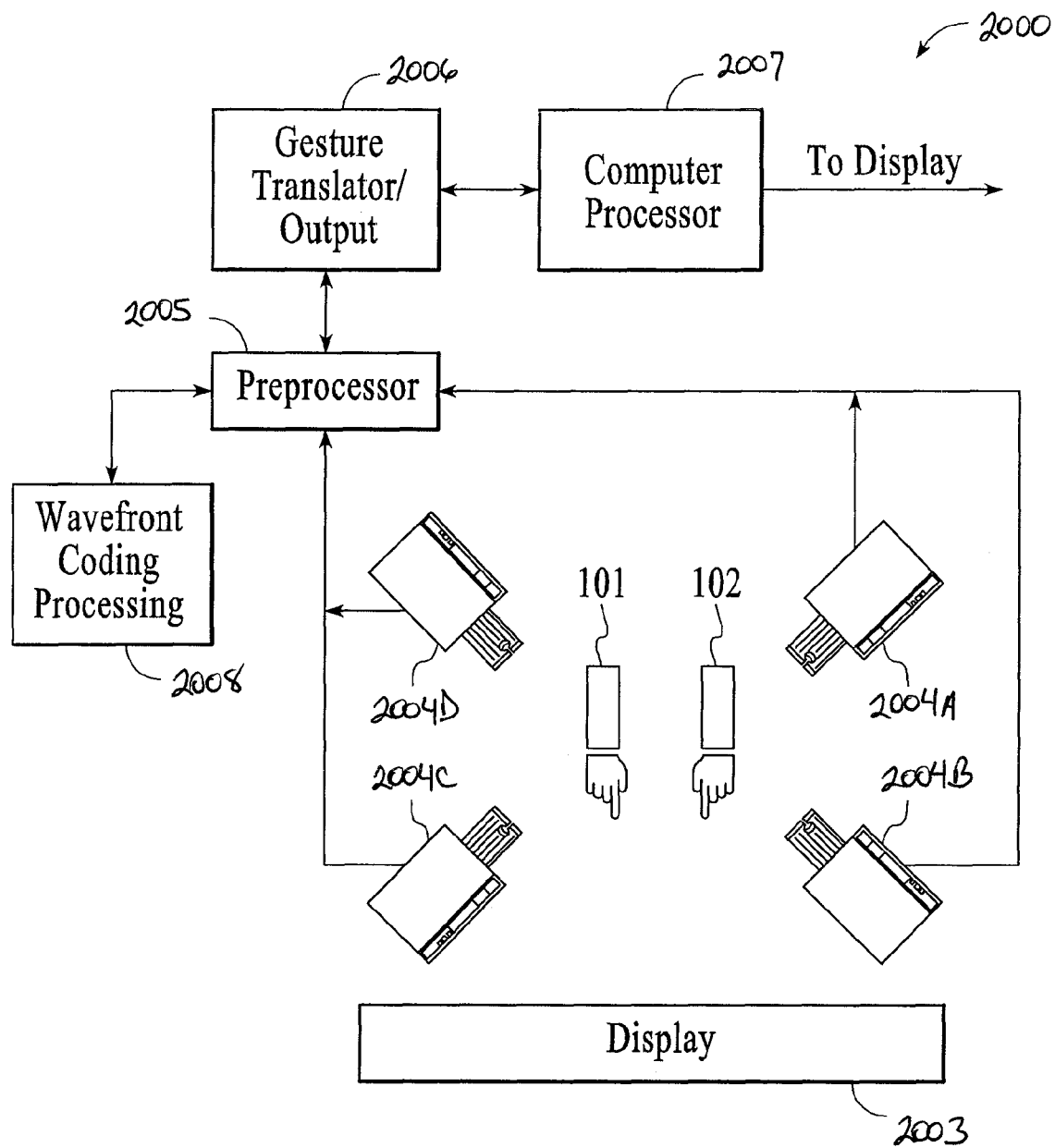
FIG. 20 is a block diagram of gesture-based control system for extracting three-dimensional information over an extended depth of field, under an embodiment.

Gesture-Based Control Using Three-Dimensional Information Extracted Over an Extended Depth of Field FIG. 20 is a block diagram of gesture-based control system 2000 including an imaging system that extracts three-dimensional information over an extended depth of field, under an embodiment. A user locates his hands 101 and 102 in the viewing area of an array of cameras 2004A-2004D. At least two cameras of the array 2004A-2004D are wavefront coding cameras, each of which comprise elements of a wavefront coding imaging system including wavefront coding masks (also referred to herein as "optical aspheric element" or "optical element"), as described in detail below. The user's hands and/or fingers may or may not include the marker tags described above.

The cameras 2004A-2004D detect or capture images of the fingers and hands 101 and 102 including location, orientation, and movement of the fingers and hands 101 and 102 and generate output signals to pre-processor 2005. Pre-processor 2005 can include or be coupled to the wavefront coding digital signal processing 2008, as described below. Alternatively, the wavefront coding digital signal processing can be included in, coupled to, or distributed among one or more other components of the system 2000. The wavefront coding digital signal processing 2008 is configured to vastly extend the depth of field of imaging systems.

Pre-processor 2005 translates the camera output into a gesture signal that is provided to the computer processing unit 2007 of the system. In so doing, the pre-processor 2005 generates three dimensional space point reconstruction and skeletal point labeling. The gesture translator 2006 converts the 3D spatial information and marker motion information into a command language that can be interpreted by a computer processor to update the location, shape, and action of a cursor on a display. The computer 2007 uses the input information to generate a command to control one or more on screen cursors and provides video output to display 2003.

One or more of the pre-processor 2005, gesture translator 2006, and computer 2007 of an alternative embodiment can be combined into a single device. Regardless of system configuration, the functions and/or functionality of each of the pre-processor 2005, gesture translator 2006, and computer 2007 are as described elsewhere herein.

Furthermore, while this example shows four cameras being used to detect the location, orientation, and movement of the user's hands 101 and 102, the embodiment is not so limited. The system configuration can include two or more cameras as appropriate to a system or workstation configuration. In addition, although the cameras are disposed symmetrically in the example embodiment, there is no requirement of such symmetry. Thus, at least two cameras with any positioning that permits the location, orientation, and movement of the user's hands may be used hereunder.

Although the system is shown with a single user's hands as input, the system can track hands of any number of multiple users. In addition, instead of or in addition to hands, the system may track any part or parts of a user's body, including head, feet, legs, arms, elbows, knees, and the like. Furthermore, the system can track any number of animate or inanimate objects and is not limited to tracking parts of a body.

In particular, for gesture analysis systems that locate an optical sensor so as to be deliberately or potentially proximal to an operator's hand (or equivalently tracked implement), the elements thus apprehended will typically range, throughout a natural sequence of operator motion, over several or many orders of relative distance magnitude.

It is beyond the capacity of traditional optical imaging systems to provide a consistently focus-resolved record of events traversing such a range of distances. These close-approach to medium-distance geometries are often however desirable in the context of object- or operator-tracking for the purposes of macroscopic device and product design. It is thus of value to provide a technique (for which purpose traditional optics is inadequate) for insuring local contrast or salient feature stability over the expected range of operator activity.

In describing the extraction of three-dimensional information over an extended depth of field as used in the systems herein, distance to a point in a scene can be estimated from its location in two or more images captured simultaneously. The three dimensional (3D) position of the point can be computed from basic geometric relationships when the 3D relationship between the imagers is known. The challenge in computing spatial location from multiple images, often referred to as stereo correlation or stereo depth computation, is automatically and accurately associating the mapping of a point in one image with its mapping in another image. This is most often done by correlating image features from one image to one or more others. The underlying assumption in all stereo matching methods, however, is that there must be some identifiable local contrast or feature in the image in order to match that point to its location in another image. Therefore a problem arises when there is no local contrast or feature in the image because of misfocus—stereo matching does not produce accurate results in regions of an image that are out of focus.

The conventional means for extending the focal depth of an image is to reduce the diameter of the camera's lens's pupil ("stopping down"). However, two side effects restrict the usefulness of the technique. First, the sensitivity of the imaging system is reduced by a factor equal to the square of the pupil diameter ratio. Second, the maximum spatial frequency response is reduced a factor equal to the pupil diameter ratio, which limits the resolution and contrast in the image. There is thus a tradeoff between depth of field, exposure time, and overall contrast in conventional imaging systems. In the case of a multiple camera ranging system, the net effect will be a compromise between stereoscopic depth accuracy and working range.

An alternate approach to increasing depth of field without stopping the lens is to introduce a phase mask of specified prescription in the pupil of the camera lens. With a properly chosen phase function, an extended depth of field can be recovered by subsequent electronic processing of the image captured on the sensor. This technique, known as wavefront coding, generally provides a tradeoff among depth of field, camera dynamic range, and signal-to-noise ratio. Wavefront coding makes it possible to optimize the camera parameters for a specific application. Applications that do not require a very high dynamic range and in which the illumination is under user control, such as gesture recognition described herein, can greatly benefit from wavefront coding to achieve a high accuracy over a prescribed volume of space.

As described above, the system of an embodiment includes a technique in which the processed outputs of a plurality of wavefront coding cameras are used to determine the range and position of selected objects within a scene. The extended depth of field that results from wavefront coding can be used in a number of applications, including gesture recognition and a broad array of other task-based imaging work, to significantly increase their performance. Although a minimum of two cameras is required, there is no upper limit to the number of cameras that can be used in the embodiment. The scene extraction can include any of a plurality of processing techniques (such as correlations) that are used for range extraction with two or more cameras. The embodiments described herein include all wavefront coding phase functions, and their corresponding decoding kernels, that result in an extended depth of field after processing.

Wavefront coding, as used in wavefront coding imaging systems, is a general technique of using generalized aspheric optics and digital signal processing to greatly increase the performance and/or reduce the cost of imaging systems. The type of aspheric optics employed results in optical imaging characteristics that are very insensitive to misfocus related aberrations. A sharp and clear image is not directly produced from the optics, however, digital signal processing applied to the sampled image produces a sharp and clear final image that is also insensitive to misfocus related aberrations.

Wavefront coding is used to greatly increase imaging performance while also reducing the size, weight, and cost of imaging systems. Wavefront coding combines non-rotationally symmetric aspheric optical elements and digital signal processing in a fundamental manner to vastly extend the depth of field of imaging systems. With wavefront coding the depth of field or depth of focus of an imaging system can be increased by a factor of ten or more compared to traditional imaging systems, for a given aperture size or F/#, for example. Wavefront coding optical elements of an embodiment are phase surfaces and as such do not absorb light or increase exposure or illumination requirements. Such extended depth of field performance is impossible with traditional imaging techniques without dramatic loss of optical power, such as required with stopped down apertures. Increased depth of field/depth of focus also enables imaging systems to be physically less expensive, smaller, or lighter by controlling misfocus related aberrations that are traditionally controlled by adding lens elements or increasing lens complexity. Misfocus related aberrations that can be controlled with wavefront coding include chromatic aberration, Petzval curvature, astigmatism, spherical aberration, and temperature related misfocus.

Figure 21:
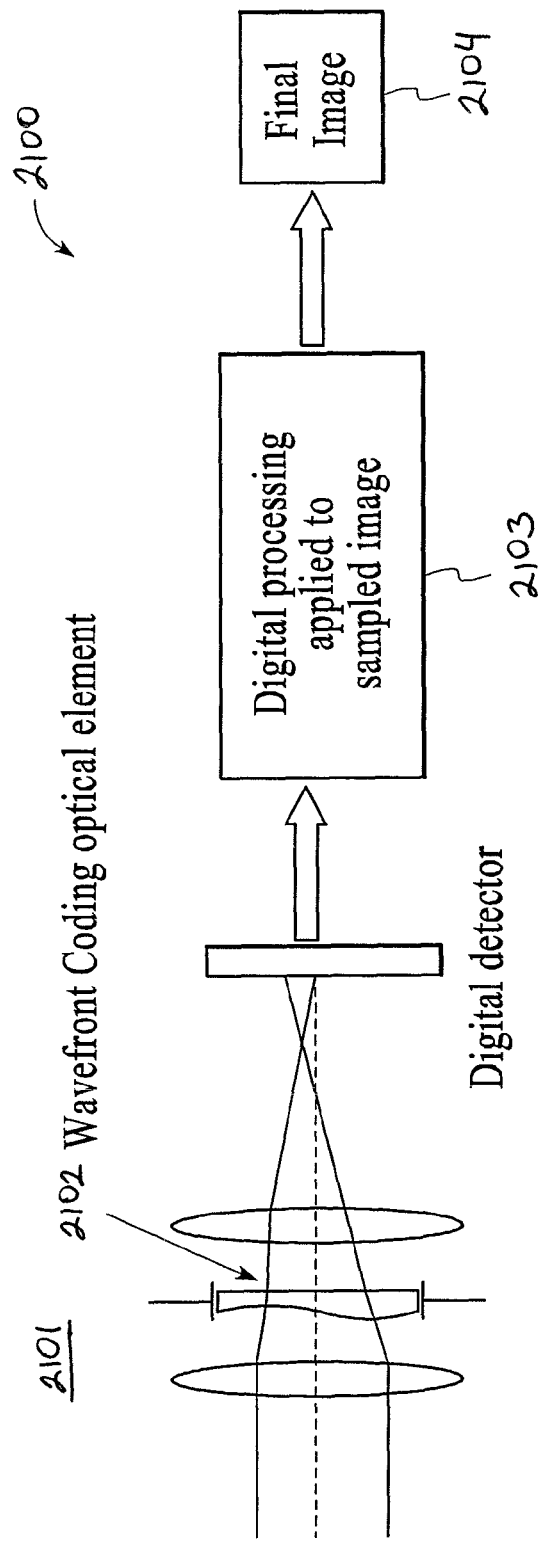
FIG. 21 is a block diagram of a wavefront coding imaging system used in a gesture-based control system, under an embodiment.

Wavefront coding, as a hybrid imaging approach, combines optics and electronics to increase depth of field and reduce the number of optical elements, fabrication tolerances, and overall system cost. FIG. 21 is a block diagram of a wavefront coding imaging system 2100 used in a gesture-based control system, under an embodiment. The optical section 2101 of the wavefront coding imaging system 2100 is a conventional optical system or camera modified with a wavefront coding optical element 2102 placed near the aperture stop. The addition of the coding optical element results in images with a specialized well-defined blur or point spread function that is insensitive to misfocus. Digital processing 2103 applied to the sampled image produces a sharp and clear image 2104 that is very insensitive to misfocus effects.

Figure 22:
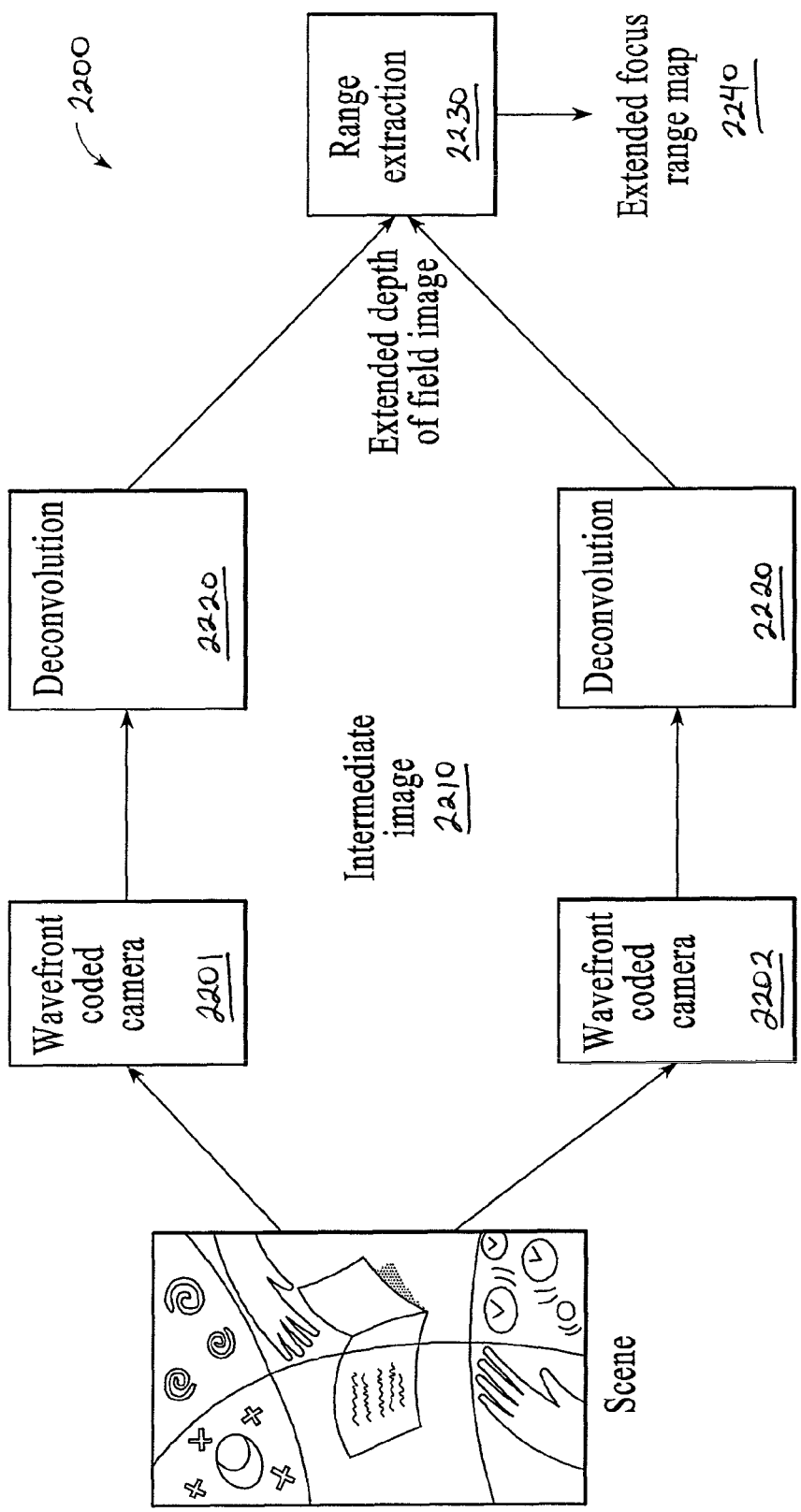
FIG. 22 is a block diagram of gesture-based control system for extracting three-dimensional information over an extended depth of field using a wavefront coding imaging system that includes two wavefront coding cameras, under an embodiment.

FIG. 22 is a block diagram of gesture-based control system 2200 for extracting three-dimensional information over an extended depth of field using a wavefront coding imaging system that includes two wavefront coding cameras, under an embodiment. The system 2200 includes at least two wavefront coding cameras 2201 and 2202, as described above with reference to FIG. 21. A processor is coupled to receive the output of the wavefront coding cameras 2201 and 2202 and to perform data processing on the camera output. The data processing includes deconvolution 2220 and range extraction 2230, to name a few, and generate an extended focus range map 2240.

In the wavefront coding system 2200, the optical portion of the system (e.g., wavefront coding cameras 2201 and 2202) "codes" the resulting images to produce intermediate images 2210. Because the wavefront coding element (e.g., FIG. 21, element 2102) purposefully blurs all points in any image, the intermediate image 2210 appears misfocused. In such intermediate images 2210, nearly all the objects within the field of view are blurred, but they are blurred identically. In contrast, traditional optics typically form images that have a variable blur function that is dependent on the distance to each object in the scene.

In order to produce a sharp and clear image from the intermediate wavefront-coded image 2210, electronics (e.g., wavefront coding digital signal processing) are used to process or "decode" 2220 and 2230 the blurred intermediate image by removing the system-dependent image blur. The digital filtering can be performed in real-time by software or with specialized hardware solutions.

The system optics of an embodiment include conventional components with at least one additional optical element that performs the wavefront coding function, as described above with reference to FIG. 21. This element is placed in the optical path, typically near an aperture stop of the system to minimize vignetting. The signal processing performed on the detected image depends on the optics, wavefront coding element, and the first-order properties of the digital detector.

The general wavefront coding element is nonrotationally symmetric and smooth, although diffractive surfaces can be used. The element can be a separate component, or it can be integrated onto a traditional lens element by the addition of a generalized aspheric surface. All coding elements redirect light so that no ray, besides the on-axis ray, travels toward the traditional geometric focus point. In fact, no two rays are traveling toward the same point along the optical axis. The system does not form a clear image at any image plane.

The main effect of the optics portion of a wavefront-coded imaging system is to make the resulting images insensitive to focus-related aberrations such as defocus, spherical aberration, astigmatism, or field curvature. The intermediate blurry image is insensitive or invariant to changes in the object or imaging system that consist of defocus aberrations. From a systems analysis point of view, the modulation transfer functions (MTFs) and point spread functions (PSFs) of wavefront-coded systems are invariant with respect to defocus.

Although the MTF of an intermediate image from a wavefront-coded system shows little change with defocus, such MTFs do have reduced power compared with the in-focus traditional system. Since apodization is not used, total optical power is preserved. A digital filtering or image reconstruction process is used to form a clear image. These final MTFs are very insensitive to defocus—thus, the wavefront-coded imaging system has a very large depth of field. Similarly, the intermediate PSFs from the wavefront-coded system are different from traditional system PSFs, but they change very little with changes in misfocus.

Referring again to FIG. 21, a special purpose optical aspheric element is placed at or near the aperture stop of a conventional imaging system to form a wavefront coding imaging system. This optical element modifies the imaging system in such a way that the resulting PSF and optical transfer function (OTF) are insensitive to a range of misfocus or misfocus-related aberrations. The PSF and OTF are not, however, the same as that obtained with a good quality in-focus imaging system. The process of making the imaging system insensitive to misfocus aberrations produces images with a specialized, well defined blur; this blur is removed with the wavefront coding digital signal processing.

The PSFs from a conventional imaging system, for example, change drastically with misfocus, while the PSFs from the wavefront coding imaging system show almost no noticeable change with misfocus. Digital processing to remove the misfocus blur applied to a misfocused traditional imaging system uses processing dependent on the amount of misfocus present in different areas of the image. In many situations the amount of misfocus is unknown and difficult to calculate. In addition, the MTF of the misfocused traditional imaging system can often contain zeros or nulls that further increase the difficulty of the digital processing. In contrast, the constant nature of PSFs with misfocus from the wavefront coding system is what is needed to eliminate the dependencies of digital processing on misfocus. Digital processing applied to the charge-coupled device (CCD) or complementary metal-oxide-semiconductor (CMOS)-detected image is independent of misfocus and the actual scene being imaged. In addition, the MTF of wavefront coding imaging systems, both in and out of focus, contain no zeros or nulls allowing high quality final images.

Wavefront coding for extending the depth of field can add value to imaging applications where traditional methodologies (i.e. stopping down the aperture) are generally unacceptable. Constraints on illumination levels, exposure times, or spatial resolution often limit the application of previous optical methods. By using wavefront coding, applications can enjoy fewer misfocus-related problems, without sacrificing exposure times or requiring vast quantities of illumination Wavefront coding imaging systems comprise non-conventional optical designs and digital signal processing of the resulting images, as described above. The signal processing used is dependent on the specific optical system. The wavefront coding optics are dependent on the type and amount of signal processing to be used. Since the optics and signal processing are closely coupled, it is natural to expect best performance from systems where the optical and digital components of the system are jointly optimized during design. The optical components are configured to minimize the changes or sensitivity of the optics to misfocus effects as well enable efficient signal processing. The digital components are designed to minimize algorithm complexity, processing time, and effects of digital processing on image noise.

Figure 23:
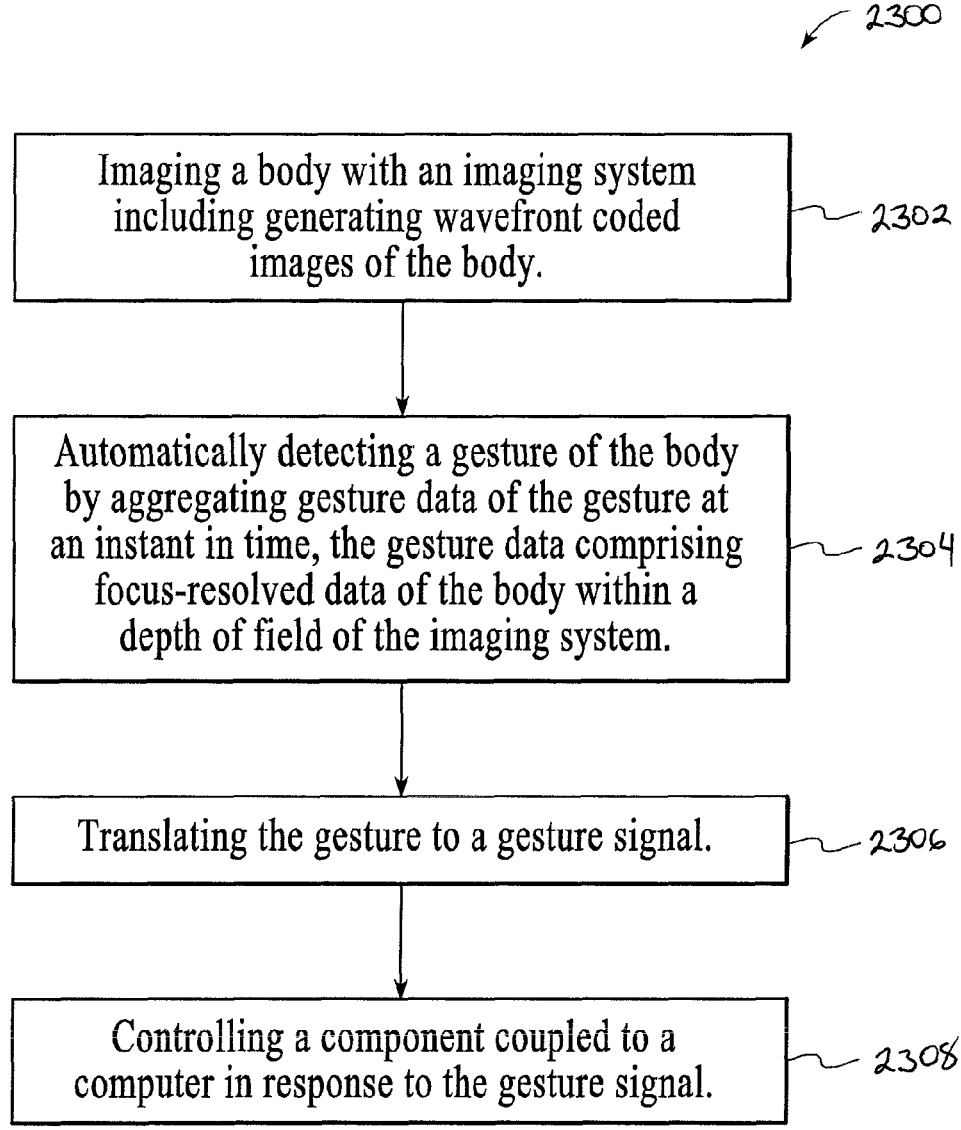
FIG. 23 is a flow diagram for gesture-based control using three-dimensional information extracted over an extended depth of field, under an embodiment.

FIG. 23 is a flow diagram for gesture-based control using three-dimensional information extracted over an extended depth of field, under an embodiment. The gesture-based control of an embodiment comprises imaging 2302 a body with an imaging system. The imaging 2302 comprises generating wavefront coded images of the body. The gesture-based control of an embodiment comprises automatically detecting 2304 a gesture of a body, the gesture including an instantaneous state of the body. The detecting 2304 includes aggregating gesture data of the gesture at an instant in time. The gesture data comprises focus-resolved data of the body within a depth of field of the imaging system. The gesture-based control of an embodiment comprises translating 2306 the gesture to a gesture signal. The gesture-based control of an embodiment comprises controlling 2308 a component coupled to a computer in response to the gesture signal.

Figure 24:
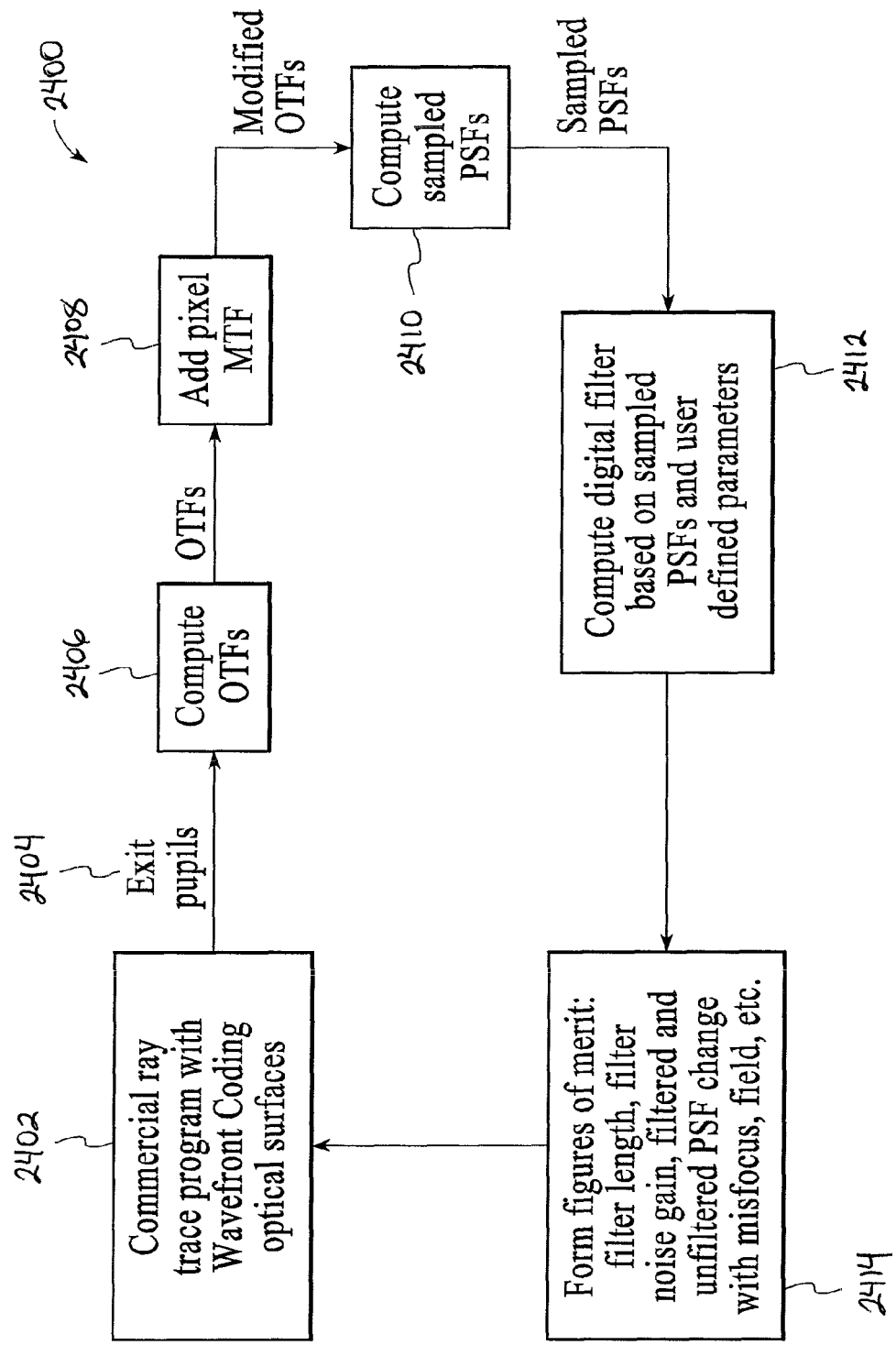
FIG. 24 is a block diagram of a wavefront coding design process used in a gesture-based control system, under an embodiment.

The base routine for wavefront coding of an embodiment can include a ray-trace program that traces rays through typical spherical and aspherical surfaces as well as general wavefront coding surface forms. The ray-trace program is used to calculate exit pupils and optimize a given set of optical and digital merit functions or operands. FIG. 24 is a block diagram of a wavefront coding design process 2400 used in a gesture-based control system, under an embodiment. The output of this design includes but is not limited to the following: traditional optical surfaces, materials, thickness, and spacings; parameters of wavefront coding surfaces; and, digital filter coefficients.

The general optical/digital design loop is now described. A ray-trace program 2402 traces rays through optical surfaces to calculate exit pupil optical path differences (OPDs) 2404 and optimize a given set of optical and digital merit functions or operands. Inputs to the ray-trace program 2402 include optical surfaces, thickness, and operating conditions (wavelengths, field of view, temperature range, sample object images, etc.) to name a few. The OTFs are calculated or generated 2406, and pixel OTFs related to detector geometry are added 2408. Sampled OTFs and PSFs are calculated 2410. Digital filter coefficients are generated 2412 for a selected processing algorithm based on the sampled PSFs. The processing continues by forming figures of merit (e.g., wavefront coding operands) for the filter that are based on minimizing: changes of the sampled PSF and MTF through focus, with field angle, with color, due to temperature changes, due to aliasing, etc.; digital processing parameters such as amount of processing, form of the processing, processing related image noise, digital filter noise gain etc. The wavefront coding operands are combined with traditional optical operands (Seidel Wavefront aberrations, RMS Wavefront errors, etc.) through optimization routines to modify the optical surfaces. Operations return to generate 2402 exit pupil optical path differences (OPDs) via traditional ray tracing.

Theoretically calculated wavefront coding surface forms are used as starting points for the optical optimization. One general family of rectangularly separable surface forms is given in normalized coordinates as:

$$S(x)=|\beta|\text{sign}(x)|x|^{\alpha\alpha}$$

where $\text{sign}(x)=+1$ for $x>0$,
and $\text{sign}(x)=-1$ for $x\leq 0$.

The exponential parameter $\alpha$ controls the height of the MTF over a range of misfocus, and the parameter $\beta$ controls the sensitivity to misfocus. In general, increasing the parameter $\beta$ decreases the sensitivity to misfocus while decreasing the height of the MTF and increasing the length of the resulting PSF.

The filtering process used to reconstruct the intermediate images and produce final images can impose a computational burden. The size of the filter kernel required for image reconstruction may be as large as 70×70 coefficients, depending on the optical system and the enhancement to depth-of-field introduced by the coding process. Generally, the larger the depth of field extension, the larger the filter kernel, and the larger the noise penalty or noise gain. Furthermore, because every pixel in an image is blurred by wavefront coding, every pixel needs to be filtered; thus, larger images can require more computation than smaller images. With image sizes approaching tens of millions of pixels, efficient computational solutions are used for practical and economical systems. Computational implementations, such as rectangularly separable filter approximations, can help reduce kernel dimensions. The wavefront coding element used, for example, can have a rectangularly separable cubic phase form described as $$S(x,y)=a(x^3+y^3).$$

Filtering a blurred image to remove the blur essentially imposes an amplification and phase shift as a function of spatial frequency. This amplification increases the signal as well as the noise in the final images. For very large depth-of-field enhancements, for instance, over 10 times, the noise gain in a wavefront-coded system can be a factor of four or five. For more moderate depth-of-field enhancements of two to four, the noise gain is typically a factor of two or less.

For uncorrelated Gaussian noise (a good assumption for most images) the noise gain is the RMS value of the filter coefficients. For systems with depth-of-field extensions too large to produce a suitably small noise-gain value, reducing the resolution or spatial bandwidth of the digital filter can reduce the noise gain. Reducing the contrast in the final image also can reduce the overall effects of the increased noise. Specialized nonlinear filtering is the best solution for removing noise in wavefront-coded images.

Because the wavefront coding optical element used to form the MTFs and PSFs in an embodiment is rectangularly separable, the signal processing used may also be rectangularly separable. Rectangularly separable processing can reduce the required number of computations by an order of magnitude or more. Due to the fact that the digital filtering is performed with spatial convolution, the computational methods of an embodiment comprise a series of multiplications to scale the data by the filter coefficients and summations to add all the scaled data values together across the entire kernel. The fundamental unit of such a computation is a multiply-accumulate operation. A typical 2-D wavefront coding filter kernel for a large depth-of-field increase might be 30×30 coefficients. A rectangularly separable version of this filter would contain a row filter that is 30 coefficients long and a column filter that is 30 coefficients tall, or 60 total coefficients. While wavefront coding elements can be rectangulalry separable in design, they are not so limited, and highly aberrated systems may use nonseparable filtering.

By combining optical imaging techniques with electronic filtering, wavefront coding technology can improve performance for a wide range of imaging systems. The performance gains in high-performance imaging systems can include very large depth-of-field without sacrificing light gathering or spatial resolution. The performance gains in lower-cost imaging systems can include good image quality with fewer physical components than traditionally required.

Coincident Virtual/Display and Physical Spaces

The SOE of an embodiment, as described above, includes systems and methods for detecting, representing, and interpreting three-space input. Embodiments of the system, in the context of the SOE, process low-level data from a plurality of sources of spatial tracking data and analyze these semantically uncorrelated spatiotemporal data and generate high-level gestural events according to a set of dynamically configurable implicit and explicit gesture descriptions. The events produced are suitable for consumption by interactive systems, and the embodiments provide one or more mechanisms for controlling and effecting event distribution to these consumers. The embodiments further provide to the consumers of its events a facility for transforming gestural events among arbitrary spatial and semantic frames of reference.

The system can provide an environment in which virtual space depicted on one or more display devices ("screens") is treated as coincident with the physical space inhabited by the operator or operators of the system. An embodiment of such an environment is described here. This current embodiment includes three projector-driven screens at fixed locations, is driven by a single desktop computer, and is controlled using the gestural vocabulary and interface system described herein. Note, however, that any number of screens are supported by the techniques being described; that those screens may be mobile (rather than fixed); that the screens may be driven by many independent computers simultaneously; and that the overall system can be controlled by any input device or technique.

The interface system described herein has a means of determining the dimensions, orientations and positions of screens in physical space. Given this information, the system is able to dynamically map the physical space in which these screens are located (and which the operators of the system inhabit) as a projection into the virtual space of computer applications running on the system. As part of this automatic mapping, the system also translates the scale, angles, depth, dimensions and other spatial characteristics of the two spaces in a variety of ways, according to the needs of the applications that are hosted by the system.

This continuous translation between physical and virtual space makes possible the consistent and pervasive use of a number of interface techniques that are difficult to achieve on existing application platforms or that must be implemented piece-meal for each application running on existing platforms. These techniques include (but are not limited to):

1) Use of "literal pointing"—using the hands in a gestural interface environment, or using physical pointing tools or devices—as a pervasive and natural interface technique.

2) Automatic compensation for movement or repositioning of screens.

3) Graphics rendering that changes depending on operator position, for example simulating parallax shifts to enhance depth perception.

4) Inclusion of physical objects in on-screen display—taking into account real-world position, orientation, state, etc. For example, an operator standing in front of a large, opaque screen, could see both applications graphics and a representation of the true position of a scale model that is behind the screen (and is, perhaps, moving or changing orientation).

It is important to note that literal pointing is different from the abstract pointing used in mouse-based windowing interfaces and most other contemporary systems. In those systems, the operator must learn to manage a translation between a virtual pointer and a physical pointing device, and must map between the two cognitively.

By contrast, in the systems described in this disclosure, there is no difference between virtual and physical space (except that virtual space is more amenable to mathematical manipulation), either from an application or user perspective, so there is no cognitive translation required of the operator.

The closest analogy for the literal pointing provided by the embodiment described here is the touch-sensitive screen (as found, for example, on many ATM machines). A touch-sensitive screen provides a one to one mapping between the two-dimensional display space on the screen and the two-dimensional input space of the screen surface. In an analogous fashion, the systems described here provide a flexible mapping (possibly, but not necessarily, one to one) between a virtual space displayed on one or more screens and the physical space inhabited by the operator. Despite the usefulness of the analogy, it is worth understanding that the extension of this "mapping approach" to three dimensions, an arbritrarialy large architectural environment, and multiple screens is nontrivial.

In addition to the components described herein, the system may also implement algorithms implementing a continuous, systems-level mapping (perhaps modified by rotation, translation, scaling or other geometrical transformations) between the physical space of the environment and the display space on each screen.

A rendering stack which takes the computational objects and the mapping and outputs a graphical representation of the virtual space.

An input events processing stack which takes event data from a control system (in the current embodiment both gestural and pointing data from the system and mouse input) and maps spatial data from input events to coordinates in virtual space. Translated events are then delivered to running applications.

A "glue layer" allowing the system to host applications running across several computers on a local area network.

Embodiments of a spatial-continuum input system are described herein as comprising network-based data representation, transit, and interchange that includes a system called "plasma" that comprises subsystems "slawx", "proteins", and "pools", as described in detail below. The pools and proteins are components of methods and systems described herein for encapsulating data that is to be shared between or across processes. These mechanisms also include slawx (plural of "slaw") in addition to the proteins and pools. Generally, slawx provide the lowest-level of data definition for inter-process exchange, proteins provide mid-level structure and hooks for querying and filtering, and pools provide for high-level organization and access semantics. Slawx include a mechanism for efficient, platform-independent data representation and access. Proteins provide a data encapsulation and transport scheme using slawx as the payload. Pools provide structured and flexible aggregation, ordering, filtering, and distribution of proteins within a process, among local processes, across a network between remote or distributed processes, and via longer term (e.g. on-disk, etc.) storage.

The configuration and implementation of the embodiments described herein include several constructs that together enable numerous capabilities. For example, the embodiments described herein provide efficient exchange of data between large numbers of processes as described above. The embodiments described herein also provide flexible data "typing" and structure, so that widely varying kinds and uses of data are supported. Furthermore, embodiments described herein include flexible mechanisms for data exchange (e.g., local memory, disk, network, etc.), all driven by substantially similar application programming interfaces (APIs). Moreover, embodiments described enable data exchange between processes written in different programming languages. Additionally, embodiments described herein enable automatic maintenance of data caching and aggregate state.

Figure 25:
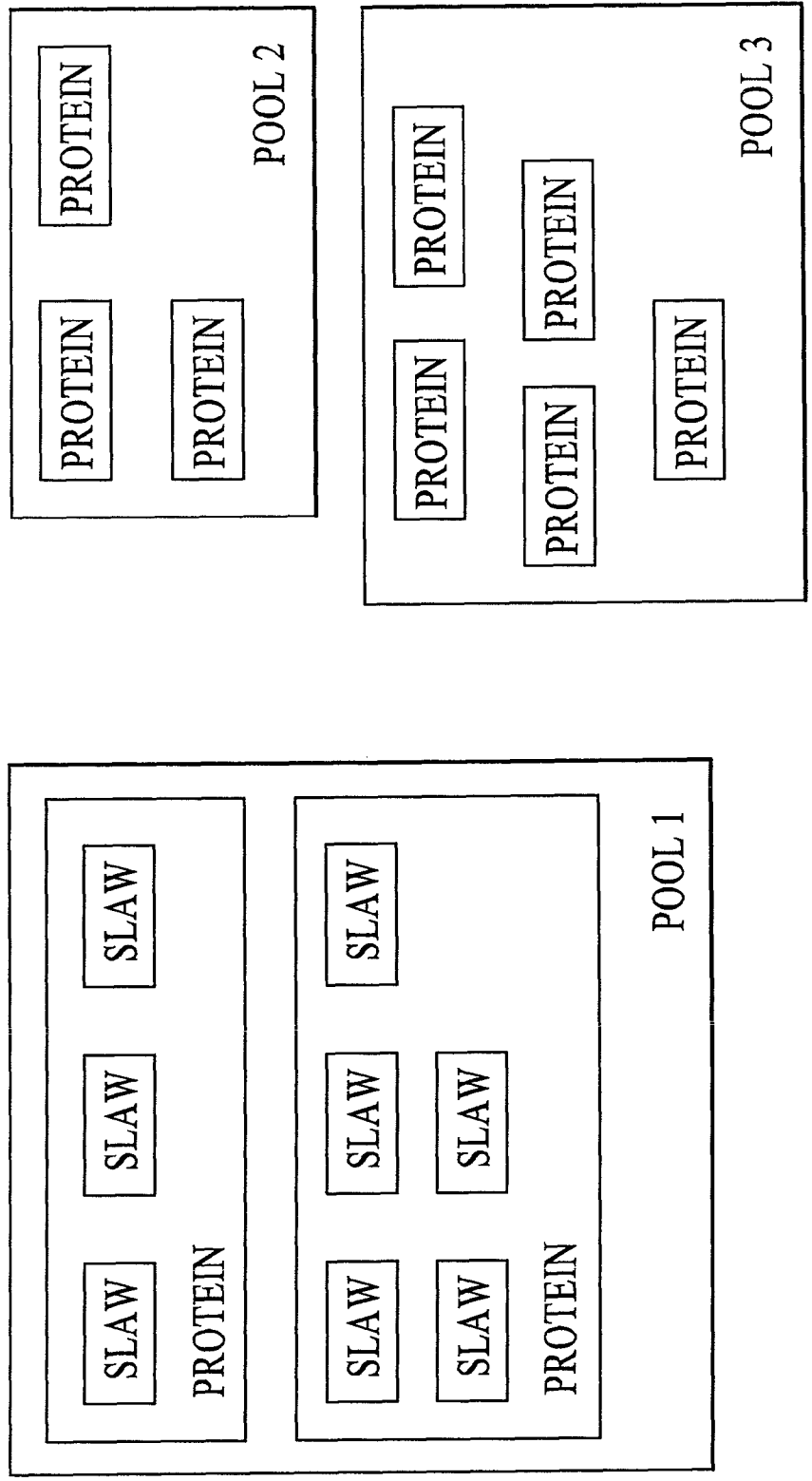
FIG. 25 is a block diagram of a processing environment including data representations using slawx, proteins, and pools, under an embodiment.

FIG. 25 is a block diagram of a processing environment including data representations using slawx, proteins, and pools, under an embodiment. The principal constructs of the embodiments presented herein include slawx (plural of "slaw"), proteins, and pools. Slawx as described herein includes a mechanism for efficient, platform-independent data representation and access. Proteins, as described in detail herein, provide a data encapsulation and transport scheme, and the payload of a protein of an embodiment includes slawx. Pools, as described herein, provide structured yet flexible aggregation, ordering, filtering, and distribution of proteins. The pools provide access to data, by virtue of proteins, within a process, among local processes, across a network between remote or distributed processes, and via 'longer term' (e.g. on-disk) storage.

Figure 26:
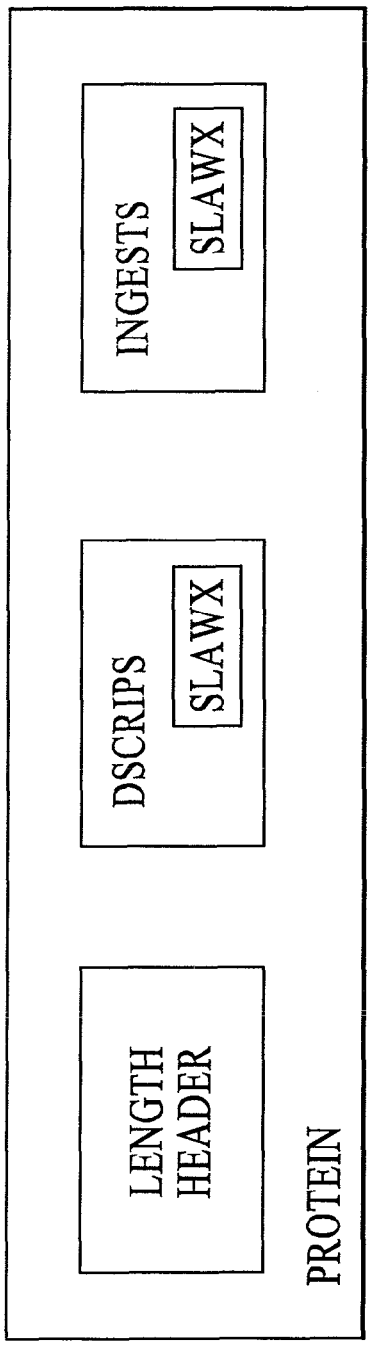
FIG. 26 is a block diagram of a protein, under an embodiment.

FIG. 26 is a block diagram of a protein, under an embodiment. The protein includes a length header, a descrip, and an ingest. Each of the descrip and ingest includes slaw or slawx, as described in detail below.

Figure 27:
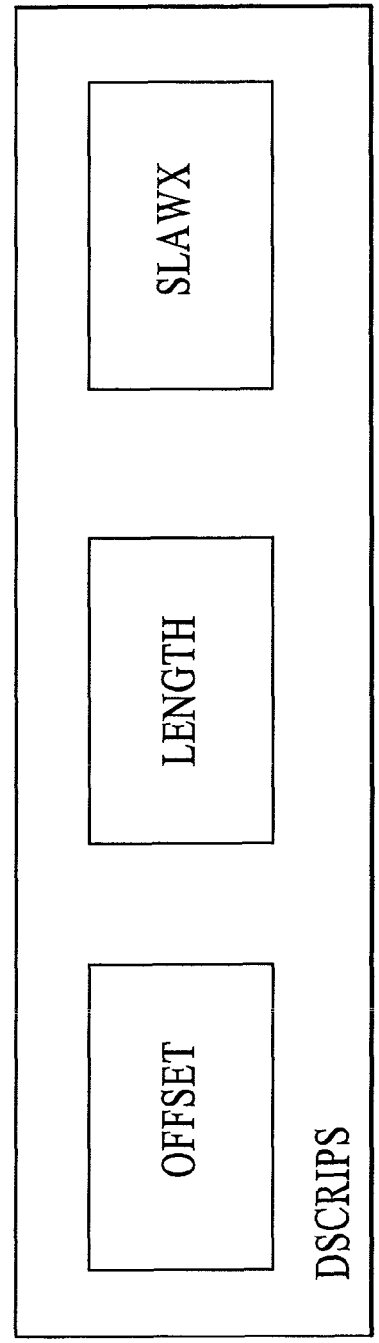
FIG. 27 is a block diagram of a descrip, under an embodiment.

FIG. 27 is a block diagram of a descrip, under an embodiment. The descrip includes an offset, a length, and slawx, as described in detail below.

Figure 28:
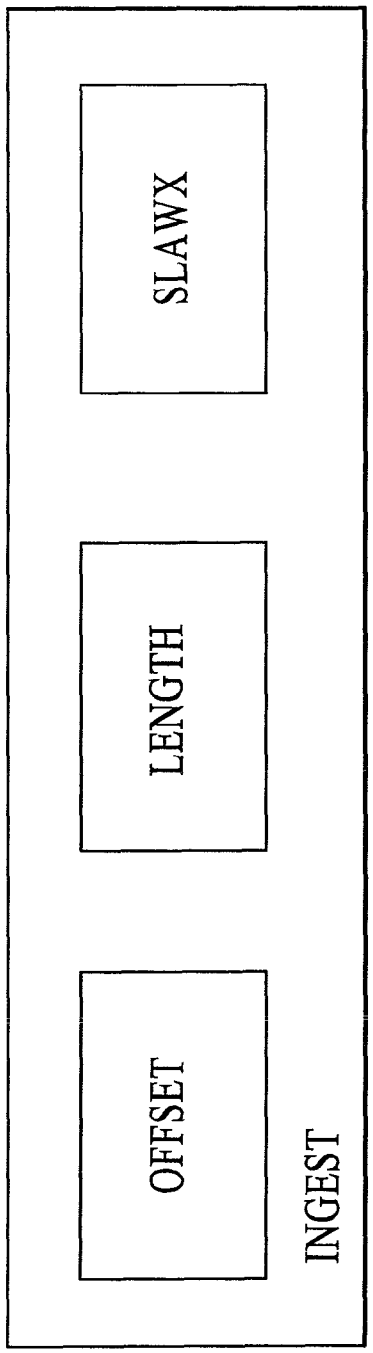
FIG. 28 is a block diagram of an ingest, under an embodiment.

FIG. 28 is a block diagram of an ingest, under an embodiment. The ingest includes an offset, a length, and slawx, as described in detail below.

Figure 29:
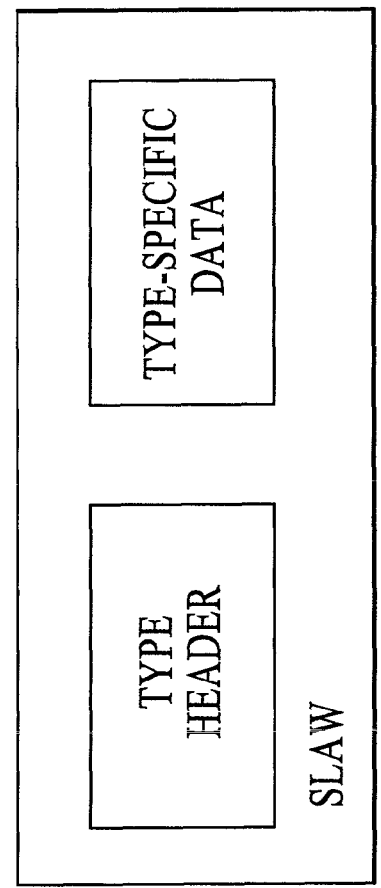
FIG. 29 is a block diagram of a slaw, under an embodiment.

FIG. 29 is a block diagram of a slaw, under an embodiment. The slaw includes a type header and type-specific data, as described in detail below.

Figure 30A:
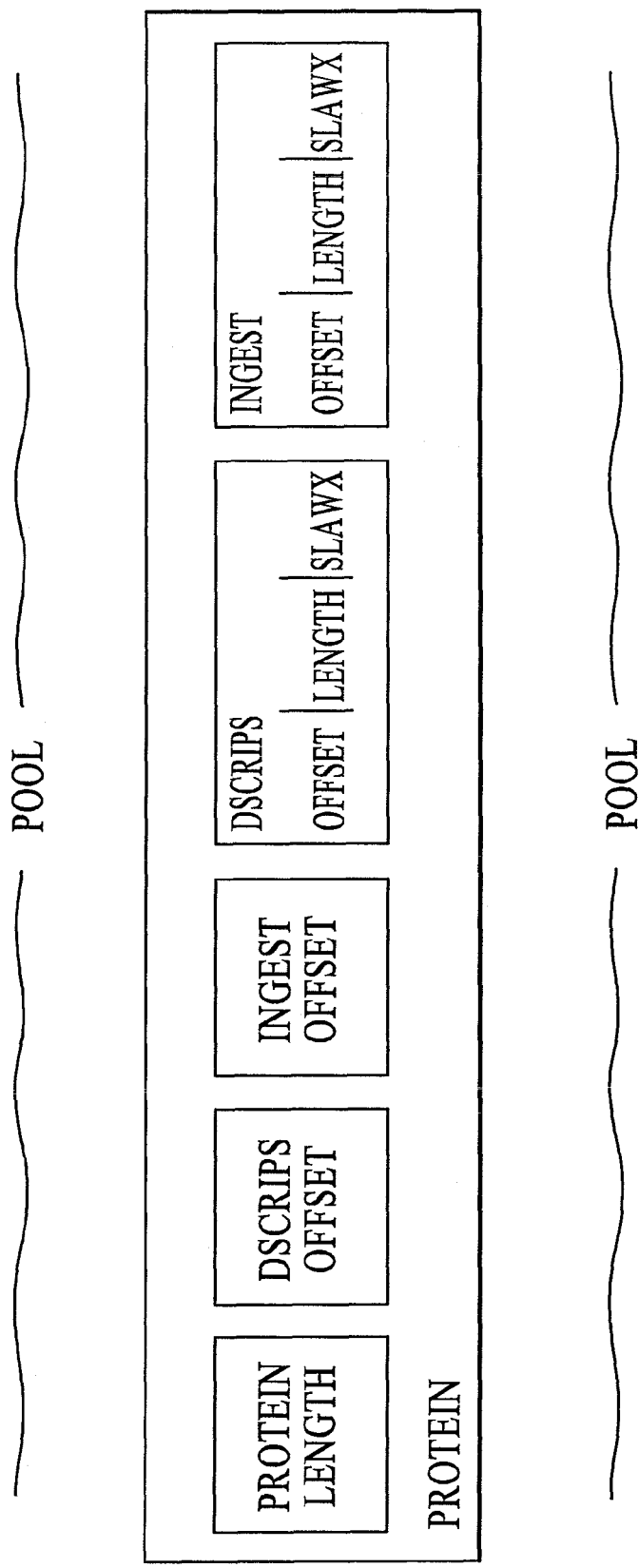
FIG. 30A is a block diagram of a protein in a pool, under an embodiment.

FIG. 30A is a block diagram of a protein in a pool, under an embodiment. The protein includes a length header ("protein length"), a descrips offset, an ingests offset, a descrip, and an ingest. The descrips includes an offset, a length, and a slaw. The ingest includes an offset, a length, and a slaw.

The protein as described herein is a mechanism for encapsulating data that needs to be shared between processes, or moved across a bus or network or other processing structure. As an example, proteins provide an improved mechanism for transport and manipulation of data including data corresponding to or associated with user interface events; in particular, the user interface events of an embodiment include those of the gestural interface described above. As a further example, proteins provide an improved mechanism for transport and manipulation of data including, but not limited to, graphics data or events, and state information, to name a few. A protein is a structured record format and an associated set of methods for manipulating records. Manipulation of records as used herein includes putting data into a structure, taking data out of a structure, and querying the format and existence of data. Proteins are configured to be used via code written in a variety of computer languages. Proteins are also configured to be the basic building block for pools, as described herein. Furthermore, proteins are configured to be natively able to move between processors and across networks while maintaining intact the data they include.

In contrast to conventional data transport mechanisms, proteins are untyped. While being untyped, the proteins provide a powerful and flexible pattern-matching facility, on top of which "type-like" functionality is implemented. Proteins configured as described herein are also inherently multi-point (although point-to-point forms are easily implemented as a subset of multi-point transmission). Additionally, proteins define a "universal" record format that does not differ (or differs only in the types of optional optimizations that are performed) between in-memory, on-disk, and on-the-wire (network) formats, for example.

Referring to FIGS. 26 and 30A, a protein of an embodiment is a linear sequence of bytes. Within these bytes are encapsulated a descrips list and a set of key-value pairs called ingests. The descrips list includes an arbitrarily elaborate but efficiently filterable per-protein event description. The ingests include a set of key-value pairs that comprise the actual contents of the protein.

Proteins' concern with key-value pairs, as well as some core ideas about network-friendly and multi-point data interchange, is shared with earlier systems that privilege the concept of "tuples" (e.g., Linda, Jini). Proteins differ from tuple-oriented systems in several major ways, including the use of the descrips list to provide a standard, optimizable pattern matching substrate. Proteins also differ from tuple-oriented systems in the rigorous specification of a record format appropriate for a variety of storage and language constructs, along with several particular implementations of "interfaces" to that record format.

Turning to a description of proteins, the first four or eight bytes of a protein specify the protein's length, which must be a multiple of 16 bytes in an embodiment. This 16-byte granularity ensures that byte-alignment and bus-alignment efficiencies are achievable on contemporary hardware. A protein that is not naturally "quad-word aligned" is padded with arbitrary bytes so that its length is a multiple of 16 bytes.

The length portion of a protein has the following format: 32 bits specifying length, in big-endian format, with the four lowest-order bits serving as flags to indicate macro-level protein structure characteristics; followed by 32 further bits if the protein's length is greater than 2^12 bytes.

The 16-byte-alignment proviso of an embodiment means that the lowest order bits of the first four bytes are available as flags. And so the first three low-order bit flags indicate whether the protein's length can be expressed in the first four bytes or requires eight, whether the protein uses big-endian or little-endian byte ordering, and whether the protein employs standard or non-standard structure, respectively, but the protein is not so limited. The fourth flag bit is reserved for future use.

If the eight-byte length flag bit is set, the length of the protein is calculated by reading the next four bytes and using them as the high-order bytes of a big-endian, eight-byte integer (with the four bytes already read supplying the low-order portion). If the little-endian flag is set, all binary numerical data in the protein is to be interpreted as little-endian (otherwise, big-endian). If the non-standard flag bit is set, the remainder of the protein does not conform to the standard structure to be described below.

Non-standard protein structures will not be discussed further herein, except to say that there are various methods for describing and synchronizing on non-standard protein formats available to a systems programmer using proteins and pools, and that these methods can be useful when space or compute cycles are constrained. For example, the shortest protein of an embodiment is sixteen bytes. A standard-format protein cannot fit any actual payload data into those sixteen bytes (the lion's share of which is already relegated to describing the location of the protein's component parts). But a non-standard format protein could conceivably use 12 of its 16 bytes for data. Two applications exchanging proteins could mutually decide that any 16-byte-long proteins that they emit always include 12 bytes representing, for example, 12 8-bit sensor values from a real-time analog-to-digital converter.

Immediately following the length header, in the standard structure of a protein, two more variable-length integer numbers appear. These numbers specify offsets to, respectively, the first element in the descrips list and the first key-value pair (ingest). These offsets are also referred to herein as the descrips offset and the ingests offset, respectively. The byte order of each quad of these numbers is specified by the protein endianness flag bit. For each, the most significant bit of the first four bytes determines whether the number is four or eight bytes wide. If the most significant bit (msb) is set, the first four bytes are the most significant bytes of a double-word (eight byte) number. This is referred to herein as "offset form". Use of separate offsets pointing to descrips and pairs allows descrips and pairs to be handled by different code paths, making possible particular optimizations relating to, for example, descrips pattern-matching and protein assembly. The presence of these two offsets at the beginning of a protein also allows for several useful optimizations.

Most proteins will not be so large as to require eight-byte lengths or pointers, so in general the length (with flags) and two offset numbers will occupy only the first three bytes of a protein. On many hardware or system architectures, a fetch or read of a certain number of bytes beyond the first is "free" (e.g., 16 bytes take exactly the same number of clock cycles to pull across the Cell processor's main bus as a single byte).

In many instances it is useful to allow implementation-specific or context-specific caching or metadata inside a protein. The use of offsets allows for a "hole" of arbitrary size to be created near the beginning of the protein, into which such metadata may be slotted. An implementation that can make use of eight bytes of metadata gets those bytes for free on many system architectures with every fetch of the length header for a protein.

The descrips offset specifies the number of bytes between the beginning of the protein and the first descrip entry. Each descrip entry comprises an offset (in offset form, of course) to the next descrip entry, followed by a variable-width length field (again in offset format), followed by a slaw. If there are no further descrips, the offset is, by rule, four bytes of zeros. Otherwise, the offset specifies the number of bytes between the beginning of this descrip entry and a subsequent descrip entry. The length field specifies the length of the slaw, in bytes.

In most proteins, each descrip is a string, formatted in the slaw string fashion: a four-byte length/type header with the most significant bit set and only the lower 30 bits used to specify length, followed by the header's indicated number of data bytes. As usual, the length header takes its endianness from the protein. Bytes are assumed to encode UTF-8 characters (and thus—nota bene—the number of characters is not necessarily the same as the number of bytes).

The ingests offset specifies the number of bytes between the beginning of the protein and the first ingest entry. Each ingest entry comprises an offset (in offset form) to the next ingest entry, followed again by a length field and a slaw. The ingests offset is functionally identical to the descrips offset, except that it points to the next ingest entry rather than to the next descrip entry.

In most proteins, every ingest is of the slaw cons type comprising a two-value list, generally used as a key/value pair. The slaw cons record comprises a four-byte length/type header with the second most significant bit set and only the lower 30 bits used to specify length; a four-byte offset to the start of the value (second) element; the four-byte length of the key element; the slaw record for the key element; the four-byte length of the value element; and finally the slaw record for the value element.

Generally, the cons key is a slaw string. The duplication of data across the several protein and slaw cons length and offsets field provides yet more opportunity for refinement and optimization.

The construct used under an embodiment to embed typed data inside proteins, as described above, is a tagged byte-sequence specification and abstraction called a "slaw" (the plural is "slawx"). A slaw is a linear sequence of bytes representing a piece of (possibly aggregate) typed data, and is associated with programming-language-specific APIs that allow slawx to be created, modified and moved around between memory spaces, storage media, and machines. The slaw type scheme is intended to be extensible and as lightweight as possible, and to be a common substrate that can be used from any programming language.

The desire to build an efficient, large-scale inter-process communication mechanism is the driver of the slaw configuration. Conventional programming languages provide sophisticated data structures and type facilities that work well in process-specific memory layouts, but these data representations invariably break down when data needs to be moved between processes or stored on disk. The slaw architecture is, first, a substantially efficient, multi-platform friendly, low-level data model for inter-process communication.

But even more importantly, slawx are configured to influence, together with proteins, and enable the development of future computing hardware (microprocessors, memory controllers, disk controllers). A few specific additions to, say, the instruction sets of commonly available microprocessors make it possible for slawx to become as efficient even for single-process, in-memory data layout as the schema used in most programming languages.

Each slaw comprises a variable-length type header followed by a type-specific data layout. In an example embodiment, which supports full slaw functionality in C, C++ and Ruby for example, types are indicated by a universal integer defined in system header files accessible from each language. More sophisticated and flexible type resolution functionality is also enabled: for example, indirect typing via universal object IDs and network lookup.

The slaw configuration of an embodiment allows slaw records to be used as objects in language-friendly fashion from both Ruby and C++, for example. A suite of utilities external to the C++ compiler sanity-check slaw byte layout, create header files and macros specific to individual slaw types, and auto-generate bindings for Ruby. As a result, well-configured slaw types are quite efficient even when used from within a single process. Any slaw anywhere in a process's accessible memory can be addressed without a copy or "deserialization" step.

Slaw functionality of an embodiment includes API facilities to perform one or more of the following: create a new slaw of a specific type; create or build a language-specific reference to a slaw from bytes on disk or in memory; embed data within a slaw in type-specific fashion; query the size of a slaw; retrieve data from within a slaw; clone a slaw; and translate the endianness and other format attributes of all data within a slaw. Every species of slaw implements the above behaviors.

FIG. 30B shows a slaw header format, under an embodiment. A detailed description of the slaw follows.

The internal structure of each slaw optimizes each of type resolution, access to encapsulated data, and size information for that slaw instance. In an embodiment, the full set of slaw types is by design minimally complete, and includes: the slaw string; the slaw cons (i.e. dyad); the slaw list; and the slaw numerical object, which itself represents a broad set of individual numerical types understood as permutations of a half-dozen or so basic attributes. The other basic property of any slaw is its size. In an embodiment, slawx have byte-lengths quantized to multiples of four; these four-byte words are referred to herein as 'quads'. In general, such quad-based sizing aligns slawx well with the configurations of modern computer hardware architectures.

The first four bytes of every slaw in an embodiment comprise a header structure that encodes type-description and other metainformation, and that ascribes specific type meanings to particular bit patterns. For example, the first (most significant) bit of a slaw header is used to specify whether the size (length in quad-words) of that slaw follows the initial four-byte type header. When this bit is set, it is understood that the size of the slaw is explicitly recorded in the next four bytes of the slaw (e.g., bytes five through eight); if the size of the slaw is such that it cannot be represented in four bytes (i.e. if the size is or is larger than two to the thirty-second power) then the next-most-significant bit of the slaw's initial four bytes is also set, which means that the slaw has an eight-byte (rather than four byte) length. In that case, an inspecting process will find the slaw's length stored in ordinal bytes five through twelve. On the other hand, the small number of slaw types means that in many cases a fully specified typal bit-pattern "leaves unused" many bits in the four byte slaw header; and in such cases these bits may be employed to encode the slaw's length, saving the bytes (five through eight) that would otherwise be required.

For example, an embodiment leaves the most significant bit of the slaw header (the "length follows" flag) unset and sets the next bit to indicate that the slaw is a "wee cons", and in this case the length of the slaw (in quads) is encoded in the remaining thirty bits. Similarly, a "wee string" is marked by the pattern 001 in the header, which leaves twenty-nine bits for representation of the slaw-string's length; and a leading 0001 in the header describes a "wee list", which by virtue of the twenty-eight available length-representing bits can be a slaw list of up to two-to-the-twenty-eight quads in size. A "full string" (or cons or list) has a different bit signature in the header, with the most significant header bit necessarily set because the slaw length is encoded separately in bytes five through eight (or twelve, in extreme cases). Note that the Plasma implementation "decides" at the instant of slaw construction whether to employ the "wee" or the "full" version of these constructs (the decision is based on whether the resulting size will "fit" in the available wee bits or not), but the full-vs.-wee detail is hidden from the user of the Plasma implementation, who knows and cares only that she is using a slaw string, or a slaw cons, or a slaw list.

Numeric slawx are, in an embodiment, indicated by the leading header pattern 00001. Subsequent header bits are used to represent a set of orthogonal properties that may be combined in arbitrary permutation. An embodiment employs, but is not limited to, five such character bits to indicate whether or not the number is: (1) floating point; (2) complex; (3) unsigned; (4) "wide"; (5) "stumpy" ((4) "wide" and (5) "stumpy" are permuted to indicate eight, sixteen, thirty-two, and sixty-four bit number representations). Two additional bits (e.g., (7) and (8)) indicate that the encapsulated numeric data is a two-, three-, or four-element vector (with both bits being zero suggesting that the numeric is a "one-element vector" (i.e. a scalar)). In this embodiment the eight bits of the fourth header byte are used to encode the size (in bytes, not quads) of the encapsulated numeric data. This size encoding is offset by one, so that it can represent any size between and including one and two hundred fifty-six bytes. Finally, two character bits (e.g., (9) and (10)) are used to indicate that the numeric data encodes an array of individual numeric entities, each of which is of the type described by character bits (1) through (8). In the case of an array, the individual numeric entities are not each tagged with additional headers, but are packed as continuous data following the single header and, possibly, explicit slaw size information.

This embodiment affords simple and efficient slaw duplication (which can be implemented as a byte-for-byte copy) and extremely straightforward and efficient slaw comparison (two slawx are the same in this embodiment if and only if there is a one-to-one match of each of their component bytes considered in sequence). This latter property is important, for example, to an efficient implementation of the protein architecture, one of whose critical and pervasive features is the ability to search through or 'match on' a protein's descrips list.

Further, the embodiments herein allow aggregate slaw forms (e.g., the slaw cons and the slaw list) to be constructed simply and efficiently. For example, an embodiment builds a slaw cons from two component slawx, which may be of any type, including themselves aggregates, by: (a) querying each component slaw's size; (b) allocating memory of size equal to the sum of the sizes of the two component slawx and the one, two, or three quads needed for the header-plus-size structure; (c) recording the slaw header (plus size information) in the first four, eight, or twelve bytes; and then (d) copying the component slawx's bytes in turn into the immediately succeeding memory. Significantly, such a construction routine need know nothing about the types of the two component slawx; only their sizes (and accessibility as a sequence of bytes) matters. The same process pertains to the construction of slaw lists, which are ordered encapsulations of arbitrarily many sub-slawx of (possibly) heterogeneous type.

A further consequence of the slaw system's fundamental format as sequential bytes in memory obtains in connection with "traversal" activities—a recurring use pattern uses, for example, sequential access to the individual slawx stored in a slaw list. The individual slawx that represent the descrips and ingests within a protein structure must similarly be traversed. Such maneuvers are accomplished in a stunningly straightforward and efficient manner: to "get to" the next slaw in a slaw list, one adds the length of the current slaw to its location in memory, and the resulting memory location is identically the header of the next slaw. Such simplicity is possible because the slaw and protein design eschews "indirection"; there are no pointers; rather, the data simply exists, in its totality, in situ.

To the point of slaw comparison, a complete implementation of the Plasma system must acknowledge the existence of differing and incompatible data representation schemes across and among different operating systems, CPUs, and hardware architectures. Major such differences include byte-ordering policies (e.g., little- vs. big-endianness) and floating-point representations; other differences exist. The Plasma specification requires that the data encapsulated by slawx be guaranteed interprable (i.e., must appear in the native format of the architecture or platform from which the slaw is being inspected. This requirement means in turn that the Plasma system is itself responsible for data format conversion. However, the specification stipulates only that the conversion take place before a slaw becomes "at all visible" to an executing process that might inspect it. It is therefore up to the individual implementation at which point it chooses to perform such format c conversion; two appropriate approaches are that slaw data payloads are conformed to the local architecture's data format (1) as an individual slaw is "pulled out" of a protein in which it had been packed, or (2) for all slaw in a protein simultaneously, as that protein is extracted from the pool in which it was resident. Note that the conversion stipulation considers the possibility of hardware-assisted implementations. For example, networking chipsets built with explicit Plasma capability may choose to perform format conversion intelligently and at the "instant of transmission", based on the known characteristics of the receiving system. Alternately, the process of transmission may convert data payloads into a canonical format, with the receiving process symmetrically converting from canonical to "local" format. Another embodiment performs format conversion "at the metal", meaning that data is always stored in canonical format, even in local memory, and that the memory controller hardware itself performs the conversion as data is retrieved from memory and placed in the registers of the proximal CPU.

Figure 30C:
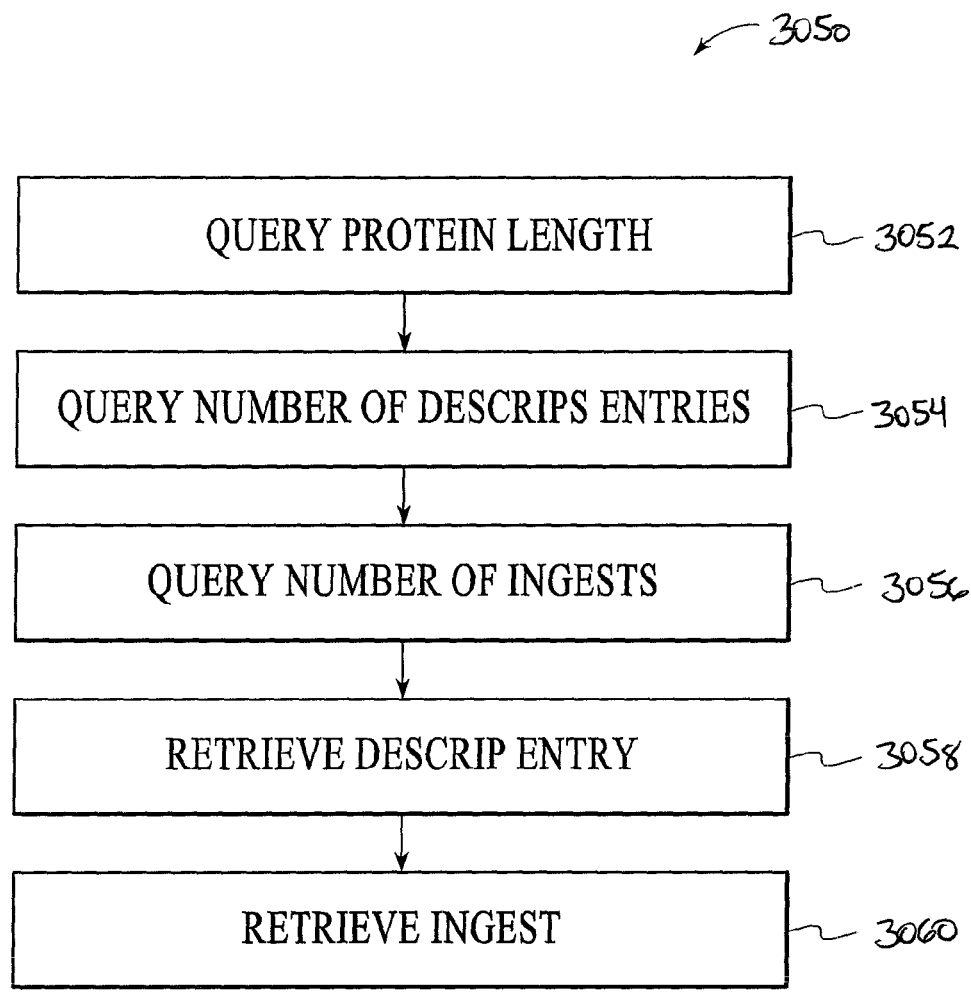
FIG. 30C is a flow diagram for using proteins, under an embodiment.

A minimal (and read-only) protein implementation of an embodiment includes operation or behavior in one or more applications or programming languages making use of proteins. FIG. 30C is a flow diagram 3050 for using proteins, under an embodiment. Operation begins by querying 3052 the length in bytes of a protein. The number of descrips entries is queried 3054. The number of ingests is queried 3056. A descrip entry is retrieved 3058 by index number. An ingest is retrieved 3060 by index number.

Figure 30D:
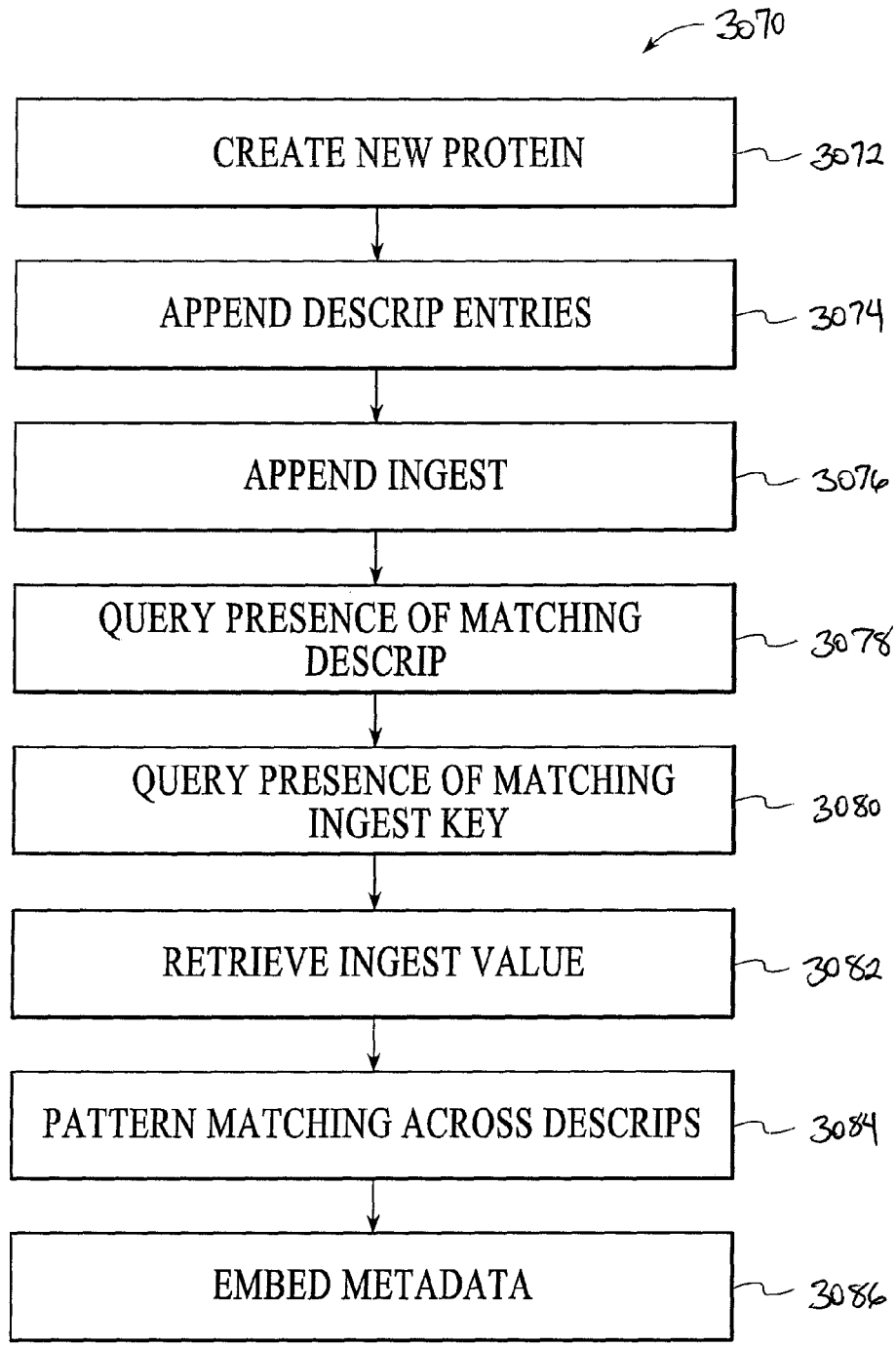
FIG. 30D is a flow diagram for constructing or generating proteins, under an embodiment.

The embodiments described herein also define basic methods allowing proteins to be constructed and filled with data, helper-methods that make common tasks easier for programmers, and hooks for creating optimizations. FIG. 30D is a flow diagram 3070 for constructing or generating proteins, under an embodiment. Operation begins with creation 3072 of a new protein. A series of descrips entries are appended 3074. An ingest is also appended 3076. The presence of a matching descrip is queried 3078, and the presence of a matching ingest key is queried 3080. Given an ingest key, an ingest value is retrieved 3082. Pattern matching is performed 3084 across descrips. Non-structured metadata is embedded 3086 near the beginning of the protein.

As described above, slawx provide the lowest-level of data definition for inter-process exchange, proteins provide mid-level structure and hooks for querying and filtering, and pools provide for high-level organization and access semantics. The pool is a repository for proteins, providing linear sequencing and state caching. The pool also provides multi-process access by multiple programs or applications of numerous different types. Moreover, the pool provides a set of common, optimizable filtering and pattern-matching behaviors.

The pools of an embodiment, which can accommodate tens of thousands of proteins, function to maintain state, so that individual processes can offload much of the tedious book-keeping common to multi-process program code. A pool maintains or keeps a large buffer of past proteins available—the Platonic pool is explicitly infinite—so that participating processes can scan both backwards and forwards in a pool at will. The size of the buffer is implementation dependent, of course, but in common usage it is often possible to keep proteins in a pool for hours or days.

The most common style of pool usage as described herein hews to a biological metaphor, in contrast to the mechanistic, point-to-point approach taken by existing inter-process communication frameworks. The name protein alludes to biological inspiration: data proteins in pools are available for flexible querying and pattern matching by a large number of computational processes, as chemical proteins in a living organism are available for pattern matching and filtering by large numbers of cellular agents.

Two additional abstractions lean on the biological metaphor, including use of "handlers", and the Golgi framework. A process that participates in a pool generally creates a number of handlers. Handlers are relatively small bundles of code that associate match conditions with handle behaviors. By tying one or more handlers to a pool, a process sets up flexible call-back triggers that encapsulate state and react to new proteins.

A process that participates in several pools generally inherits from an abstract Golgi class. The Golgi framework provides a number of useful routines for managing multiple pools and handlers. The Golgi class also encapsulates parent-child relationships, providing a mechanism for local protein exchange that does not use a pool.

A pools API provided under an embodiment is configured to allow pools to be implemented in a variety of ways, in order to account both for system-specific goals and for the available capabilities of given hardware and network architectures. The two fundamental system provisions upon which pools depend are a storage facility and a means of inter-process communication. The extant systems described herein use a flexible combination of shared memory, virtual memory, and disk for the storage facility, and IPC queues and TCP/IP sockets for inter-process communication.

Pool functionality of an embodiment includes, but is not limited to, the following: participating in a pool; placing a protein in a pool; retrieving the next unseen protein from a pool; rewinding or fast-forwarding through the contents (e.g., proteins) within a pool. Additionally, pool functionality can include, but is not limited to, the following: setting up a streaming pool call-back for a process; selectively retrieving proteins that match particular patterns of descrips or ingests keys; scanning backward and forwards for proteins that match particular patterns of descrips or ingests keys.

Figure 31:
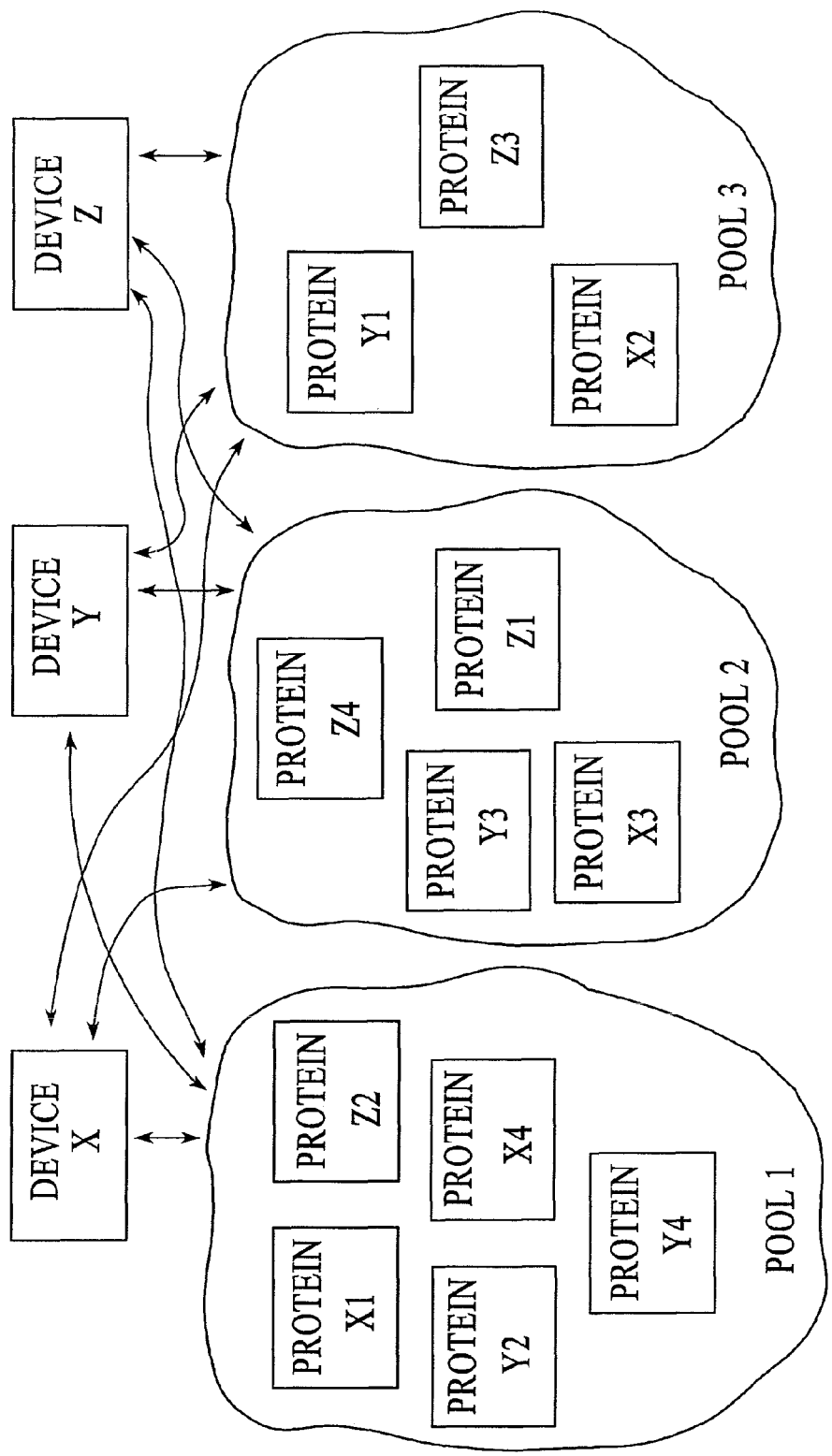
FIG. 31 is a block diagram of a processing environment including data exchange using slawx, proteins, and pools, under an embodiment.

The proteins described above are provided to pools as a way of sharing the protein data contents with other applications. FIG. 31 is a block diagram of a processing environment including data exchange using slawx, proteins, and pools, under an embodiment. This example environment includes three devices (e.g., Device X, Device Y, and Device Z, collectively referred to herein as the "devices") sharing data through the use of slawx, proteins and pools as described above. Each of the devices is coupled to the three pools (e.g., Pool 1, Pool 2, Pool 3). Pool 1 includes numerous proteins (e.g., Protein X1, Protein Z2, Protein Y2, Protein X4, Protein Y4) contributed or transferred to the pool from the respective devices (e.g., protein Z2 is transferred or contributed to pool 1 by device Z, etc.). Pool 2 includes numerous proteins (e.g., Protein Z4, Protein Y3, Protein Z1, Protein X3) contributed or transferred to the pool from the respective devices (e.g., protein Y3 is transferred or contributed to pool 2 by device Y, etc.). Pool 3 includes numerous proteins (e.g., Protein Y1, Protein Z3, Protein X2) contributed or transferred to the pool from the respective devices (e.g., protein X2 is transferred or contributed to pool 3 by device X, etc.). While the example described above includes three devices coupled or connected among three pools, any number of devices can be coupled or connected in any manner or combination among any number of pools, and any pool can include any number of proteins contributed from any number or combination of devices. The proteins and pools of this example are as described above with reference to FIGS. 25-30.

Figure 32:
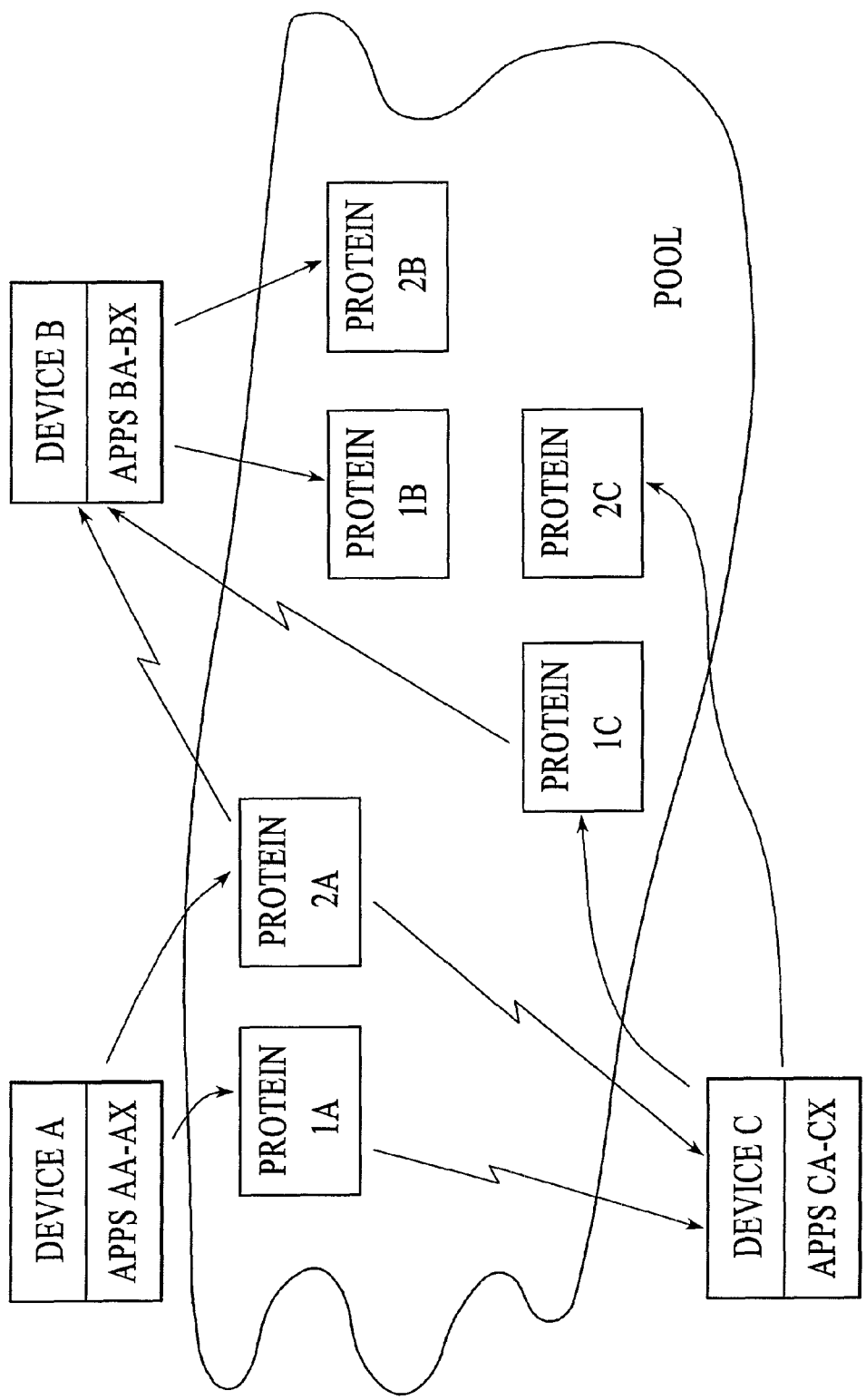
FIG. 32 is a block diagram of a processing environment including multiple devices and numerous programs running on one or more of the devices in which the Plasma constructs (i.e., pools, proteins, and slaw) are used to allow the numerous running programs to share and collectively respond to the events generated by the devices, under an embodiment.

FIG. 32 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an embodiment. This system is but one example of a multi-user, multi-device, multi-computer interactive control scenario or configuration. More particularly, in this example, an interactive system, comprising multiple devices (e.g., device A, B, etc.) and a number of programs (e.g., apps AA-AX, apps BA-BX, etc.) running on the devices uses the Plasma constructs (e.g., pools, proteins, and slaw) to allow the running programs to share and collectively respond to the events generated by these input devices.

In this example, each device (e.g., device A, B, etc.) translates discrete raw data generated by or output from the programs (e.g., apps AA-AX, apps BA-BX, etc.) running on that respective device into Plasma proteins and deposits those proteins into a Plasma pool. For example, program AX generates data or output and provides the output to device A which, in turn, translates the raw data into proteins (e.g., protein 1A, protein 2A, etc.) and deposits those proteins into the pool. As another example, program BC generates data and provides the data to device B which, in turn, translates the data into proteins (e.g., protein 1B, protein 2B, etc.) and deposits those proteins into the pool.

Each protein contains a descrip list that specifies the data or output registered by the application as well as identifying information for the program itself. Where possible, the protein descrips may also ascribe a general semantic meaning for the output event or action. The protein's data payload (e.g., ingests) carries the full set of useful state information for the program event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that devices may be controlled by one person or may be used simultaneously by several people (e.g., a Plasma-based input framework supports many concurrent users), while the resulting event streams are in turn visible to multiple event consumers.

As an example, device C can extract one or more proteins (e.g., protein 1A, protein 2A, etc.) from the pool. Following protein extraction, device C can use the data of the protein, retrieved or read from the slaw of the descrips and ingests of the protein, in processing events to which the protein data corresponds. As another example, device B can extract one or more proteins (e.g., protein 1C, protein 2A, etc.) from the pool. Following protein extraction, device B can use the data of the protein in processing events to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 33:
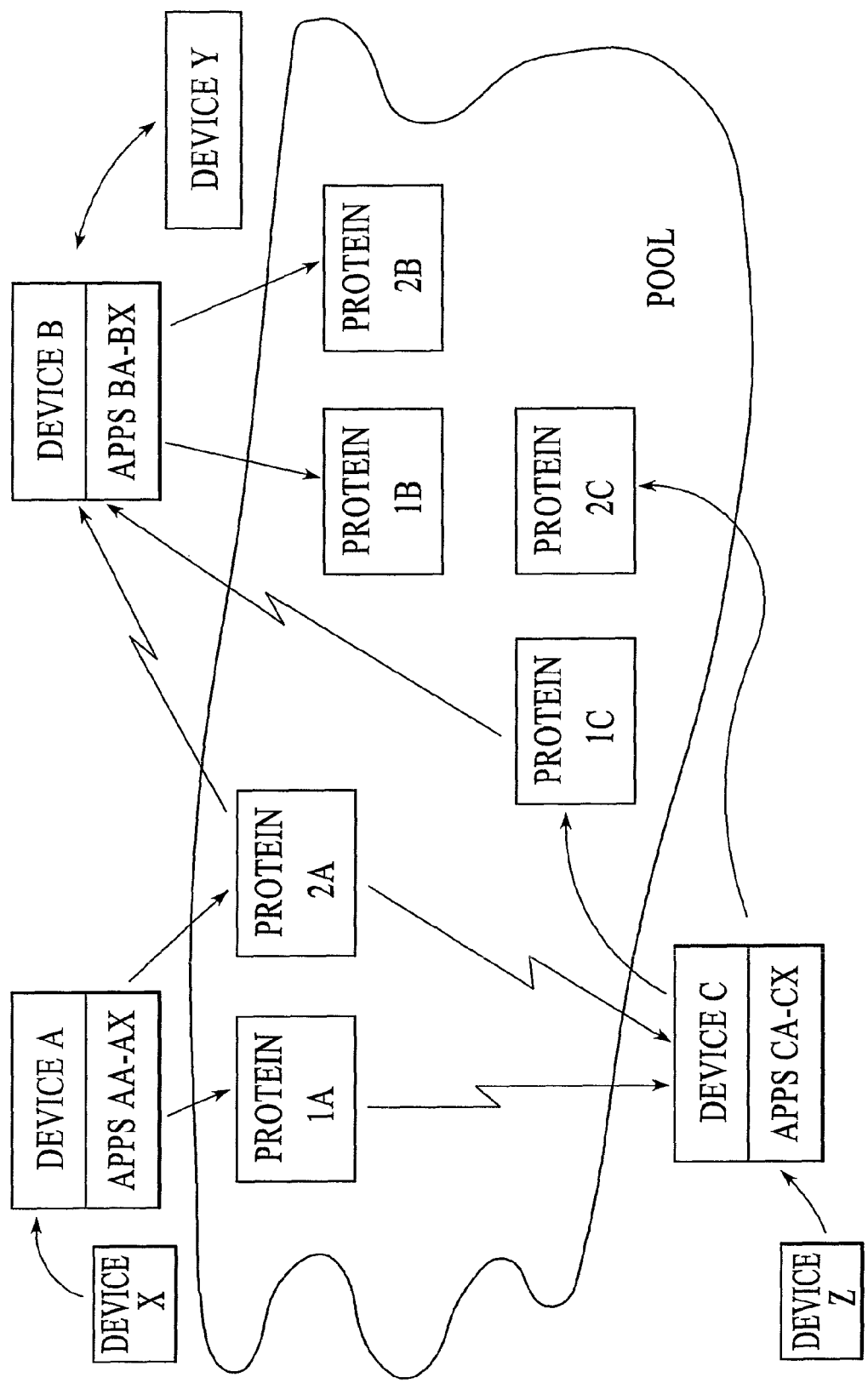
FIG. 33 is a block diagram of a processing environment including multiple devices and numerous programs running on one or more of the devices in which the Plasma constructs (i.e., pools, proteins, and slaw) are used to allow the numerous running programs to share and collectively respond to the events generated by the devices, under an alternative embodiment.

FIG. 33 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an alternative embodiment. This system is but one example of a multi-user, multi-device, multi-computer interactive control scenario or configuration. More particularly, in this example, an interactive system, comprising multiple devices (e.g., devices X and Y coupled to devices A and B, respectively) and a number of programs (e.g., apps AA-AX, apps BA-BX, etc.) running on one or more computers (e.g., device A, device B, etc.) uses the Plasma constructs (e.g., pools, proteins, and slaw) to allow the running programs to share and collectively respond to the events generated by these input devices.

In this example, each device (e.g., devices X and Y coupled to devices A and B, respectively) is managed and/or coupled to run under or in association with one or more programs hosted on the respective device (e.g., device A, device B, etc.)

which translates the discrete raw data generated by the device (e.g., device X, device A, device Y, device B, etc.) hardware into Plasma proteins and deposits those proteins into a Plasma pool. For example, device X running in association with application AB hosted on device A generates raw data, translates the discrete raw data into proteins (e.g., protein 1A, protein 2A, etc.) and deposits those proteins into the pool. As another example, device X running in association with application AT hosted on device A generates raw data, translates the discrete raw data into proteins (e.g., protein 1A, protein 2A, etc.) and deposits those proteins into the pool. As yet another example, device Z running in association with application CD hosted on device C generates raw data, translates the discrete raw data into proteins (e.g., protein 1C, protein 2C, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 34:
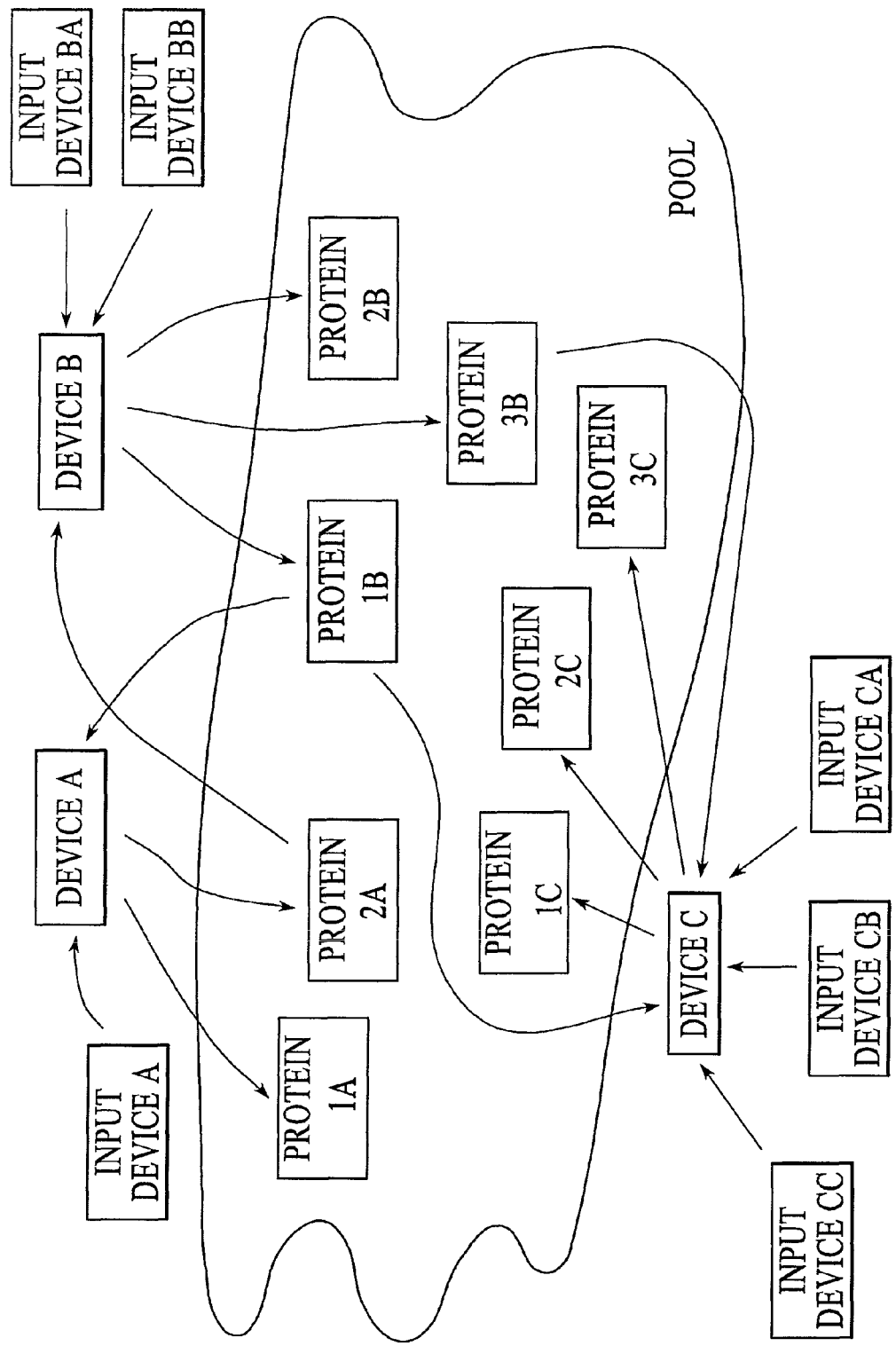
FIG. 34 is a block diagram of a processing environment including multiple input devices coupled among numerous programs running on one or more of the devices in which the Plasma constructs (i.e., pools, proteins, and slaw) are used to allow the numerous running programs to share and collectively respond to the events generated by the input devices, under another alternative embodiment.

FIG. 34 is a block diagram of a processing environment including multiple input devices coupled among numerous programs running on one or more of the devices in which the Plasma constructs (e.g., pools, proteins, and slaw) are used to allow the numerous running programs to share and collectively respond to the events generated by the input devices, under another alternative embodiment. This system is but one example of a multi-user, multi-device, multi-computer interactive control scenario or configuration. More particularly, in this example, an interactive system, comprising multiple input devices (e.g., input devices A, B, BA, and BB, etc.) and a number of programs (not shown) running on one or more computers (e.g., device A, device B, etc.) uses the Plasma constructs (e.g., pools, proteins, and slaw) to allow the running programs to share and collectively respond to the events generated by these input devices.

In this example, each input device (e.g., input devices A, B, BA, and BB, etc.) is managed by a software driver program hosted on the respective device (e.g., device A, device B, etc.) which translates the discrete raw data generated by the input device hardware into Plasma proteins and deposits those proteins into a Plasma pool. For example, input device A generates raw data and provides the raw data to device A which, in turn, translates the discrete raw data into proteins (e.g., protein 1A, protein 2A, etc.) and deposits those proteins into the pool. As another example, input device BB generates raw data and provides the raw data to device B which, in turn, translates the discrete raw data into proteins (e.g., protein 1B, protein 3B, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

To illustrate, here are example proteins for two typical events in such a system.

Proteins are represented here as text however, in an actual implementation, the constituent parts of these proteins are typed data bundles (e.g., slaw). The protein describing a g-speak "one finger click" pose (described in the Related Applications) is as follows:

```
[ Descrips: { point, engage, one, one-finger-engage, hand,
    pilot-id-02, hand-id-23 }
  Ingests: { pilot-id  => 02,
    hand-id    => 23,
    pos        => [ 0.0, 0.0, 0.0 ]
    angle-axis => [ 0.0, 0.0, 0.0, 0.707 ]
    gripe      => ..||:vx
    time       => 184437103.29}]
```

As a further example, the protein describing a mouse click is as follows:

```
[ Descrips: { point, click, one, mouse-click, button-one,
    mouse-id-02 }
  Ingests: { mouse-id => 23,
    pos       => [ 0.0, 0.0, 0.0 ]
    time      => 184437124.80}]
```

Either or both of the sample proteins foregoing might cause a participating program of a host device to run a particular portion of its code. These programs may be interested in the general semantic labels: the most general of all, "point", or the more specific pair, "engage, one". Or they may be looking for events that would plausibly be generated only by a precise device: "one-finger-engage", or even a single aggregate object, "hand-id-23".

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating 'input events' from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

As an example or protein use, device C can extract one or more proteins (e.g., protein 1B, etc.) from the pool. Following protein extraction, device C can use the data of the protein, retrieved or read from the slaw of the descrips and ingests of the protein, in processing input events of input devices CA and CC to which the protein data corresponds. As another example, device A can extract one or more proteins (e.g., protein 1B, etc.) from the pool. Following protein extraction, device A can use the data of the protein in processing input events of input device A to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Examples of input devices that are used in the embodiments of the system described herein include gestural input sensors, keyboards, mice, infrared remote controls such as those used in consumer electronics, and task-oriented tangible media objects, to name a few.

Figure 35:
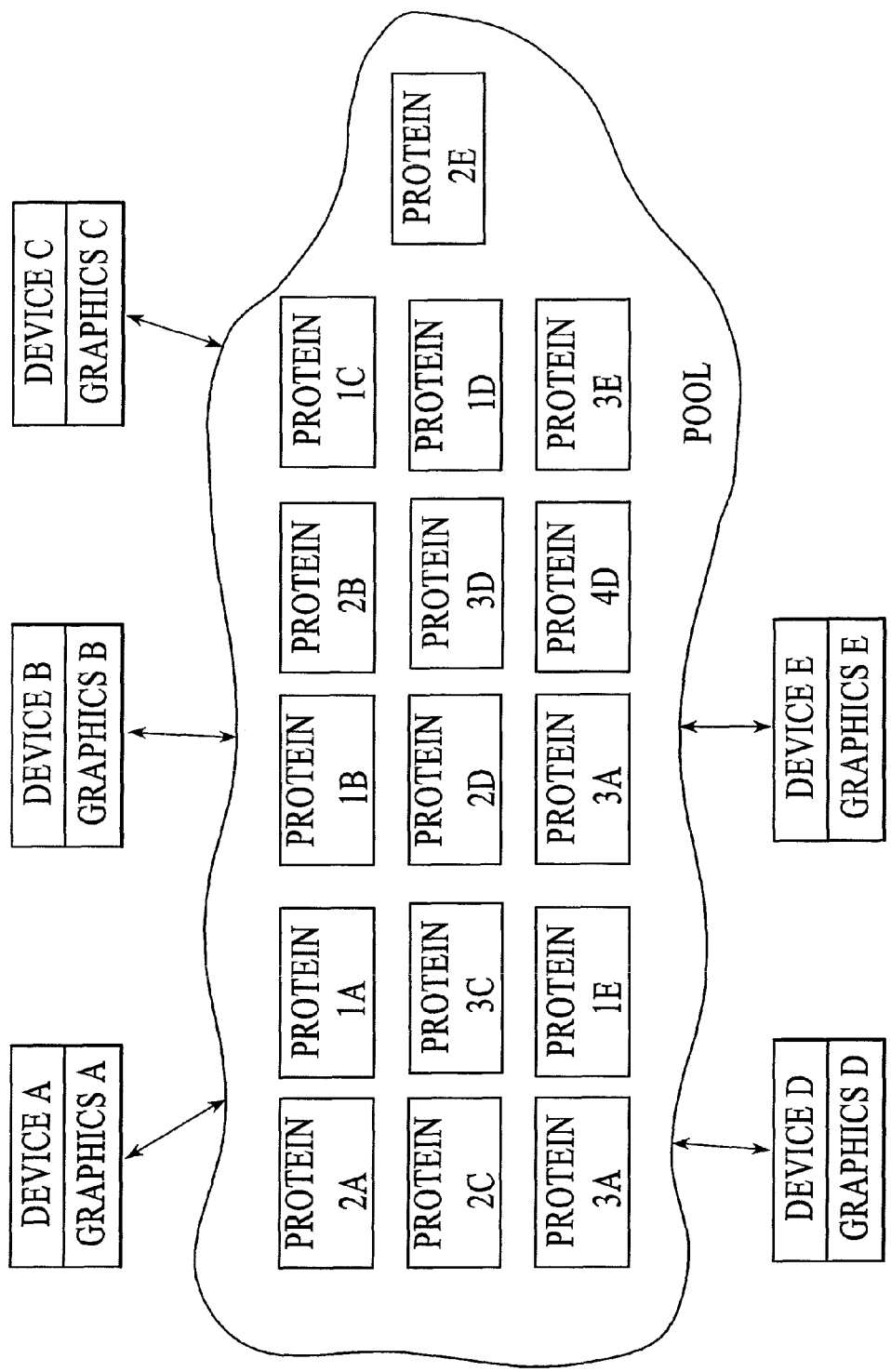
FIG. 35 is a block diagram of a processing environment including multiple devices coupled among numerous programs running on one or more of the devices in which the Plasma constructs (i.e., pools, proteins, and slaw) are used to allow the numerous running programs to share and collectively respond to the graphics events generated by the devices, under yet another alternative embodiment.

FIG. 35 is a block diagram of a processing environment including multiple devices coupled among numerous programs running on one or more of the devices in which the Plasma constructs (e.g., pools, proteins, and slaw) are used to allow the numerous running programs to share and collectively respond to the graphics events generated by the devices, under yet another alternative embodiment. This system is but one example of a system comprising multiple running programs (e.g. graphics A-E) and one or more display devices (not shown), in which the graphical output of some or all of the programs is made available to other programs in a coordinated manner using the Plasma constructs (e.g., pools, proteins, and slaw) to allow the running programs to share and collectively respond to the graphics events generated by the devices.

It is often useful for a computer program to display graphics generated by another program. Several common examples include video conferencing applications, network-based slideshow and demo programs, and window managers. Under this configuration, the pool is used as a Plasma library to implement a generalized framework which encapsulates video, network application sharing, and window management, and allows programmers to add in a number of features not commonly available in current versions of such programs.

Programs (e.g., graphics A-E) running in the Plasma compositing environment participate in a coordination pool through couplings and/or connections to the pool. Each program may deposit proteins in that pool to indicate the availability of graphical sources of various kinds. Programs that are available to display graphics also deposit proteins to indicate their displays' capabilities, security and user profiles, and physical and network locations.

Graphics data also may be transmitted through pools, or display programs may be pointed to network resources of other kinds (RTSP streams, for example). The phrase "graphics data" as used herein refers to a variety of different representations that lie along a broad continuum; examples of graphics data include but are not limited to literal examples (e.g., an 'image', or block of pixels), procedural examples (e.g., a sequence of 'drawing' directives, such as those that flow down a typical openGL pipeline), and descriptive examples (e.g., instructions that combine other graphical constructs by way of geometric transformation, clipping, and compositing operations).

On a local machine graphics data may be delivered through platform-specific display driver optimizations. Even when graphics are not transmitted via pools, often a periodic screen-capture will be stored in the coordination pool so that clients without direct access to the more esoteric sources may still display fall-back graphics.

One advantage of the system described here is that unlike most message passing frameworks and network protocols, pools maintain a significant buffer of data. So programs can rewind backwards into a pool looking at access and usage patterns (in the case of the coordination pool) or extracting previous graphics frames (in the case of graphics pools).

Figure 36:
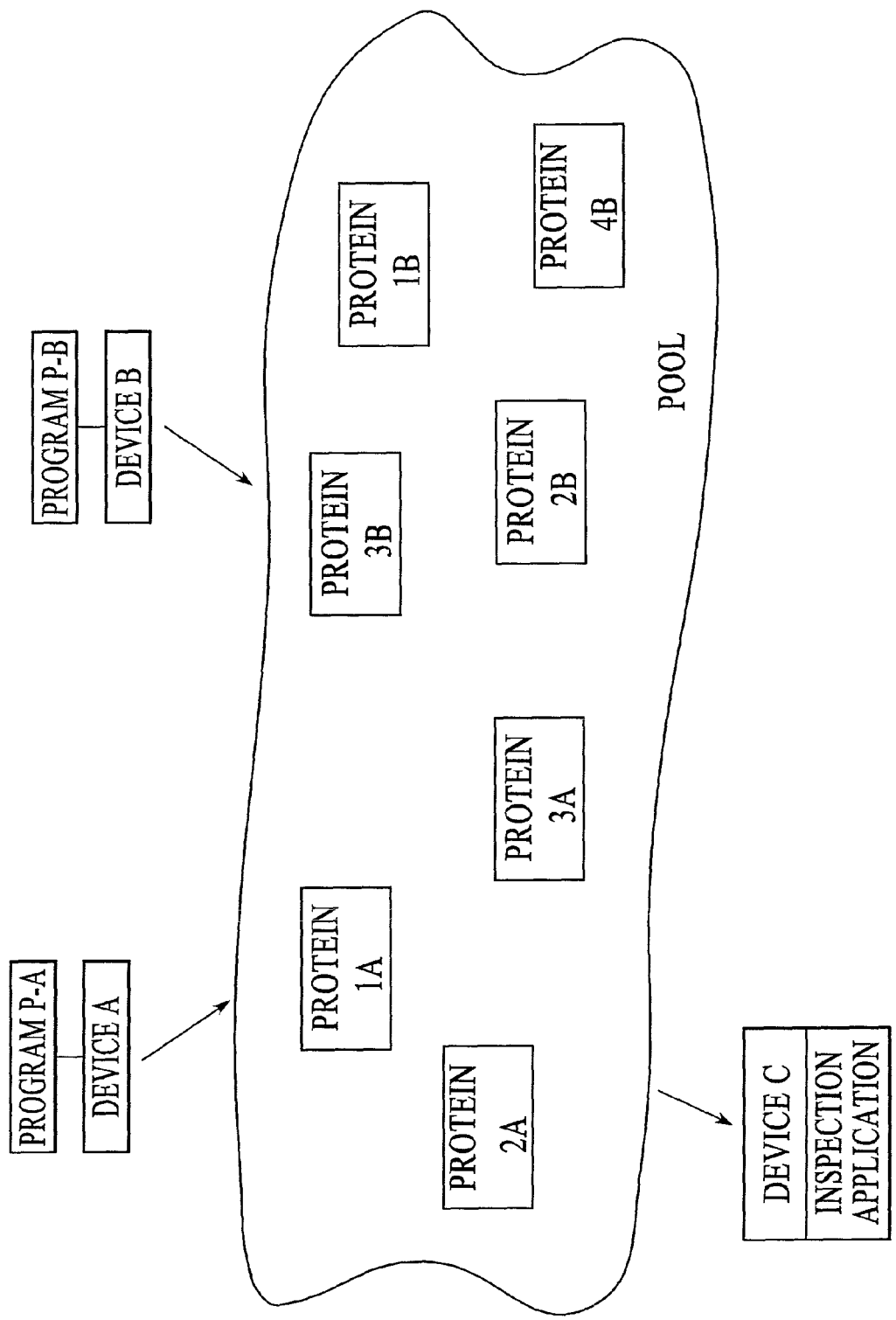
FIG. 36 is a block diagram of a processing environment including multiple devices coupled among numerous programs running on one or more of the devices in which the Plasma constructs (i.e., pools, proteins, and slaw) are used to allow stateful inspection, visualization, and debugging of the running programs, under still another alternative embodiment.

FIG. 36 is a block diagram of a processing environment including multiple devices coupled among numerous programs running on one or more of the devices in which the Plasma constructs (e.g., pools, proteins, and slaw) are used to allow stateful inspection, visualization, and debugging of the running programs, under still another alternative embodiment. This system is but one example of a system comprising multiple running programs (e.g. program P-A, program P-B, etc.) on multiple devices (e.g., device A, device B, etc.) in which some programs access the internal state of other programs using or via pools.

Most interactive computer systems comprise many programs running alongside one another, either on a single machine or on multiple machines and interacting across a network. Multi-program systems can be difficult to configure, analyze and debug because run-time data is hidden inside each process and difficult to access. The generalized framework and Plasma constructs of an embodiment described herein allow running programs to make much of their data available via pools so that other programs may inspect their state. This framework enables debugging tools that are more flexible than conventional debuggers, sophisticated system maintenance tools, and visualization harnesses configured to allow human operators to analyze in detail the sequence of states that a program or programs has passed through.

Referring to FIG. 36, a program (e.g., program P-A, program P-B, etc.) running in this framework generates or creates a process pool upon program start up. This pool is registered in the system almanac, and security and access controls are applied. More particularly, each device (e.g., device A, B, etc.) translates discrete raw data generated by or output from the programs (e.g., program P-A, program P-B, etc.) running on that respective device into Plasma proteins and deposits those proteins into a Plasma pool. For example, program P-A generates data or output and provides the output to device A which, in turn, translates the raw data into proteins (e.g., protein 1A, protein 2A, protein 3A, etc.) and deposits those proteins into the pool. As another example, program P-B generates data and provides the data to device B which, in turn, translates the data into proteins (e.g., proteins 1B-4B, etc.) and deposits those proteins into the pool.

For the duration of the program's lifetime, other programs with sufficient access permissions may attach to the pool and read the proteins that the program deposits; this represents the basic inspection modality, and is a conceptually "one-way" or "read-only" proposition: entities interested in a program P-A inspect the flow of status information deposited by P-A in its process pool. For example, an inspection program or application running under device C can extract one or more proteins (e.g., protein 1A, protein 2A, etc.) from the pool. Following protein extraction, device C can use the data of the protein, retrieved or read from the slaw of the descrips and ingests of the protein, to access, interpret and inspect the internal state of program P-A.

But, recalling that the Plasma system is not only an efficient stateful transmission scheme but also an omnidirectional messaging environment, several additional modes support program-to-program state inspection. An authorized inspection program may itself deposit proteins into program P's process pool to influence or control the characteristics of state information produced and placed in that process pool (which, after all, program P not only writes into but reads from).

Figure 37:
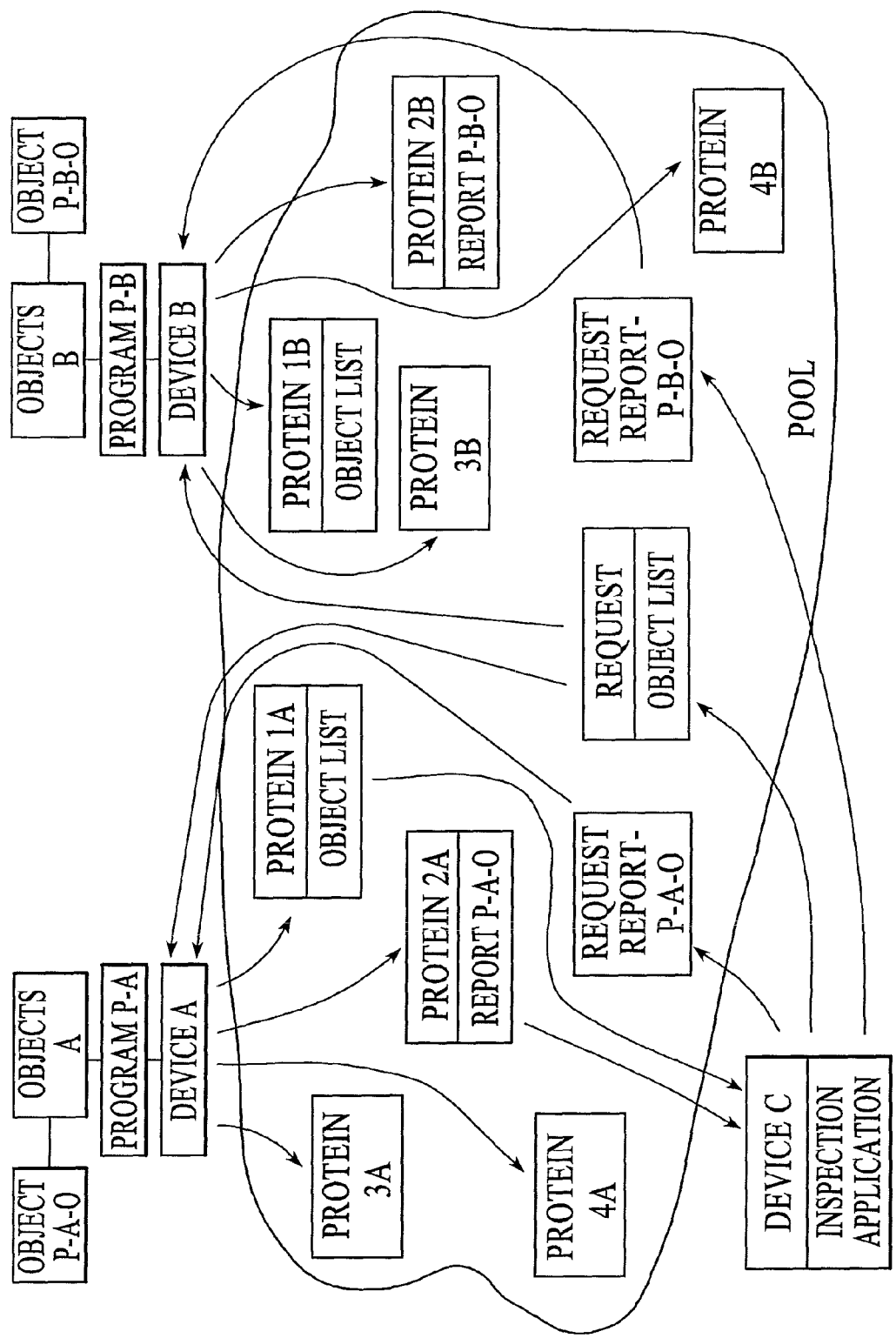
FIG. 37 is a block diagram of a processing environment including multiple devices coupled among numerous programs running on one or more of the devices in which the Plasma constructs (i.e., pools, proteins, and slaw) are used to allow influence or control the characteristics of state information produced and placed in that process pool, under an additional alternative embodiment.

FIG. 37 is a block diagram of a processing environment including multiple devices coupled among numerous programs running on one or more of the devices in which the Plasma constructs (e.g., pools, proteins, and slaw) are used to allow influence or control the characteristics of state information produced and placed in that process pool, under an additional alternative embodiment. In this system example, the inspection program of device C can for example request that programs (e.g., program P-A, program P-B, etc.) dump more state than normal into the pool, either for a single instant or for a particular duration. Or, prefiguring the next 'level' of debug communication, an interested program can request that programs (e.g., program P-A, program P-B, etc.) emit a protein listing the objects extant in its runtime environment that are individually capable of and available for interaction via the debug pool. Thus informed, the interested program can 'address' individuals among the objects in the programs runtime, placing proteins in the process pool that a particular object alone will take up and respond to. The interested program might, for example, request that an object emit a report protein describing the instantaneous values of all its component variables. Even more significantly, the interested program can, via other proteins, direct an object to change its behavior or its variables' values.

More specifically, in this example, inspection application of device C places into the pool a request (in the form of a protein) for an object list (e.g., "Request-Object List") that is then extracted by each device (e.g., device A, device B, etc.) coupled to the pool. In response to the request, each device (e.g., device A, device B, etc.) places into the pool a protein (e.g., protein 1A, protein 1B, etc.) listing the objects extant in its runtime environment that are individually capable of and available for interaction via the debug pool.

Thus informed via the listing from the devices, and in response to the listing of the objects, the inspection application of device C addresses individuals among the objects in the programs runtime, placing proteins in the process pool that a particular object alone will take up and respond to. The inspection application of device C can, for example, place a request protein (e.g., protein "Request Report P-A-O", "Request Report P-B-O") in the pool that an object (e.g., object P-A-O, object P-B-O, respectively) emit a report protein (e.g., protein 2A, protein 2B, etc.) describing the instantaneous values of all its component variables. Each object (e.g., object P-A-O, object P-B-O) extracts its request (e.g., protein "Request Report P-A-O", "Request Report P-B-O", respectively) and, in response, places a protein into the pool that includes the requested report (e.g., protein 2A, protein 2B, respectively). Device C then extracts the various report proteins (e.g., protein 2A, protein 2B, etc.) and takes subsequent processing action as appropriate to the contents of the reports.

In this way, use of Plasma as an interchange medium tends ultimately to erode the distinction between debugging, process control, and program-to-program communication and coordination.

To that last, the generalized Plasma framework allows visualization and analysis programs to be designed in a loosely-coupled fashion. A visualization tool that displays memory access patterns, for example, might be used in conjunction with any program that outputs its basic memory reads and writes to a pool. The programs undergoing analysis need not know of the existence or design of the visualization tool, and vice versa.

The use of pools in the manners described above does not unduly affect system performance. For example, embodiments have allowed for depositing of several hundred thousand proteins per second in a pool, so that enabling even relatively verbose data output does not noticeably inhibit the responsiveness or interactive character of most programs.

Embodiments described herein comprise a method for navigating through a data space, the method comprising: detecting a gesture of a body from gesture data received via a detector, wherein the gesture data is absolute three-space location data of an instantaneous state of the body at a point in time and physical space, the detecting comprising identifying the gesture using only the gesture data; translating the gesture to a gesture signal; and navigating through the data space in response to the gesture signal, wherein the data space is a data-representational space comprising a dataset represented in the physical space.

The method of an embodiment comprises aligning a parameter-control axis of the dataset with a dimension of the physical space.

The dimension of an embodiment is a depth dimension.

The dimension of an embodiment is a horizontal dimension.

The dimension of an embodiment is a vertical dimension.

The dimension of an embodiment is a lateral dimension.

The navigating of an embodiment comprises motion along the dimension to effect a data-space translation along the parameter-control axis.

The navigating of an embodiment comprises navigating to quantized parameter spaces of the data space.

The detecting of an embodiment includes detecting an evolving position of the body.

The detecting of an embodiment includes detecting an evolving orientation of the body.

The detecting of an embodiment includes detecting an evolving pose of the body, wherein the pose is a geometric disposition of a part of the body relative to at least one other part of the body.

The detecting of an embodiment includes detecting evolving motion of the body.

The detecting of an embodiment includes detecting at least one of an evolving position of the body, orientation of the body, pose of the body, and motion of the body.

The method of an embodiment comprises analyzing the gesture into a sequence of gestural events.

The method of an embodiment comprises identifying the gesture.

The identifying of the gesture of an embodiment includes identifying at least one of an evolving position of the body, orientation of the body, pose of the body, and motion of the body.

The method of an embodiment comprises generating a representation of the gestural events of the sequence of gestural events.

The method of an embodiment comprises distributing the representation of the gestural events to at least one control component coupled to the data space.

The method of an embodiment comprises synchronizing the representation of the gestural events with a graphical depiction of the data space.

The method of an embodiment comprises synchronizing the representation of the gestural events with a graphical depiction of the navigating through the data space.

The method of an embodiment comprises synchronizing the representation of the gestural events with an aural depiction of the data space.

The method of an embodiment comprises synchronizing the representation of the gestural events with an aural depiction of the navigating through the data space.

The dataset of an embodiment represents spatial information.

The dataset of an embodiment represents spatial information of at least one of phenomena, events, measurements, observations, and structure.

The dataset of an embodiment represents non-spatial information.

The gesture of an embodiment comprises linear spatial motion.

The navigating of an embodiment comprises linear verging through the data space.

The method of an embodiment comprises rendering the dataset in a plurality of data frames that are graphical depictions of a plurality of regions of the data space. The method of an embodiment comprises displaying each data frame as a visible frame on a display.

A size and an aspect ratio of the data frame of an embodiment coincide with the size and the aspect ratio of the display.

A center and a normal vector of the data frame of an embodiment coincide with the center and the normal vector of the display.

A position and an orientation of the data frame of an embodiment coincide with the position and the orientation of the display.

Each data frame of an embodiment comprises graphical data elements representing elements of the dataset.

The graphical data elements of an embodiment are static elements.

The graphical data elements of an embodiment are dynamic elements.

The data frame of an embodiment is a two-dimensional construct.

The data frame of an embodiment is resident in a three-dimensional graphics rendering environment having a coordinate system that coincides with coordinates that describe a local environment that includes the body.

The navigating through the data space of an embodiment comprises navigating through the plurality of data frames.

The method of an embodiment comprises detecting a first pose of the body. The method of an embodiment comprises activating pushback interaction in response to detecting the first pose.

The method of an embodiment comprises recording a first position at which the first pose is entered, wherein the first position is a three-space hand position. The method of an embodiment comprises setting the first position as an origin, wherein subsequent detected body positions are reported as relative offsets to the origin.

The method of an embodiment comprises detecting a gesture by detecting movement of the body.

The detecting of an embodiment comprises detecting a first movement of the body, wherein the first movement is movement along an axis toward the display, wherein the axis is defined as an axis normal to a view surface of the display.

In response to the first movement of the body, the navigating of an embodiment comprises displacing the plurality of data frames along the axis, wherein more of the plane in which the data frames lie becomes visible, wherein a first visible frame rendered on the display is seen to recede from the display and neighboring data frames of the first data frame become visible.

In response to the first movement of the body, the navigating of an embodiment comprises displacing the plurality of data frames along the axis from a current data frame, wherein data frames translate downward, wherein the current data frame is the data frame currently rendered on the display.

An appearance of each data frame of an embodiment varies in response to the displacing, wherein data frames positioned below the current data frame take on a relatively high degree of transparency and blur, wherein the current data frame transitions from visible and begins taking on a degree of transparency and blur, wherein data frames positioned above the current data frame take on a relatively lower degree of transparency and blur and become visible.

The detecting of an embodiment comprises detecting a second movement of the body, wherein the second movement is movement along the axis away from the display.

In response to the second movement of the body, the navigating of an embodiment comprises displacing the plurality of data frames along the axis, wherein less of the plane in which the data frames lie becomes visible, wherein the first visible frame rendered on the display is seen to verge from the display and neighboring data frames of the first data frame become less visible.

In response to the second movement of the body, the navigating of an embodiment comprises displacing the plurality of data frames along the axis from a current data frame, wherein the data frames translate upward, wherein the current data frame is the data frame currently rendered on the display.

An appearance of each data frame of an embodiment varies in response to the displacing, wherein data frames positioned above the current data frame take on a relatively high degree of transparency and blur, wherein the current data frame transitions from visible and begins taking on a degree of transparency and blur, wherein data frames positioned below the current data frame take on a relatively lower degree of transparency and blur and start to become visible.

The detecting of an embodiment comprises detecting a third movement of the body, wherein the third movement is movement in a plane parallel to a view surface of the display.

In response to the third movement of the body, the navigating of an embodiment comprises displacing the plurality of data frames in a direction corresponding to the third movement.

A current data frame of an embodiment rendered on the display is seen to slide in the direction and an adjacent data frame to the current data frame slides into view from a side of the display opposite the direction, wherein the current data frame is the data frame currently rendered on the display.

The navigating of an embodiment comprises continuously updating a displacement of the plurality of data frames in direct response to the movement of the body.

The method of an embodiment comprises detecting a second pose of the body. The method of an embodiment comprises terminating pushback interaction in response to detecting the second pose, wherein the terminating comprises displaying a data frame of the plurality of data frames as coplanar with the display.

The method of an embodiment comprises a mapping between a physical distance of displacement of the body during a gesture and logical distance between successive points in the data space during the navigating, wherein the mapping controls at least one of relative displacement of the plurality of data frames in the data space and an appearance of each discrete data frame.

The method of an embodiment comprises forming a gestural interaction space comprising an active zone and a dead zone, wherein the active zone is adjacent the display and the dead zone is adjacent the active zone.

The navigating of an embodiment through the data space in response to the gesture signal is activated in response to the gesture when the gesture is detected in the active region.

The method of an embodiment comprises a feedback indicator rendered on the display.

The feedback indicator of an embodiment displays feedback indicating the body is in one of the active zone and the dead zone.

The feedback indicator of an embodiment displays feedback indicating a physical offset of the body from the origin.

The detecting of an embodiment includes at least one of detecting a location of the body, detecting an orientation of the body, and detecting motion of the body.

The method of an embodiment comprises identifying the gesture, wherein the identifying includes identifying a pose and an orientation of a portion of the body.

The detecting of an embodiment includes detecting at least one of a first set of appendages and a second set of appendages of the body.

The detecting of an embodiment includes dynamically detecting a position of at least one tag coupled to the body.

The detecting of an embodiment includes detecting position of a set of tags coupled to the body.

Each tag of the set of tags of an embodiment includes a pattern, wherein each pattern of each tag of the set of tags is different than any pattern of any remaining tag of the plurality of tags.

The detecting of an embodiment includes dynamically detecting and locating a marker on the body.

The detecting of an embodiment includes detecting position of a set of markers coupled to the body.

The set of markers of an embodiment form a plurality of patterns on the body.

The detecting of an embodiment includes detecting position of a plurality of appendages of the body using a set of markers coupled to each of the appendages.

The translating of an embodiment comprises translating information of the gesture to a gesture notation.

The gesture notation of an embodiment represents a gesture vocabulary, and the gesture signal comprises communications of the gesture vocabulary.

The gesture vocabulary of an embodiment represents in textual form instantaneous pose states of kinematic linkages of the body.

The gesture vocabulary of an embodiment represents in textual form an orientation of kinematic linkages of the body.

The gesture vocabulary of an embodiment represents in textual form a combination of orientations of kinematic linkages of the body.

The gesture vocabulary of an embodiment includes a string of characters that represent a state of kinematic linkages of the body.

The kinematic linkage of an embodiment is at least one first appendage of the body.

The method of an embodiment comprises assigning each position in the string to a second appendage, the second appendage connected to the first appendage.

The method of an embodiment comprises assigning characters of a plurality of characters to each of a plurality of positions of the second appendage.

The plurality of positions of an embodiment is established relative to a coordinate origin.

The method of an embodiment comprises establishing the coordinate origin using a position selected from a group consisting of an absolute position and orientation in space, a fixed position and orientation relative to the body irrespective of an overall position and heading of the body, and interactively in response to an action of the body.

The method of an embodiment comprises assigning characters of the plurality of characters to each of a plurality of orientations of the first appendage.

The detecting of an embodiment comprises detecting when an extrapolated position of the body intersects virtual space, wherein the virtual space comprises space depicted on a display device coupled to the computer.

The method of an embodiment comprises controlling a virtual object in the virtual space when the extrapolated position intersects the virtual object.

The controlling of an embodiment comprises controlling a position of the virtual object in the virtual space in response to the extrapolated position in the virtual space.

The controlling of an embodiment comprises controlling attitude of the virtual object in the virtual space in response to the gesture.

The method of an embodiment comprises controlling scaling of the detecting and controlling to generate coincidence between virtual space and the physical space, wherein the virtual space comprises space depicted on a display, wherein the physical space comprises space inhabited by the body.

The method of an embodiment comprises controlling at least one virtual object in the virtual space in response to movement of at least one physical object in the physical space.

The method of an embodiment comprises imaging the body with an imaging system.

The imaging of an embodiment comprises generating wavefront coded images of the body.

The gesture data of an embodiment comprises focus-resolved data of the body within a depth of field of the imaging system.

The method of an embodiment comprises generating intermediate images by coding images gathered by the imaging system.

The intermediate images of an embodiment are blurred.

The intermediate images of an embodiment are insensitive to changes in at least one of the body and a plurality of optical detectors of the imaging system that include defocus aberrations.

The gesture data of an embodiment comprises focus-resolved range data of the body within the depth of field.

The focus-resolved range data of the body within the depth of field of an embodiment is derived from an output of the imaging system.

The gesture data of an embodiment comprises focus-resolved position data of the body within the depth of field.

The focus-resolved position data of the body within the depth of field of an embodiment is derived from an output of the imaging system.

The imaging system of an embodiment comprises a plurality of detectors.

At least two of the detectors of an embodiment are wavefront coded cameras comprising a wavefront coding optical element.

At least two of the optical detectors of an embodiment are wavefront coded cameras comprising a phase mask that increases a depth of focus of the imaging.

The method of an embodiment comprises generating modulation transfer functions and point spread functions that are invariant to a distance between the body and the imaging system.

The method of an embodiment comprises generating modulation transfer functions and point spread functions that are invariant with respect to defocus.

Embodiments described herein comprise a system comprising: a detector for receiving gesture data that represents a gesture made by a body; and a processor coupled to the detector, the processor automatically detecting the gesture from the gesture data, wherein the gesture data is absolute three-space location data of an instantaneous state of the body at a point in time and physical space, the processor identifying the gesture using only the gesture data, the processor translating the gesture to a gesture signal, the processor controlling navigating through the data space in response to the gesture signal, wherein the data space is a data-representational space comprising a dataset represented in the physical space.

Embodiments described herein comprise a method for navigating through a data space, the method comprising: detecting a gesture of a body from gesture data received via a detector, wherein the gesture data is absolute three-space location data of an instantaneous state of the body at a point in time and physical space, the detecting comprising identifying the gesture using only the gesture data; translating the gesture to a gesture signal; navigating through the data space in response to the gesture signal, wherein the data space is a data-representational space comprising a dataset represented in the physical space; and rendering the dataset in a plurality of coplanar data frames that are graphical depictions of a plurality of regions of the data space and displaying each data frame as a visible frame on a display.

The method of an embodiment comprises detecting a first pose of the body. The method of an embodiment comprises activating pushback interaction in response to detecting the first pose.

The method of an embodiment comprises recording a first position at which the first pose is entered, wherein the first position is a three-space hand position. The method of an embodiment comprises setting the first position as an origin, wherein subsequent detected body positions are reported as relative offsets to the origin.

The detecting of an embodiment comprises detecting a forward movement of the body, wherein the forward movement is movement along a z-axis toward the display, wherein the z-axis is defined as an axis normal to a view surface of the display.

In response to the forward movement of the body, the navigating of an embodiment comprises displacing the plurality of data frames along the z-axis, wherein more of the plane in which the data frames lie becomes visible, wherein a first visible frame rendered on the display is seen to recede from the display and neighboring data frames of the first data frame become visible.

The detecting of an embodiment comprises detecting a rearward movement of the body, wherein the rearward movement is movement along the z-axis away the display.

In response to the rearward movement of the body, the navigating of an embodiment comprises displacing the plurality of data frames along the z-axis, wherein less of the plane in which the data frames lie becomes visible, wherein the first visible frame rendered on the display is seen to verge from the display and neighboring data frames of the first data frame become less visible.

The method of an embodiment comprises continuously updating a displacement along the z-axis of the plurality of data frames in direct response to movement of the body along the z-axis.

The method of an embodiment comprises detecting a second pose of the body. The method of an embodiment comprises terminating pushback interaction in response to detecting the second pose, wherein the terminating comprises displaying a data frame of the plurality of data frames as coplanar with the display.

The detecting of an embodiment comprises detecting right lateral movement of the body, wherein the right lateral movement is movement along an x-axis, wherein the x-axis lies in a plane parallel to a view surface of the display.

In response to the right lateral movement of the body, the navigating of an embodiment comprises displacing the plurality of data frames to the right along the x-axis, wherein a first visible frame rendered on the display is seen to slide from the display toward a right side of the display and an adjacent data frame to the first data frame slides into view from a left side of the display.

The detecting of an embodiment comprises detecting left lateral movement of the body, wherein the left lateral movement is movement along the x-axis.

In response to the left lateral movement of the body, the navigating of an embodiment comprises displacing the plurality of data frames to the left along the x-axis, wherein a first visible frame rendered on the display is seen to slide from the display toward a left side of the display and an adjacent data frame to the first data frame slides into view from a right side of the display.

The method of an embodiment comprises continuously updating a displacement along the x-axis of the plurality of data frames in direct response to movement of the body along the x-axis.

The method of an embodiment comprises detecting a second pose of the body. The method of an embodiment comprises terminating pushback interaction in response to detecting the second pose, wherein the terminating comprises displaying a data frame of the plurality of data frames as coplanar with the display.

The data space of an embodiment comprises a plurality of virtual detents arranged in the plane.

Each virtual detent of an embodiment corresponds to each data frame.

The method of an embodiment comprises forming a gestural interaction space comprising an active zone and a dead zone, wherein the active zone is adjacent the display and the dead zone is adjacent the active zone.

The navigating of an embodiment through the data space in response to the gesture signal is activated in response to the gesture when the gesture is detected in the active region.

The method of an embodiment comprises a feedback indicator rendered on the display.

The feedback indicator of an embodiment displays feedback indicating the body is in one of the active zone and the dead zone.

The feedback indicator of an embodiment displays feedback indicating a physical offset of the body from the origin.

The method of an embodiment comprises aligning a parameter-control axis of the dataset with a dimension of the physical space.

The dimension of an embodiment is a depth dimension.

The dimension of an embodiment is a horizontal dimension.

The dimension of an embodiment is a vertical dimension.

The dimension of an embodiment is a lateral dimension.

The navigating of an embodiment comprises motion along the dimension to effect a data-space translation along the parameter-control axis.

The navigating of an embodiment comprises navigating to quantized parameter spaces of the data space.

The detecting of an embodiment includes detecting an evolving position of the body.

The detecting of an embodiment includes detecting an evolving orientation of the body.

The detecting of an embodiment includes detecting an evolving pose of the body, wherein the pose is a geometric disposition of a part of the body relative to at least one other part of the body.

The detecting of an embodiment includes detecting evolving motion of the body.

The detecting of an embodiment includes detecting at least one of an evolving position of the body, orientation of the body, pose of the body, and motion of the body.

The method of an embodiment comprises analyzing the gesture into a sequence of gestural events.

The method of an embodiment comprises identifying the gesture.

The identifying of the gesture of an embodiment includes identifying at least one of an evolving position of the body, orientation of the body, pose of the body, and motion of the body.

The method of an embodiment comprises generating a representation of the gestural events of the sequence of gestural events.

The method of an embodiment comprises distributing the representation of the gestural events to at least one control component coupled to the data space.

The method of an embodiment comprises synchronizing the representation of the gestural events with a graphical depiction of the data space.

The method of an embodiment comprises synchronizing the representation of the gestural events with a graphical depiction of the navigating through the data space.

The method of an embodiment comprises synchronizing the representation of the gestural events with an aural depiction of the data space.

The method of an embodiment comprises synchronizing the representation of the gestural events with an aural depiction of the navigating through the data space.

The dataset of an embodiment represents spatial information.

The dataset of an embodiment represents spatial information of at least one of phenomena, events, measurements, observations, and structure.

The dataset of an embodiment represents non-spatial information.

The gesture of an embodiment comprises linear spatial motion.

The navigating of an embodiment comprises linear verging through the data space.

The method of an embodiment comprises rendering the dataset in a plurality of data frames that are graphical depictions of a plurality of regions of the data space. The method of an embodiment comprises displaying each data frame as a visible frame on a display.

A size and an aspect ratio of the data frame of an embodiment coincide with the size and the aspect ratio of the display.

A center and a normal vector of the data frame of an embodiment coincide with the center and the normal vector of the display.

A position and an orientation of the data frame of an embodiment coincide with the position and the orientation of the display.

Each data frame of an embodiment comprises graphical data elements representing elements of the dataset.

The graphical data elements of an embodiment are static elements.

The graphical data elements of an embodiment are dynamic elements.

The data frame of an embodiment is a two-dimensional construct.

The data frame of an embodiment is resident in a three-dimensional graphics rendering environment having a coordinate system that coincides with coordinates that describe a local environment that includes the body.

The navigating through the data space of an embodiment comprises navigating through the plurality of data frames.

The method of an embodiment comprises identifying the gesture, wherein the identifying includes identifying a pose and an orientation of a portion of the body.

The detecting of an embodiment includes detecting at least one of a first set of appendages and a second set of appendages of the body.

The detecting of an embodiment includes dynamically detecting a position of at least one tag.

The detecting of an embodiment includes dynamically detecting and locating a marker on the body.

The translating of an embodiment comprises translating information of the gesture to a gesture notation.

The gesture notation of an embodiment represents a gesture vocabulary, and the gesture signal comprises communications of the gesture vocabulary.

The gesture vocabulary of an embodiment represents in textual form instantaneous pose states of the body.

The gesture vocabulary of an embodiment represents in textual form an orientation of the body.

The gesture vocabulary of an embodiment represents in textual form a combination of orientations of the body.

The gesture vocabulary of an embodiment includes a string of characters that represent a state of the body.

The detecting comprises detecting when an extrapolated position of the body intersects virtual space, wherein the virtual space comprises space depicted on the display.

The method of an embodiment comprises controlling a virtual object in the virtual space when the extrapolated position intersects the virtual object.

The method of an embodiment comprises controlling a position of the virtual object in the virtual space in response to the extrapolated position in the virtual space.

The method of an embodiment comprises controlling scaling of the detecting and navigating to generate coincidence between virtual space and physical space, wherein the virtual space comprises space depicted on the display, wherein the physical space comprises space inhabited by the body.

The method of an embodiment comprises imaging the body with an imaging system.

The imaging of an embodiment comprises generating wavefront coded images of the body.

The gesture data of an embodiment comprises focus-resolved data of the body within a depth of field of the imaging system.

The method of an embodiment comprises generating intermediate images by coding images gathered by the imaging system.

The intermediate images of an embodiment are blurred.

The intermediate images of an embodiment are insensitive to changes in at least one of the body and a plurality of optical detectors of the imaging system that include defocus aberrations.

The gesture data of an embodiment comprises focus-resolved range data of the body within the depth of field.

The focus-resolved range data of the body within the depth of field of an embodiment is derived from an output of the imaging system.

The gesture data of an embodiment comprises focus-resolved position data of the body within the depth of field.

The focus-resolved position data of the body within the depth of field of an embodiment is derived from an output of the imaging system.

The imaging system of an embodiment comprises a plurality of detectors.

At least two of the detectors of an embodiment are wavefront coded cameras comprising a wavefront coding optical element.

At least two of the optical detectors of an embodiment are wavefront coded cameras comprising a phase mask that increases a depth of focus of the imaging.

The method of an embodiment comprises generating modulation transfer functions and point spread functions that are invariant to a distance between the body and the imaging system.

The method of an embodiment comprises generating modulation transfer functions and point spread functions that are invariant with respect to defocus.

Embodiments described herein comprise a system comprising: a detector for receiving gesture data that represents a gesture made by a body; and a processor coupled to the detector, the processor automatically detecting the gesture from the gesture data, wherein the gesture data is absolute three-space location data of an instantaneous state of the body at a point in time and physical space, the processor identifying the gesture using only the gesture data, the processor translating the gesture to a gesture signal, the processor controlling navigating through the data space in response to the gesture signal, wherein the data space is a data-representational space comprising a dataset represented in the physical space, the processor rendering the dataset in a plurality of coplanar data frames that are graphical depictions of a plurality of regions of the data space and displaying each data frame as a visible frame on a display.

Embodiments described herein comprise a method for navigating through a data space, the method comprising: detecting a gesture of a body from gesture data received via a detector, wherein the gesture data is absolute three-space location data of an instantaneous state of the body at a point in time and physical space, the detecting comprising identifying the gesture using only the gesture data; translating the gesture to a gesture signal; navigating through the data space in response to the gesture signal, wherein the data space is a data-representational space comprising a dataset represented in the physical space; and rendering the dataset in a plurality of data frames that are graphical depictions of a plurality of regions of the data space and displaying each data frame as a visible frame on a display, wherein the plurality of data frames comprises a stack of discrete data frames arranged in a plurality of planes of the data space, wherein each data frame lies in a separate plane of the plurality of planes.

The method of an embodiment comprises detecting a first pose of the body. The method of an embodiment comprises activating pushback interaction in response to detecting the first pose.

The method of an embodiment comprises recording a first position at which the first pose is entered, wherein the first position is a three-space hand position. The method of an embodiment comprises setting the first position as an origin, wherein subsequent detected body positions are reported as relative offsets to the origin.

The detecting of an embodiment comprises detecting an upward movement of the body, wherein the upward movement is movement along a y-axis outward from the display, wherein the y-axis is defined as an axis normal to a view surface of the display.

In response to the upward movement of the body, the navigating of an embodiment comprises displacing the plurality of data frames along the y-axis from a current data frame, wherein the discrete data frames of the stack translate upward, wherein the current data frame is the discrete data frame currently rendered on the display.

An appearance of each discrete data frame of an embodiment varies in response to the displacing, wherein discrete data frames of the stack positioned above the current data frame take on a relatively high degree of transparency and blur, wherein the current data frame transitions from visible and begins taking on a degree of transparency and blur, wherein discrete data frames of the stack positioned below the current data frame take on a relatively lower degree of transparency and blur and start to become visible.

The method of an embodiment comprises a mapping between a physical distance of displacement of the body during a gesture and logical distance between successive discrete data frames of the stack, wherein the mapping controls the displacing of the plurality of data frames along the y-axis and the appearance of each discrete data frame.

The detecting of an embodiment comprises detecting a downward movement of the body, wherein the downward movement is movement along the y-axis toward the display.

In response to the downward movement of the body, the navigating of an embodiment comprises displacing the plurality of data frames along the y-axis from the current data frame, wherein the discrete data frames of the stack translate downward.

An appearance of each discrete data frame of an embodiment varies in response to the displacing, wherein discrete data frames of the stack positioned below the current data frame take on a relatively high degree of transparency and blur, wherein the current data frame transitions from visible and begins taking on a degree of transparency and blur, wherein discrete data frames of the stack positioned above the current data frame take on a relatively lower degree of transparency and blur and become visible.

The method of an embodiment comprises a mapping between a physical distance of displacement of the body during a gesture and logical distance between successive discrete data frames of the stack, wherein the mapping controls the displacing of the plurality of data frames along the y-axis and the appearance of each discrete data frame.

The method of an embodiment comprises continuously updating a displacement along the y-axis of the plurality of data frames in direct response to movement of the body along the y-axis.

The method of an embodiment comprises detecting a second pose of the body. The method of an embodiment comprises terminating pushback interaction in response to detecting the second pose, wherein the terminating comprises displaying a data frame of the plurality of data frames as coplanar with the display.

The data space of an embodiment comprises a plurality of virtual detents.

Each virtual detent of an embodiment corresponds to each plane of the plurality of planes.

The method of an embodiment comprises forming a gestural interaction space comprising a first active zone, a second active zone, and a dead zone, wherein the first active zone is adjacent the display, the dead zone is adjacent the first active zone, and the second active zone is adjacent the dead zone.

The navigating of an embodiment through the data space in response to the gesture signal is activated in response to the gesture when the gesture is detected in one of the first active zone and the second active zone.

The method of an embodiment comprises a feedback indicator rendered on the display.

The feedback indicator of an embodiment displays feedback indicating the body is in one of the first active zone, the second active zone, and the dead zone.

The feedback indicator of an embodiment displays feedback indicating a physical offset of the body from the origin.

The method of an embodiment comprises aligning a parameter-control axis of the dataset with a dimension of the physical space.

The dimension of an embodiment is a depth dimension.

The dimension of an embodiment is a horizontal dimension.

The dimension of an embodiment is a vertical dimension.

The dimension of an embodiment is a lateral dimension.

The navigating of an embodiment comprises motion along the dimension to effect a data-space translation along the parameter-control axis.

The navigating of an embodiment comprises navigating to quantized parameter spaces of the data space.

The detecting of an embodiment includes detecting an evolving position of the body.

The detecting of an embodiment includes detecting an evolving orientation of the body.

The detecting of an embodiment includes detecting an evolving pose of the body, wherein the pose is a geometric disposition of a part of the body relative to at least one other part of the body.

The detecting of an embodiment includes detecting evolving motion of the body.

The detecting of an embodiment includes detecting at least one of an evolving position of the body, orientation of the body, pose of the body, and motion of the body.

The method of an embodiment comprises analyzing the gesture into a sequence of gestural events.

The method of an embodiment comprises identifying the gesture.

The identifying of the gesture of an embodiment includes identifying at least one of an evolving position of the body, orientation of the body, pose of the body, and motion of the body.

The method of an embodiment comprises generating a representation of the gestural events of the sequence of gestural events.

The method of an embodiment comprises distributing the representation of the gestural events to at least one control component coupled to the data space.

The method of an embodiment comprises synchronizing the representation of the gestural events with a graphical depiction of the data space.

The method of an embodiment comprises synchronizing the representation of the gestural events with a graphical depiction of the navigating through the data space.

The method of an embodiment comprises synchronizing the representation of the gestural events with an aural depiction of the data space.

The method of an embodiment comprises synchronizing the representation of the gestural events with an aural depiction of the navigating through the data space.

The dataset of an embodiment represents spatial information.

The dataset of an embodiment represents spatial information of at least one of phenomena, events, measurements, observations, and structure.

The dataset of an embodiment represents non-spatial information.

The gesture of an embodiment comprises linear spatial motion.

The navigating of an embodiment comprises linear verging through the data space.

The method of an embodiment comprises rendering the dataset in a plurality of data frames that are graphical depictions of a plurality of regions of the data space. The method of an embodiment comprises displaying each data frame as a visible frame on a display.

A size and an aspect ratio of the data frame of an embodiment coincide with the size and the aspect ratio of the display.

A center and a normal vector of the data frame of an embodiment coincide with the center and the normal vector of the display.

A position and an orientation of the data frame of an embodiment coincide with the position and the orientation of the display.

Each data frame of an embodiment comprises graphical data elements representing elements of the dataset.

The graphical data elements of an embodiment are static elements.

The graphical data elements of an embodiment are dynamic elements.

The data frame of an embodiment is a two-dimensional construct.

The data frame of an embodiment is resident in a three-dimensional graphics rendering environment having a coordinate system that coincides with coordinates that describe a local environment that includes the body.

The navigating through the data space of an embodiment comprises navigating through the plurality of data frames.

The method of an embodiment comprises identifying the gesture, wherein the identifying includes identifying a pose and an orientation of a portion of the body.

The detecting of an embodiment includes detecting at least one of a first set of appendages and a second set of appendages of the body.

The detecting of an embodiment includes dynamically detecting a position of at least one tag.

The detecting of an embodiment includes dynamically detecting and locating a marker on the body.

The translating of an embodiment comprises translating information of the gesture to a gesture notation.

The gesture notation of an embodiment represents a gesture vocabulary, and the gesture signal comprises communications of the gesture vocabulary.

The gesture vocabulary of an embodiment represents in textual form instantaneous pose states of the body.

The gesture vocabulary of an embodiment represents in textual form an orientation of the body.

The gesture vocabulary of an embodiment represents in textual form a combination of orientations of the body.

The gesture vocabulary of an embodiment includes a string of characters that represent a state of the body.

The detecting of an embodiment comprises detecting when an extrapolated position of the body intersects virtual space, wherein the virtual space comprises space depicted on the display.

The method of an embodiment comprises controlling a virtual object in the virtual space when the extrapolated position intersects the virtual object.

The method of an embodiment comprises controlling a position of the virtual object in the virtual space in response to the extrapolated position in the virtual space.

The method of an embodiment comprises controlling scaling of the detecting and navigating to generate coincidence between virtual space and physical space, wherein the virtual space comprises space depicted on the display, wherein the physical space comprises space inhabited by the body.

The method of an embodiment comprises imaging the body with an imaging system.

The imaging of an embodiment comprises generating wavefront coded images of the body.

The gesture data of an embodiment comprises focus-resolved data of the body within a depth of field of the imaging system.

The method of an embodiment comprises generating intermediate images by coding images gathered by the imaging system.

The intermediate images of an embodiment are blurred.

The intermediate images of an embodiment are insensitive to changes in at least one of the body and a plurality of optical detectors of the imaging system that include defocus aberrations.

The gesture data of an embodiment comprises focus-resolved range data of the body within the depth of field.

The focus-resolved range data of the body within the depth of field of an embodiment is derived from an output of the imaging system.

The gesture data of an embodiment comprises focus-resolved position data of the body within the depth of field.

The focus-resolved position data of the body within the depth of field of an embodiment is derived from an output of the imaging system.

The imaging system of an embodiment comprises a plurality of detectors.

At least two of the detectors of an embodiment are wavefront coded cameras comprising a wavefront coding optical element.

At least two of the optical detectors of an embodiment are wavefront coded cameras comprising a phase mask that increases a depth of focus of the imaging.

The method of an embodiment comprises generating modulation transfer functions and point spread functions that are invariant to a distance between the body and the imaging system.

The method of an embodiment comprises generating modulation transfer functions and point spread functions that are invariant with respect to defocus.

Embodiments described herein comprise a system comprising: a detector for receiving gesture data that represents a gesture made by a body; and a processor coupled to the detector, the processor automatically detecting the gesture from the gesture data, wherein the gesture data is absolute three-space location data of an instantaneous state of the body at a point in time and physical space, the processor identifying the gesture using only the gesture data, the processor translating the gesture to a gesture signal, the processor controlling navigating through the data space in response to the gesture signal, wherein the data space is a data-representational space comprising a dataset represented in the physical space, the processor rendering the dataset in a plurality of data frames that are graphical depictions of a plurality of regions of the data space and displaying each data frame as a visible frame on a display, wherein the plurality of data frames comprises a stack of discrete data frames arranged in a plurality of planes of the data space, wherein each data frame lies in a separate plane of the plurality of planes.

The SOE described herein includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the SOE is not intended to be exhaustive or to limit the systems and methods described to the precise form disclosed. While specific embodiments of, and examples for, the SOE are described herein for illustrative purposes, various equivalent modifications are possible within the scope of other systems and methods, as those skilled in the relevant art will recognize. The teachings of the SOE provided herein can be applied to other processing systems and methods, not only for the systems and methods described above.

The elements and acts of the various embodiments described above can be combined to provide further embodiments. These and other changes can be made to the SOE in light of the above detailed description.

In general, in the following claims, the terms used should not be construed to limit the embodiments to the specific embodiments disclosed in the specification and the claims, but should be construed to include all systems that operate under the claims. Accordingly, the embodiments are not limited by the disclosure herein, but instead the scope of the embodiments is to be determined entirely by the claims.

While certain aspects of the embodiments are presented below in certain claim forms, the inventors contemplate the various aspects of the embodiments in any number of claim forms. Accordingly, the inventors reserve the right to add additional claims after filing the application to pursue such additional claim forms for other aspects of the embodiments.

What is claimed is:

1. A method for navigating through a data space, the method comprising:
    detecting a gesture of a body from gesture data received via a detector, wherein the gesture data is absolute three-space location data of an instantaneous state of the body at a point in time and physical space, the detecting comprising identifying the gesture using only the gesture data;
    translating the gesture to a gesture signal;
    navigating through the data space in response to the gesture signal, wherein the data space is a data-representational space comprising a dataset represented in the physical space; and
    rendering the dataset in a plurality of data frames that are graphical depictions of a plurality of regions of the data space and displaying each data frame as a visible frame on a display, wherein the plurality of data frames comprises a stack of discrete data frames arranged in a plurality of planes of the data space, wherein each data frame lies in a separate plane of the plurality of planes.

2. The method of claim 1, comprising:
    detecting a first pose of the body;
    activating pushback interaction in response to detecting the first pose.

3. The method of claim 2, comprising:
    recording a first position at which the first pose is entered, wherein the first position is a three-space hand position;
    setting the first position as an origin, wherein subsequent detected body positions are reported as relative offsets to the origin.

4. The method of claim 3, wherein the detecting comprises detecting an upward movement of the body, wherein the upward movement is movement along a y-axis outward from the display, wherein the y-axis is defined as an axis normal to a view surface of the display.

5. The method of claim 4, wherein, in response to the upward movement of the body, the navigating comprises displacing the plurality of data frames along the y-axis from a current data frame, wherein the discrete data frames of the stack translate upward, wherein the current data frame is the discrete data frame currently rendered on the display.

6. The method of claim 5, wherein an appearance of each discrete data frame varies in response to the displacing, wherein discrete data frames of the stack positioned above the current data frame take on a relatively high degree of transparency and blur, wherein the current data frame transitions from visible and begins taking on a degree of transparency and blur, wherein discrete data frames of the stack positioned below the current data frame take on a relatively lower degree of transparency and blur and start to become visible.

7. The method of claim 6, comprising a mapping between a physical distance of displacement of the body during a gesture and logical distance between successive discrete data frames of the stack, wherein the mapping controls the displacing of the plurality of data frames along the y-axis and the appearance of each discrete data frame.

8. The method of claim 7, wherein the detecting comprises detecting a downward movement of the body, wherein the downward movement is movement along the y-axis toward the display.

9. The method of claim 8, wherein, in response to the downward movement of the body, the navigating comprises displacing the plurality of data frames along the y-axis from the current data frame, wherein the discrete data frames of the stack translate downward.

10. The method of claim 9, wherein an appearance of each discrete data frame varies in response to the displacing, wherein discrete data frames of the stack positioned below the current data frame take on a relatively high degree of transparency and blur, wherein the current data frame transitions from visible and begins taking on a degree of transparency and blur, wherein discrete data frames of the stack positioned above the current data frame take on a relatively lower degree of transparency and blur and become visible.

11. The method of claim 10, comprising a mapping between a physical distance of displacement of the body during a gesture and logical distance between successive discrete data frames of the stack, wherein the mapping controls the displacing of the plurality of data frames along the y-axis and the appearance of each discrete data frame.

12. The method of claim 11, comprising continuously updating a displacement along the y-axis of the plurality of data frames in direct response to movement of the body along the y-axis.

13. The method of claim 12, comprising:
    detecting a second pose of the body;
    terminating pushback interaction in response to detecting the second pose, wherein the terminating comprises displaying a data frame of the plurality of data frames as coplanar with the display.

14. The method of claim 1, wherein the data space comprises a plurality of virtual detents.

15. The method of claim 14, wherein each virtual detent corresponds to each plane of the plurality of planes.

16. The method of claim 1, comprising forming a gestural interaction space comprising a first active zone, a second active zone, and a dead zone, wherein the first active zone is adjacent the display, the dead zone is adjacent the first active zone, and the second active zone is adjacent the dead zone.

17. The method of claim 16, wherein the navigating through the data space in response to the gesture signal is activated in response to the gesture when the gesture is detected in one of the first active zone and the second active zone.

18. The method of claim 16, comprising a feedback indicator rendered on the display.

19. The method of claim 18, wherein the feedback indicator displays feedback indicating the body is in one of the first active zone, the second active zone, and the dead zone.

20. The method of claim 18, wherein the feedback indicator displays feedback indicating a physical offset of the body from the origin.

21. The method of claim 1, comprising aligning a parameter-control axis of the dataset with a dimension of the physical space.

22. The method of claim 21, wherein the dimension is a depth dimension.

23. The method of claim 21, wherein the dimension is a horizontal dimension.

24. The method of claim 21, wherein the dimension is a vertical dimension.

25. The method of claim 21, wherein the dimension is a lateral dimension.

26. The method of claim 21, wherein the navigating comprises motion along the dimension to effect a data-space translation along the parameter-control axis.

27. The method of claim 21, wherein the navigating comprises navigating to quantized parameter spaces of the data space.

28. The method of claim 1, wherein the detecting includes detecting an evolving position of the body.

29. The method of claim 1, wherein the detecting includes detecting an evolving orientation of the body.

30. The method of claim 1, wherein the detecting includes detecting an evolving pose of the body, wherein the pose is a geometric disposition of a part of the body relative to at least one other part of the body.

31. The method of claim 1, wherein the detecting includes detecting evolving motion of the body.

32. The method of claim 1, wherein the detecting includes detecting at least one of an evolving position of the body, orientation of the body, pose of the body, and motion of the body.

33. The method of claim 1, comprising analyzing the gesture into a sequence of gestural events.

34. The method of claim 33, comprising identifying the gesture.

35. The method of claim 34, wherein the identifying of the gesture includes identifying at least one of an evolving position of the body, orientation of the body, pose of the body, and motion of the body.

36. The method of claim 34, comprising generating a representation of the gestural events of the sequence of gestural events.

37. The method of claim 36, comprising distributing the representation of the gestural events to at least one control component coupled to the data space.

38. The method of claim 37, comprising synchronizing the representation of the gestural events with a graphical depiction of the data space.

39. The method of claim 38, comprising synchronizing the representation of the gestural events with a graphical depiction of the navigating through the data space.

40. The method of claim 37, comprising synchronizing the representation of the gestural events with an aural depiction of the data space.

41. The method of claim 40, comprising synchronizing the representation of the gestural events with an aural depiction of the navigating through the data space.

42. The method of claim 1, wherein the dataset represents spatial information.

43. The method of claim 42, wherein the dataset represents spatial information of at least one of phenomena, events, measurements, observations, and structure.

44. The method of claim 1, wherein the dataset represents non-spatial information.

45. The method of claim 1, wherein the gesture comprises linear spatial motion.

46. The method of claim 1, wherein the navigating comprises linear verging through the data space.

47. The method of claim 1, comprising:
rendering the dataset in a plurality of data frames that are graphical depictions of a plurality of regions of the data space;
displaying each data frame as a visible frame on a display.

48. The method of claim 47, wherein a size and an aspect ratio of the data frame coincide with the size and the aspect ratio of the display.

49. The method of claim 47, wherein a center and a normal vector of the data frame coincide with the center and the normal vector of the display.

50. The method of claim 47, wherein a position and an orientation of the data frame coincide with the position and the orientation of the display.

51. The method of claim 47, wherein each data frame comprises graphical data elements representing elements of the dataset.

52. The method of claim 51, wherein the graphical data elements are static elements.

53. The method of claim 51, wherein the graphical data elements are dynamic elements.

54. The method of claim 47, wherein the data frame is a two-dimensional construct.

55. The method of claim 54, wherein the data frame is resident in a three-dimensional graphics rendering environment having a coordinate system that coincides with coordinates that describe a local environment that includes the body.

56. The method of claim 47, wherein the navigating through the data space comprises navigating through the plurality of data frames.

57. The method of claim 1, comprising identifying the gesture, wherein the identifying includes identifying a pose and an orientation of a portion of the body.

58. The method of claim 1, wherein the detecting includes detecting at least one of a first set of appendages and a second set of appendages of the body.

59. The method of claim 1, wherein the detecting includes dynamically detecting a position of at least one tag.

60. The method of claim 1, wherein the detecting includes dynamically detecting and locating a marker on the body.

61. The method of claim 1, wherein the translating comprises translating information of the gesture to a gesture notation.

62. The method of claim 61, wherein the gesture notation represents a gesture vocabulary, and the gesture signal comprises communications of the gesture vocabulary.

63. The method of claim 62, wherein the gesture vocabulary represents in textual form instantaneous pose states of the body.

64. The method of claim 62, wherein the gesture vocabulary represents in textual form an orientation of the body.

65. The method of claim 62, wherein the gesture vocabulary represents in textual form a combination of orientations of the body.

66. The method of claim 62, wherein the gesture vocabulary includes a string of characters that represent a state of the body.

67. The method of claim 1, wherein the detecting comprises detecting when an extrapolated position of the body intersects virtual space, wherein the virtual space comprises space depicted on the display.

68. The method of claim 67, comprising controlling a virtual object in the virtual space when the extrapolated position intersects the virtual object.

69. The method of claim 68, comprising controlling a position of the virtual object in the virtual space in response to the extrapolated position in the virtual space.

70. The method of claim 1, comprising controlling scaling of the detecting and navigating to generate coincidence between virtual space and physical space, wherein the virtual space comprises space depicted on the display, wherein the physical space comprises space inhabited by the body.

71. The method of claim 1, comprising imaging the body with an imaging system.

72. The method of claim 71, wherein the imaging comprises generating wavefront coded images of the body.

73. The method of claim 72, wherein the gesture data comprises focus-resolved data of the body within a depth of field of the imaging system.

74. The method of claim 73, comprising generating intermediate images by coding images gathered by the imaging system.

75. The method of claim 74, wherein the intermediate images are blurred.

76. The method of claim 74, wherein the intermediate images are insensitive to changes in at least one of the body and a plurality of optical detectors of the imaging system that include defocus aberrations.

77. The method of claim 73, wherein the gesture data comprises focus-resolved range data of the body within the depth of field.

78. The method of claim 77, wherein the focus-resolved range data of the body within the depth of field is derived from an output of the imaging system.

79. The method of claim 73, wherein the gesture data comprises focus-resolved position data of the body within the depth of field.

80. The method of claim 79, wherein the focus-resolved position data of the body within the depth of field is derived from an output of the imaging system.

81. The method of claim 71, wherein the imaging system comprises a plurality of detectors.

82. The method of claim 81, wherein at least two of the detectors are wavefront coded cameras comprising a wavefront coding optical element.

83. The method of claim 81, wherein at least two of the optical detectors are wavefront coded cameras comprising a phase mask that increases a depth of focus of the imaging.

84. The method of claim 71, comprising generating modulation transfer functions and point spread functions that are invariant to a distance between the body and the imaging system.

85. The method of claim 71, comprising generating modulation transfer functions and point spread functions that are invariant with respect to defocus.

86. A system comprising:
a detector for receiving gesture data that represents a gesture made by a body; and
a processor coupled to the detector, the processor automatically detecting the gesture from the gesture data, wherein the gesture data is absolute three-space location data of an instantaneous state of the body at a point in time and physical space, the processor identifying the gesture using only the gesture data, the processor translating the gesture to a gesture signal, the processor controlling navigating through the data space in response to the gesture signal, wherein the data space is a data-representational space comprising a dataset represented in the physical space, the processor rendering the dataset in a plurality of data frames that are graphical depictions of a plurality of regions of the data space and displaying each data frame as a visible frame on a display, wherein the plurality of data frames comprises a stack of discrete data frames arranged in a plurality of planes of the data space, wherein each data frame lies in a separate plane of the plurality of planes.

\* \* \* \* \*